& # x20;

United States Patent [19]

Takeshita et al.

[11] Patent Number: 5,864,525
[45] Date of Patent: Jan. 26, 1999

[54] OPTICAL DISK DEVICE

[75] Inventors: Nobuo Takeshita; Teruo Fujita, both of Nagaokakyo, Japan

[73] Assignee: Mitsubishi Denki Kabushiki Kaisha, Tokyo, Japan

[21] Appl. No.: 877,822

[22] Filed: Jun. 18, 1997

Related U.S. Application Data

[62] Division of Ser. No. 592,178, Jan. 26, 1996, Pat. No. 5,687,032, which is a division of Ser. No. 427,811, Apr. 26, 1995, Pat. No. 5,532,987, which is a division of Ser. No. 109,724, Aug. 19, 1993, Pat. No. 5,453,962.

[30] Foreign Application Priority Data

| Aug. 20, 1992 | [JP] | Japan | 4-221318 |
|---|---|---|---|
| Aug. 24, 1992 | [JP] | Japan | 4-223912 |
| Nov. 30, 1992 | [JP] | Japan | 4-319885 |
| Apr. 28, 1993 | [JP] | Japan | 5-102613 |
| May 31, 1993 | [JP] | Japan | 5-128894 |
| May 31, 1993 | [JP] | Japan | 5-128895 |
| Aug. 17, 1993 | [JP] | Japan | 5-203460 |

[51] Int. Cl.[6] ............................................. G11B 7/095
[52] U.S. Cl. .................................. 369/44.23; 369/44.41
[58] Field of Search .................. 369/44.12, 44.23–44.24, 369/44.41–44.42, 54, 112, 120, 44.37–44.38; 250/201.5

[56] References Cited

U.S. PATENT DOCUMENTS

| Re. 33,548 | 3/1991 | Kime . |
| 3,989,358 | 11/1976 | Melmoth ............................ 359/819 X |
| 4,079,248 | 3/1978 | Lehureau et al. . |
| 4,415,235 | 11/1983 | Coates .................................... 359/819 |
| 5,084,850 | 1/1992 | Yanagawa et al. ................... 369/44.41 |
| 5,161,139 | 11/1992 | Inoue et al. ...................... 369/44.24 X |
| 5,173,890 | 12/1992 | Miyake et al. ...................... 369/44.23 |
| 5,270,996 | 12/1993 | Ono ................................. 369/44.23 X |
| 5,345,072 | 9/1994 | Hayashi et al. ................. 369/44.37 X |
| 5,353,167 | 10/1994 | Kuklo ....................................... 359/876 |
| 5,367,512 | 11/1994 | Satou et al. .......................... 369/44.23 |

FOREIGN PATENT DOCUMENTS

| 56-82958 | 6/1981 | Japan . |
| 59-223953 | 12/1984 | Japan . |
| 61-94246 | 5/1986 | Japan . |
| 63-131333 | 6/1988 | Japan . |
| 63-53618 | 10/1988 | Japan . |
| 370859 | 11/1991 | Japan . |
| 4243021 | 8/1992 | Japan . |

OTHER PUBLICATIONS

Bouwhuis, "Principles of Optical Disk System", Adam Hilger (1985), pp. 77–79.

Irie, "Focus Sensing Characteristics of the Pupil Obscuration Method for Continously Grooved Disks", Proc. Int. Symp. on Optical Memory, 1987, Japanese Journal of Applied Physics, vol. 26 (1987), Supplement 26–4, pp. 183–186.

*Primary Examiner*—W. R. Young

[57] ABSTRACT

In an optical disk device for recording or playing back information on or from an optical information recording medium having land parts forming information tracks and groove parts interposed between adjacent land parts, the land part is illuminated with a first light spot, and the groove part is illuminated a second light spot, a first focus error signal is produced in accordance with the reflected light beam of the first light spot, and a second focus error signal is produced in accordance with the reflected light beam of the second light spot, and focus control is performed in accordance with the first and second focus error signals. In another aspect of the invention, each of the light receiving sections of a photodetector used for receiving the reflected light has an array of tapered projections along in a region between main parts the light receiving sections, and the tapered projections of the light receiving sections are interdigitated with each other. Improved devices for tilting the objective lens is also provided.

13 Claims, 79 Drawing Sheets

OPTICAL DISK DEVICE

This application is a divisional of application Ser. No. 08/592,178, filed on Jan. 26, 1996, now U.S. Pat. No. 5,687,032, which was a divisional application of Ser. No. 08/427,811 filed on Apr. 26, 1995, now U.S. Pat. No. 5,532,987, which was a divisional application of Ser. No. 08/109,724 filed on Aug. 19, 1993, now U.S. Pat No. 5,453,962, the entire contents of which are hereby incorporated by reference.

BACKGROUND OF THE INVENTION

The present invention relates to an optical disk device for performing recording and playback of information by focusing a light beam to form a light spot on an optical information recording medium.

The present invention also relates to a focus error detecting device used in an optical recording/playback device performing optical recording and/or playback of information.

The present invention also relates to a device for adjusting the inclination angle of an optical means mounted on an optical disk device or the like.

The present invention also relates to an objective lens drive device mounted on an optical head device for optically recording and/or playing back information on an optical information recording medium.

PRIOR ART EXAMPLE 1

FIG. 1 is a schematic diagram of a conventional optical disk device, and FIG. 2 is an enlarged view of information tracks for illustrating the relationship between the information tracks and a groove interference signal in a conventional optical disk device. FIG. 3 shows the focus error signal in the optical disk device in a conventional disk device. FIG. 4 is a schematic diagram showing the focus error signal during track access.

Referring to FIG. 1, an optical head device section 12 comprises a semiconductor laser 2, an objective lens 6, a photodetector assembly 11 (including photodetectors and differential amplifiers). The semiconductor laser 2 emits a light beam 3 which is collimated by a collimating lens 4 into a collimated beam. The light beam is passed through a beam splitter 5, and is converged by an objective lens 6 to form a light spot 7 on an optical disk 1. Focusing coils 8a and 8b drive the objective lens 6 in the direction of the optical axis. There are further provided a converging lens 9 and a focus error detecting optical element 10 such as a cylindrical lens for detecting the focus error of the light spot 7 on the optical disk 1. A photodetector assembly 11 detects an information signal and a focus error signal. Its output 13 indicates the focus error of the light spot 7 with respect to the optical disk 1, and is supplied to a focus control circuit 14.

Referring to FIG. 2, land parts 15 form information tracks where information is recorded, and groove parts 16 are interposed between adjacent land parts 15. A groove interference signal 17 is superimposed on the focus error signal 13 when the light spot 7 scans in the direction in which it crosses the information track. The period for which the groove interference signal continues corresponds to the pitch of the information tracks (the pitch of the land parts or the pitch of the groove parts).

The operation will next be described. Referring to FIG. 1, the light beam 3 emitted from the semiconductor laser 2 is converted to a collimated beam by the collimating lens 4. The light beam 3 is then passed through the beam splitter 5 and is converged by the objective lens 6 to form a light spot 7 on the optical disk 1. The light beam reflected from the optical disk 1 is reflected at the beam splitter 5, and is passed through the focus error detecting optical element 10, and received by the photodetector assembly 11 and converted there into an electrical signal.

Correction of the focus error of the light spot 7 relative to the optical disk can be achieved by detecting the amount of focus error by the use of the focus error detecting optical element 10, the photodetector assembly 11, and applying the output of the photodetector assembly 11 via the focus control circuit 14 to the focusing coils 8a and 8b, to thereby drive the objective lens 6 in the direction of the optical axis.

However, the focus error signal obtained in the conventional optical disk device formed as described above produces a focus error signal containing a groove interference signal 17 superimposed on the component due to the undulation of the optical disk 1, as shown in FIG. 3. The objective lens 6 needs only to follow the undulation component, but it is made to follow the groove interference components 17 as well. This may lead to voltage saturation of the control circuit or the like. In particular, during access to a target information track, the full amplitude of the groove interference signal is superimposed on the focus error signal, with a frequency dependent on the accessing speed, so that it may adversely affect the focus control system. This is illustrated in FIG. 4, in which T2 is an interval in which access is performed, while regions T1 and T3 are intervals in which tracking is performed. It is seen that the groove interference signal 17 is larger during the region T2, and if the frequency of the groove interference signal 17 is high, saturation and oscillation of the focus control system may be caused.

PRIOR ART EXAMPLE 2

FIG. 5 shows a conventional focus error detecting device described in U.S. Pat. No. 4,079,248 and G. Bouwhuis, et. al., "Principles of Optical Disk Systems", published by Adam Hilger (1985), pp. 77–79. The focus error detecting device is of the pupil obscuration method or the half aperture method.

FIG. 6 to FIG. 11 schematically illustrate the light beam from the information recording medium 106 to the photodetector 109, and the shape of the light spot formed on the photodetector 109, to explain how the focusing (or misfocusing) on the information recording medium 106 affects the light incident on the photodetector 109. A light source, such as a semiconductor laser, 101 emits a light beam E for recording and playback. A beam splitter 102 transmits the emitted light beam E and reflects a light beam R reflected from the information recording medium 106 to be described later. A collimating lens 103 collimates the emitted light beam E into a collimated light beam, and also converges the reflected light beam R onto the two-division photodetector 109. An objective lens 105 focuses the emitted light beam E onto an information recording medium 106, such as an optical disk, and also converts the reflected light from the optical disk into collimated light beam. An obscuring knife edge 107 permits passage of substantially half the reflected light beam. The two-division photodetector 109 receives the reflected light beam R1, with its one half having been removed by the knife edge 107. The two-division photodetector 109 has two photo-electric conversion sections or light receiving surfaces 110 and 111 arranged in a plane perpendicular to an optical axis A and divided by a division line aligned with the upper edge 108 of the knife edge 107. The two-division photodetector is usually composed of a PIN photodiode with a single, common cathode and anodes for the respective photo-electric conversion sections 110 and 111. Electrical signals S1 and S2, corresponding to the amount of light received by the light receiving surfaces 110 and 111, are obtained from the light receiving surface 110 and 111, and the difference between the signals S1 and S2 constitutes the focus error signal FES.

The operation of the focus error detecting device shown in FIG. 5 will next be described with reference to FIG. 6 to FIG. 11. The two-division photodetector 9 is so positioned that when the emitted light beam E is focused on the information recording medium 106, the reflected light beam R1 is focused on the two-division photodetector 109, and at the division line 109a, i.e., at the gap between the light receiving surfaces 110 and 111, as indicated by P1 in FIG. 7. Accordingly, when the emitted light beam E is focused on the information recording medium 6, the amounts of light received by the light receiving surfaces 110 and 111 are equal to each other and the outputs S1 and S2 from the light receiving surfaces 110 and 111 are equal to each other.

When the information recording medium 106 is closer to the objective lens than the focal point, the reflected light beam R1 is incident on the two-division photodetector 109 before it is focused. As a result, more part of the reflected light beam R1 is received by the light receiving surface 110 and less by the light receiving surface 111, as indicated by P3 in FIG. 9. The signal S1 is therefore larger than the signal S2.

When the information recording medium 106 is farther from the objective lens than the focal point, the reflected light beam R1 is incident on the two-division photodetector 109 after it is focused. As a result, more part of the reflected light beam R1 is received by the light receiving surface 111 and less by the light receiving surface 110, as indicated by P5 in FIG. 11. The signal S2 is therefore larger than the signal S1.

The focus error signal FES can be obtained by determining the difference between the signals S1 and S2. The focus error signal FES thus obtained is fed through a phase compensator (not shown) and an amplifier (not shown) to an actuator (not shown) for the objective lens 105, and used for correcting the focus error such that the focal point is maintained on the information recording medium 106.

The focus error signal FES corresponds to the amount of focus error $\Delta z$ (the distance between the focal point and the surface of the information recording medium 109 where information is recorded), but is proportional with the focus error only over a range called "linear zone". The linear zone in the prior art example is 2 to 3 $\mu$m where the numerical aperture of the objective lens is 0.5 to 0.6. FIG. 12 is a schematic illustration of the focused spot P1 on the two-division photodetector 109 and the division line 109a in an enlarged scale. FIG. 13 shows the relationship between the focus error signal FES and the focus error $\Delta z$. It is assumed that the width d of the division line 109a is narrower than the size (lateral extension) of the focused spot P1. Details are shown in the above-mentioned publication "Principles of Optical Disc Systems" and Irie, et al., "Focus Sensing Characteristics of the Pupil Obscuration Method for Continuously Grooved Disks", Japanese Journal of Applied Physics, Vol. 26 (1987), on pp. 183 to 186.

Since the focus error detecting device in the prior art is configured as described above, the linear zone, i.e., the range over which the focus error signal FES varies linearly against the focus error is as narrow as 2 to 3 $\mu$m. When the linear zone is narrow, the range over which the focus control can be made is narrow. (The actual focal point can easily get out of the range of control.) Moreover, errors in positioning the two-division photodetector 109 leads to a great offset in the focus error signal FES.

Methods for expanding the width of the linear zone in the pupil obscuration method is described in Japanese Patent Application Kokai Publication No. S63-131333, and the above-mentioned publication "Focus Sensing Characteristics of the Pupil Obscuration Method for Continuously Grooved Disks".

In the latter publication, for example, it is disclosed that the linear zone can be doubled if the following relationship is satisfied:

$$d \geq \lambda/NA_1 = 0.78\ \mu m/0.053 = 14.7\ \mu m$$

where d represents the width of the division line 109a;

$\lambda$ represents the wavelength of the light from the light source 101 and is 0.78 $\mu$m in the example under consideration; and $NA_1$ represents the numerical aperture of the reflected light beam before or in front of the knife edge 7 and is 0.053 in the example under consideration. Where d is 50 $\mu$m and the numerical aperture of the objective lens 105 is 0.5, the linear zone is more than double compared with the case where d=10 $\mu$m. FIG. 14 shows the relationship between the focus error signal FES and the focus error $\Delta z$ for each of the cases with d=10 $\mu$m and with d=50 $\mu$m.

FIG. 15 shows the sensitivity K1 and K2 of the light receiving surfaces. The origin (x=0) is at the midpoint of the division line. To the left of the origin is the light receiving surface 110, while to the right of the origin is the light receiving surface 111. The sensitivities K1 and K2 of each point of the light receiving surfaces 110 and 111 are defined by the currents produced at the corresponding anodes (the current produced from the corresponding light receiving surfaces) responsive to a unit incident light per unit area. It is seen that the sensitivity of each light receiving surface 110 or 111 for the point in the division line decreases with the distance from the main part of the light receiving surface (the main part being the part outside the division line). It is to be noted that the light incident on the division line contributes to the current from both of the light receiving surfaces 110 and 111. The contributions of the light incident at the midpoint of the division line to the currents of the two light receiving surfaces are equal. The contribution of the light at a point closer to the main part of either one of the light receiving surfaces is larger for said one of the light receiving surface and is smaller for the other light receiving surface.

It will thus be observed that the light beam incident on the center of the division line 109a causes the light receiving surfaces to produce electric currents of an equal amount. The electric current from each of the light receiving surfaces linearly changes over the width of the division line 109a, and is at zero when the light beam is incident on the edge of the of the opposite light receiving surface.

When the two-division photodetector 109 described above is used, most of the reflected light beam R1 is incident on the division line 109a. The two-division photodetector 109 is usually formed of a PIN diode, and when the width of the division line 109a is wide, it is difficult to form a depletion layer in the region of the division line 109a, and the mobilities of electrons and holes produced by incident light are low. If the two-division photodetector 109 is also used for playback of the information signal, the frequency characteristics is degraded and the playback output in the high-frequency region is lowered.

PRIOR ART EXAMPLE 3

FIG. 16 is another conventional focus error detecting device also described in U.S. Pat. No. 4,079,248 and G. Bouwhuis, et al., "Principles of Optical Disk Systems", published by Adam Hilger (1985), pp. 77–79. The focus error detecting device is of the pupil obscuration method or the half aperture method.

FIG. 17 to FIG. 19 schematically illustrate the light beams from an information recording medium 205 to a photodetector 215 to explain how the focusing (or misfocusing) on the information recording medium 205 affects the focusing on the photodetectors 211 and 215. A light source, such as a semiconductor laser, 201 emits a light beam E for recording and playback. A collimating lens 202 converts the light beam from the semiconductor laser 201 into a collimated light beam. A beam splitter 203 reflects the emitted light beam E, while transmitting a light beam R reflected from an information recording medium 205 to be described later. An object lens 204 focuses the emitted light beam E onto the information recording medium 205, such as an optical disk, to form a focused spot 206 on the information recording surface 223 of the information recording medium 205, and also converts the reflected light from the optical disk into a collimated light beam.

The information recording medium 205 has guide grooves 207 formed along circular or spiral tracks, the direction of which is referred to as x direction. The direction orthogonal to the x direction and parallel to the information recording surface 223 is referred to as y direction, while the direction perpendicular to the information recording surface 223 is referred to as z direction.

A converging lens 208 converges the reflected light beam R onto two-division photodetectors 211 and 215, while a roof-shaped prism 209 has a ridge 210 extending in the y direction (or the direction corresponding to the y direction on the information recording medium 205) and splits the reflected light beam R into two light beams R1 and R2.

The two-division photodetector 211 receives the reflected light beam R1 forming a light spot 214 on the photodetector 211, and comprises two light receiving surfaces 212 and 213 arranged in a plate perpendicular to the optical axis A. The two-division photodetector 215 receives the reflected light beam R2 forming a light spot 218 on the photodetector 215, and comprises two light receiving surfaces 216 and 217 arranged in a plane perpendicular to an optical axis A.

The direction of the division lines dividing the light receiving surfaces 212 and 213, and the direction of the line dividing the light receiving surface 216 and 217 are parallel with the direction of the ridge 210 of the prism 209.

Each of the two-division photodetectors 211 and 215 is usually composed of a PIN photodiode with two anodes for the respective light receiving sections. An electrical signal S1 represents the sum of the signals produced from the light receiving surfaces 212 and 217, while an electrical signal S2 represent the sum of the signals produced from the light receiving surfaces 213 and 216.

A differential amplifier 219 determines the difference between the signals S1 and S2 to produce a focus error signal FES, which is fed through a phase compensation amplifier 220 and supplied to objective lens drive mechanisms 221 and 222.

The operation of the focus error detecting device shown in FIG. 16 will next be described with reference to FIG. 17 to FIG. 19. During recording and playback of information, the emitted light beam E from the semiconductor laser 201 is converted by the collimating lens 202 into a collimated light beam, which is reflected by the beam splitter 203 and directed toward the objective lens 204. The emitted light beam E is then focused by the objective lens 204 to form a focused spot 206 on the information recording surface 223. The reflected light beam R from the information recording surface 223 is passed through the objective lens 204 and the beam splitter 203, and is converged by the converging lens 208, and is then split by the roof-shaped prism 209 into the two light beams R1 and R2, which are incident on the two two-division photodetectors 211 and 215, respectively.

As shown in FIG. 17, the two-division photodetector 211 is so positioned that when the emitted light beam E is focused on the information recording surface 223 on the information recording medium 205, the reflected light beam R1 is focused on the two-division photodetector 211, and the focused spot 214 is formed on a division line between the light receiving surfaces 212 and 213. The two-division photodetector 215 is so positioned that when the emitted light beam E is focused on the information recording surface 223 on the information recording medium 205, the reflected light beam R2 is focused on the two-division photodetector 215, and the focused spot 218 is formed on a division line between the light receiving surfaces 216 and 217. Accordingly, when the emitted light beam E is focused on the information recording surface 223 of the information recording medium 205, the amounts of light received by the light receiving surfaces 212 and 213 are equal to each other and the amounts of light received by the light receiving surfaces 216 and 217 are equal to each other, so that the sum S1 of the outputs from the light receiving surfaces 213 and 216 and the sum S2 of the outputs from the light receiving surfaces 212 and 217 are equal to each other.

When the information recording medium 205 is closer to the objective lens 204 than the focal point, the reflected light beams R1 and R2 are incident on the two-division photo-detectors 211 and 215, respectively, before they are focused, as shown in FIG. 18. As a result, more part of the reflected light beam R1 is received by the light receiving surface 213 and less by the light receiving surface 212, and more part of the reflected light beam R2 is received by the light receiving surface 216 and less by the light receiving surface 217. The sum S1 of the outputs of the light receiving surfaces 213 and 216 is therefore larger than the sum S2 of the outputs of the light receiving surface 212 and 217. When the information recording medium 205 is farther from the objective lens than the focal point, the reflected light beams R1 and R2 are incident on the two-division photodetectors 211 and 215 after they are is focused, as shown in FIG. 19. As a result, more part of the reflected light beam R1 is received by the light receiving surface 212 and less by the light receiving surface 213, and more part of the reflected light beam R2 is received by the light receiving surface 217 and less by the light receiving surface 216. The sum S1 of the outputs of the light receiving surfaces 213 and 216 is therefore smaller than the sum S2 of the outputs of the light receiving surface 212 and 217.

The focus error signal FES can be obtained by determining the difference between the signals S1 and S2. The difference between S1 and S2 is zero when the distance between the information recording medium 205 and the objective lens 204 is appropriate, namely the focused spot 206 of the emitted light beam E is exactly on the information recording surface 223. The difference is positive (or negative) when the distance between the information recording medium 206 and the objective lens 206 is too short as shown in FIG. 18, and the difference is negative (or positive) when the distance between the information recording medium 206 and the objective lens 206 is too long as shown in FIG. 19.

FIG. 20 is a graph showing the relationship between the focus error Δf (Δf represents the distance between the focused spot 206 and the information recording surface 223) and the focus error signal FES. The focus error signal FES thus obtained is passed through the phase compensation amplifier 220 and fed to the objective lens drive mechanisms 221 and 222, and the focused spot 206 of the emitted light beam E is maintained on the information recording surface 223. As was stated earlier, the direction of the ridge 210 of the roof-shaped prism 209 is set at a direction substantially orthogonal to the direction (x direction) of a tangent of the guide groove 207 of the information recording medium 205. This is to minimize the effect of disturbances that may be introduced in the focus error signal FES when the focused spot 206 crosses the guide grooves 207 of the information recording medium 205. Further information on this subject is found is "Focus Sensing Characteristics of the Pupil Obscuration Method for Continuously Grooved Disks" by Irie, et al., Japan Journal of Applied Physics, vol. 26, pp. 183–186 (1987).

Consideration on the parameters of the optical components used in an optical disk device employing the above described focus error detecting device is given below. Assume that the information recording medium 205 is an optical disk of a diameter of 90 mm or 130 mm having guide grooves 207 at intervals of 1.6 μm. The numerical aperture NAobj of the objective lens 204 is normally set at 0.5 to 0.55. Let us assume that NAobj is 0.55 and the diameter φobj of the entrance pupil of the objective lens is 3 mm. The focus length fobj of the objective lens is given by:

$$fobj = (\phi obj/2)/NAobj \quad (1)$$
$$= (3/2)/0.55$$
$$= 3.3 (mm)$$

The diameter of the focused spot 206 on the information recording surface 223 is then 1 to 2 μm. The focus length fs of the converging lens 208 is often set at 10 to 20 times the fobj so that the diameter of the focused spots 214 and 218 on the photodetectors 211 and 215 is 10 to 50 μm. In the following explanation, fs is assumed to be 10 times fobj, i.e., 33 mm.

The optical distance d from the converging lens 208 to the roof-shaped prism 209 should be as short as possible. This is because the diameter of the light beam decreases with the distance from the converging lens 208, and as a result, the accuracy requirement on the position of the ridge 210 for splitting the reflected light beam R into semi-circular light beans R1 and R2 is more stringent. Because the ridge 210 is not perfectly formed of a sharp angle, the scattering at the ridge 210 increases and the amounts of light reaching the photodetectors 211 and 215 decreases as the light beam diameter decreases at the roof-shaped prism 209. Let us assume that d is fs/3, i.e., 11 mm. The diameter φp of the light beam at the position of the roof-shaped prism is given by:

$$\phi p = \phi obj * (fs - d)/fs \quad (2)$$
$$= 3.3 * (33 - 11)/33$$
$$= 2.2 (mm)$$

The position accuracy required of the ridge 210 in the x direction is on the order of 100 μm, which is practical. The deflection angle θ due to the roof-shaped prism 209 is related to the distance s between the division line between the light receiving surfaces 212 and 213 of the photodetector 211 (or the division line between the light receiving surfaces 216 and 217 of the photodetector 215) and the optical axis A, and the above-mentioned d and fs, as follows:

$$\theta = s/(fs-d) \quad (3)$$

The distance s cannot be made large since the photodetectors 211 and 215 are normally in a common package, and is normally 0.2 to 0.5 mm. Here it is assumed that s is 0.3 mm. Then, $$\theta = 0.3/(33-11) = 13.6 \text{ (mrad)} \quad (4)$$

When θ is sufficiently small, the vertex angle 2φ of the ridge 210 is related to φ as follows:

$$\theta = \text{Arcsin}\{n * \sin(\pi/2 - \phi)\} - (\pi/2 - \phi) \quad (5)$$
$$= n * (\pi/2 - \phi) - (\pi/2 - \phi)$$
$$= (n - 1) * (\pi/2 - \phi)$$

If the index of refraction n of the glass forming the roof-shaped prism is assumed to be 1.5, which is a typical value, then φ is given by:

$$\phi = \pi/2 - \{\theta/(n - 1)\} \quad (6)$$
$$= \pi/2 - \{0.0136/0.5\}$$
$$= 1.54359 \quad (rad)$$
$$= 88.44 \quad (degrees)$$

The vertex angle 2φ is therefore 176.88 degrees.

Since the conventional focus error detecting device is configured as described above, the roof-shaped prism 209 must be so polished that its ridge must be as sharp as possible, being rounded as less as possible, even though its vertex angle is nearly 180 degrees (176 to 178 degrees), and the accuracy in the position of the ridge must be on the order of 100 μm or less. Such polishing requires time and skill, and the cost of the roof-shaped prism is therefore high.

PRIOR ART EXAMPLE 4

FIG. 22 is an exploded view showing a conventional device for adjusting the inclination angle of an optical means, such as an objective lens shown in Japanese Patent Kokai Publication No. S59-223,953. FIG. 23 is a sectional view of the device shown in FIG. 22. As illustrated, an objective lens 301 having an optical axis 308 and a focal point 309 is mounted on a drive device 302 for the objective lens 301. The drive device 302 comprises a lens holder, focusing coil, a focusing magnet, tracking coils, and tracking magnets, not specifically illustrated. A convex spherical surface 310 formed on the bottom surface of the drive device 302 is received by a concave spherical surface 311 formed on the upper surface of an optical block 303, so that the objective lens driving device 302 is mounted on the optical block 303 in such a manner that it can be rotated about the center of the spherical surfaces 310 and 311. Coil springs 312a and 312b are compressed between heads of screws 306c and 306d and downward-facing surfaces around through-holes in the optical block when the screws 306c and 306d are threaded into the driving device 302, so that the coils springs 312a and 312b resiliently pull the driving device 302 toward the optical block 303. Coil springs 304a and 304b on the other hand are compressed between upward-facing surfaces around throughholes in the optical block 303 and a lower surface of the driving device 302 when screws 306a and 306b are threaded into the driving device 302, so that the coils springs 304a and 304b resiliently push up the driving device 302 farther away from the optical block 303. The spherical surfaces 310 and 311 slide against each other. The screws 306a and 306b are used for adjustment, and by turning the screws 306a and 306b the inclination of the objective lens 301 can be adjusted.

A problem associated with the above-described prior art optical means inclination angle adjusting device described above is the complicated structure and a large number of parts, which form an obstacle to miniaturization and thickness reduction. Moreover, since spherical surfaces are formed, the freedom of design is limited. Furthermore, fixing after the inclination angle adjustment is achieved by the use of an adhesive, but as the weight of the part held by the adhesive is large, the entire objective lens drive device vibrates during access, and a pull-in to the target track requires time, so that the access time cannot be shortened.

PRIOR ART EXAMPLE 5

FIG. 24 to FIG. 26 show another conventional optical disk device shown in Japanese Patent Application Kokai Publication No. H4-243021.

The optical head 401 of this example is formed of an objective lens assembly 402 and a carriage 403. The objective lens assembly 402 comprises an objective lens 404, an objective lens actuator 405, a mirror 406, and a spherical convex surface 408 formed at the center of a bottom plate 407 and composed of part of a sphere centered on the center of the objective lens 404.

Provided on the upper surface 411 of a box part 410 of the carriage 403 is a mount 412 having a spherical concave surface.

Adjustment of the angle to make the optical axis 414 of the objective lens 404 perpendicular to the surface of the optical disk 415 is achieved by tightening or loosening a screw 413, which is passed through the box part 410 of the carriage 403 and threaded into the bottom plate 407. The screw 413 can be tightened or loosened by the use of a driver, not shown, which may be inserted through an opening 418 formed in a chassis base 417 of a main body 416 of the optical disk device. As the screw 413 is tightened or loosened the objective lens assembly 402 rotates about the center of the objective lens 404, with the spherical convex surface 408 sliding against the spherical concave surface 412.

An adhesive 420 is applied between the spherical convex surface 408 and the mount 412 to bond the bottom surface 407 to the mount 412 after the adjustment of the angle.

The angle of the optical axis 414 corresponds to the angle adjusted by the screw 413. But the angle adjusted by the screw 413 cannot be accurately known, so that to what extent the screw 413 is to be rotated is decided on experience. Achieving the adjustment with a high accuracy requires skill and is therefore difficult.

Moreover, since a screw is needed for adjustment of the angle, a separate screw cannot be used for fixing the objective lens assembly after the angle adjustment, because such a use of an additional screw may vary the angle. Accordingly, an adhesive material is used for the fixing. As a result, re-adjustment after the fixing is not possible even if such re-adjustment becomes necessary.

Moreover, the reliability and fixing power of the adhesive material is relative low compared with fixing by screws, so that undesirable resonance is induced in the focusing and tracking control systems. This is explained with reference FIG. 25. For the purpose of considering the vibration characteristics of the optical head, the adhesive 420 may be expressed as a combination of a spring element 420a and a damping element 420b, as illustrated in FIG. 25. In a focus control system for driving the lens 404 in the direction of arrow F, the adhesive material 420 acts as a spring element 420a, and an undesirable resonance of a frequency f1 shown in FIG. 26 is induced.

PRIOR ART EXAMPLE 6

FIG. 27 and FIG. 28 show another conventional objective lens drive device described in Japanese Patent Application Kokoku Publication No. S63-53618, as a prior art therein.

As illustrated, it comprises a base 501 formed of a magnetic material and supporting the lower end of a shaft 502. The end of the shaft 502 is journaled by a bearing cylinder 503. The shaft 502 and the bearing cylinder 503 form a plain bearing. The bearing cylinder 503 is fixed to a supporting cylinder 504. The supporting cylinder 504 has a top wall 504a holding an objective lens 505, and a cylindrical wall 504b to which a focusing coil 506 and tracking coils 507 are fixed. A permanent magnet 510 is bonded to the base 501 and an outer yokes 509a and 509b bonded to the permanent magnet 510.

A pin 511 extends upward from the upper surface of the base 501, and the upper end of the pin 511 is coupled to the bearing cylinder 503 by means of a damper member 512 formed of rubber or the like. The damper 512 is used for setting the neutral position. An aperture 513 is provided for permitting passage of light incident on the objective lens 505.

The operation will next be described. By supplying a current to the focusing coil 506, the supporting cylinder 504 is moved in the y direction in FIG. 27, and the focus control is thereby achieved.

The conventional objective lens drive device described above is associated with the following problem. That is, the shaft 502 and the bearing cylinder 503 form a plain bearing, so that a force of friction is created between the shaft 502 and the bearing cylinder 503 during driving for focus control and tracking control. The force of friction acts as a non-linear element in the control system, which may degrade the stability of the control system.

Moreover, because of the relative sliding motion between the shaft 502 and the bearing cylinder 503, particles due to wear may be created, which may give adverse effects to the optical system including the objective lens and the optical disk. The wear may also shorten the life of the plain bearing parts.

SUMMARY OF THE INVENTION

An object of the invention is to provide an optical disk device wherein groove interference signals are removed from the focus error signals.

Another object of the invention is to enlarge the linear zone without enlarging the width of the division line of the two-division photodetector, and to thereby improve the stability of the focus control system and to avoid the degradation of the high-frequency characteristics of the two-division photodetector.

Another object of the present invention is to provide a focus error detecting device which is stable in operation and which is efficient.

Another object of the invention is to provide a focus error detecting device which is less costly.

Another object of the invention is to provide an optical means inclination angle adjustment device with which the inclination of the objective lens alone can be adjusted, and the number of parts is reduced, and undesired vibration during access is restrained.

Another object of the invention is to provide an optical disk device in which the the adjustment of the angle of the optical axis of the objective lens is easy, and the frequency characteristics is improved and reliable.

Another object of the invention is to provide an objective lens drive device which is not associated with friction, and is therefore not associated with particles due to wear, and the resultant problem in the optical system or the life of the device.

According to a first aspect of the invention, there is provided an optical disk device for recording or playing back information on or from an optical information recording medium having land parts forming information tracks and groove parts interposed between adjacent land parts, comprising:

means for illuminating the land part of the optical information recording medium with a first light spot, and illuminating the groove part of the optical information recording medium with a second light spot;

means for producing a first focus error signal in accordance with the reflected light beam of said first light spot, and means for producing a second focus error signal in accordance with the reflected light beam of said second light spot; and means for performing focus control in accordance with the first and second focus error signals.

According to another aspect of the invention, there is provided an optical disk device for recording or playing back information on or from an optical information recording medium having land parts forming information tracks and groove parts interposed between adjacent land parts, comprising:

means for illuminating the land parts of the optical information recording medium with a plurality of first light spots, and illuminating the groove parts of the optical information recording medium with another plurality of second light spots;

means for producing first focus error signals in accordance with the reflected light beams of said first and second light spots;

means for performing focus control in accordance with the focus error signals; and means for performing parallel recording or parallel playback in accordance with the first light spots on said land parts.

According to another aspect of the invention, there is provided an optical disk device for recording or playing back information on or from an optical information recording medium having land parts forming information tracks and groove parts interposed between adjacent land parts, comprising:

means for illuminating the optical information recording medium with a plurality of light spots, said illuminating means comprising a light beam splitting means including a diffraction grating for splitting the light beam to form said plurality of light spots;

means for rotating said light beam splitting means to adjust the positions of said light spots;

means for producing focus error signals responsive to reflected light beams of said light spots; and means for performing focus control in accordance with the focus error signals.

According to another aspect of the invention, there is provided an optical disk device for recording or playing back information on or from an optical information recording medium having land parts forming information tracks and groove parts interposed between adjacent land parts, comprising:

means for illuminating the land part of the optical information recording medium with at least one light spot, and illuminating the groove parts of the optical information recording medium with at least two light spots;

means for producing focus error signals and a tracking error signal responsive to reflected light beams of said light spots;

means for performing focus control in accordance with the focus error signals; and means for performing tracking control in accordance with the tracking error signal.

According to another aspect of the invention, there is provided a focus error detecting device for detecting a focus error of light beam from a light source and focused onto an information recording medium, comprising:

an obscuration means for obscuring part of a reflected light beam from the information recording medium;

a two-division photodetector having first and second light receiving sections each producing an output signal responsive to the amount of light which it receives, said light receiving sections being separated from each other at a division band region, and said photodetector being so disposed as to receive the light from the obscuration means at the division band region; and means for producing a focus error signal in accordance with the output signals from said first and second light receiving sections;

wherein each of said light receiving sections has an array of tapered projections along its edge in said division band region, and the tapered projections of the light receiving sections are interdigitated with each other.

According to another aspect of the invention, there is provided a focus error detecting device for detecting a focus error of light beam from a light source and focused onto an information recording medium, comprising:

an obscuration means for obscuring part of a reflected light beam from the information recording medium; a two-division photodetector having first and second light receiving sections each producing an output signal responsive to the amount of light which it receives, said light receiving sections being divided at a division band region, and said photodetector being so disposed as to receive the light from the obscuration means at the division band region; and means for producing a focus error signal in accordance with the output signals from said first and second light receiving sections;

said first and second light receiving sections each having a main part having an edge coincident with an edge of the division band region;

strings of minute light receiving areas each extending from the edge of the main part of one of said said first and second light receiving sections toward the edge of the main part of the other of said first and second light receiving sections;

each string consisting of a group of minute light receiving areas connected by a connecting line which is connected to the edge of the main part of either of the first and second light receiving sections;

strings connected by the connection line to the edge of the main part of the first light receiving section and the strings connected by the connection line to the edge of the main part of the second light receiving section being arranged alternately;

the size of the minute light receiving areas of each string having a tendency to decrease with the distance from the edge of the main part of the first or second light receiving sections to which the particular string is connected.

According to another aspect of the invention there is provided a focus error detecting device for detecting a focus error of light beam from a light source and focused onto an information recording medium, comprising:

an obscuration means for obscuring part of a reflected light beam from the information recording medium;

a two-division photodetector having first and second light receiving sections each producing an output signal responsive to the amount of light which it receives, said light receiving sections being divided at a division band region, and said photodetector being so disposed as to receive the light from the obscuration means at the division band region;

means for producing a focus error signal in accordance with the output signals from said first and second light receiving sections;

said first and second light receiving sections each having a main part having an edge coincident with an edge of the division band region; and first and second groups of light receiving stripes extending in a direction parallel with the edges or the main parts of said first and second light receiving sections;

said first groups of stripes connected to the first light receiving section;

said second groups of stripes connected to the second light receiving section;

the width of each of the stripes of said first group being reduced with the distance from the main part of the first light receiving section; and the width of each of the stripes of said second group being reduced with the distance from the main part of the second light receiving section.

According to another aspect of the invention, there is provided a focus error detecting device for detecting a focus error of light beam from a light source and focused onto an information recording medium, comprising:

a splitting means for splitting a reflected light beam from the information recording medium to produce a plurality of split light beams;

a plurality of two-division photodetectors disposed to receive the split light beams respectively at their division line, and so positioned that the split light beams are focused on their light receiving areas when the illuminating light beam is focused on the information recording medium, said photodetectors producing output signals in accordance with the received light;

means for producing a focus error signal in accordance with output signals from said plurality of photodetectors;

wherein said splitting means comprises a diffraction grating part bounded by a line dividing the reflected light beam, and producing a first one of said split light beams which results from part of the reflected light beam incident on the diffraction grating part, and a second one of said split light beams which results from another part of the reflected light beam not incident on the diffraction grating part.

According to another aspect of the invention, there is provided a focus error detecting device according to claim 23, wherein said splitting means is of a plane-type and said splitting means further comprises a non-diffraction grating part adjacent to said diffraction grating part and separated from said diffraction grating part by said dividing line, said another part of the reflected light beam not incident on the diffraction grating part being incident on said non-diffraction grating part to produce said second one of said split light beams.

According to another aspect of the invention, there is provided an optical means inclination angle adjusting device for adjusting the optical axis of an optical means having an optical axis and a peripheral portion held by a holder, comprising:

an annular plate inserted between said optical means and said holder, said annular plate being in alignment with the peripheral portion of the optical means, and having an opening with an axis in alignment with the optical axis of the optical means, to permit passage of light through the opening of said annular plate and through the optical means;

a first pair of projections formed between said annular plate and said optical means and disposed diametrically opposite to each other with respect to said optical axis; and a second pair of projections formed between said annular plate and said holder disposed diametrically opposite to each other with respect to the optical axis;

said first pair of projections and said second pair of projections being disposed at different rotary angles about said optical axis;

whereby the inclination angle is adjusted by rotating the optical means about said first pair of projections or about said second pair of projections.

According to another aspect of the invention, there is provided an optical disk device comprising:

an optical means held by a holder;

a frame;

a supporting shaft having a first end fixed to said frame and supporting said holder in such a manner that the holder is slidable along the shaft and rotatable about the shaft;

a supporting plate fixed to said frame and holding the other end of said supporting shaft;

wherein said supporting plate is movable relative to said frame laterally with respect to the supporting shaft, to thereby adjust the angle of the supporting shaft relative to said frame, and to thereby adjust the inclination angle of the optical means.

According to another aspect of the invention, there is provided an objective lens drive device mounted in a optical disk device for optically recording or playing back information on an optical disk and controlling the position of a light spot formed on the optical disk, comprising:

an objective lens for focusing a light beam onto the optical disk;

a supporting shaft;

a lens holder rotatable about said supporting shaft, and holding the objective lens at a position off an axis of said supporting shaft, in such a manner that an optical axis of said objective is parallel with said axis of said supporting shaft;

first and second plate springs having inner edges fixed to the supporting shaft and having outer edges fixed to the lens holder and disposed at different positions along the length of the support shaft;

means for driving said holder in the direction of the length of the supporting shaft for focus control; and means for rotating said holder about said axis of said support shaft for tracking control;

whereby said first and second plate springs are bent when the holder is moved in the direction of the length of the supporting shaft; and said first and second plate springs are twisted when the holder is rotated about the support shaft.

These and other objects of the present invention will become more readily apparent from the detailed description given hereinafter. However, it should be understood that the detailed description and specific examples, while indicating preferred embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitive of the present invention and wherein.

DETAILED DESCRIPTION OF THE PREFERRED EMBODIMENTS

Embodiment A1

Figure 1:
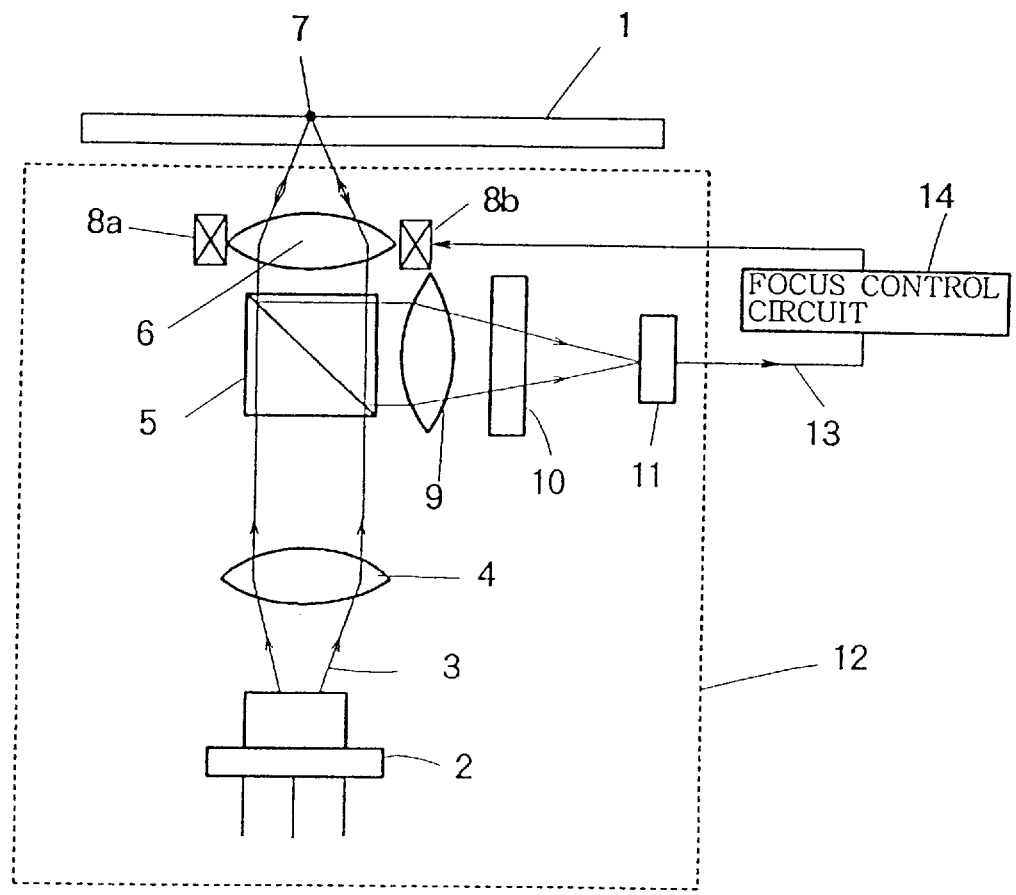
FIG. 1 is a schematic diagram showing a part of an optical disk device of a Prior Art Example 1.
Figure 2:
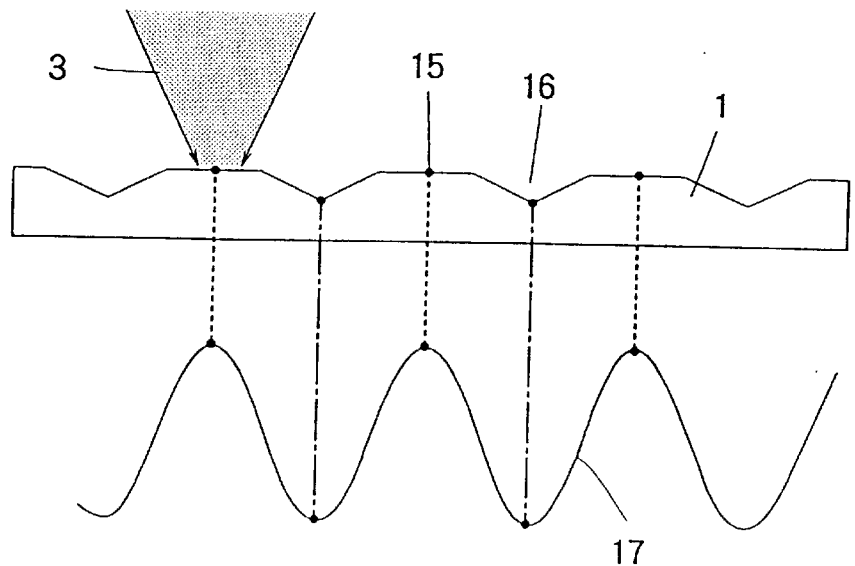
FIG. 2 is a schematic diagram showing the relationship between the information tracks of an optical disk device in the prior art and groove interference signals of the respective light spots.
Figure 3:
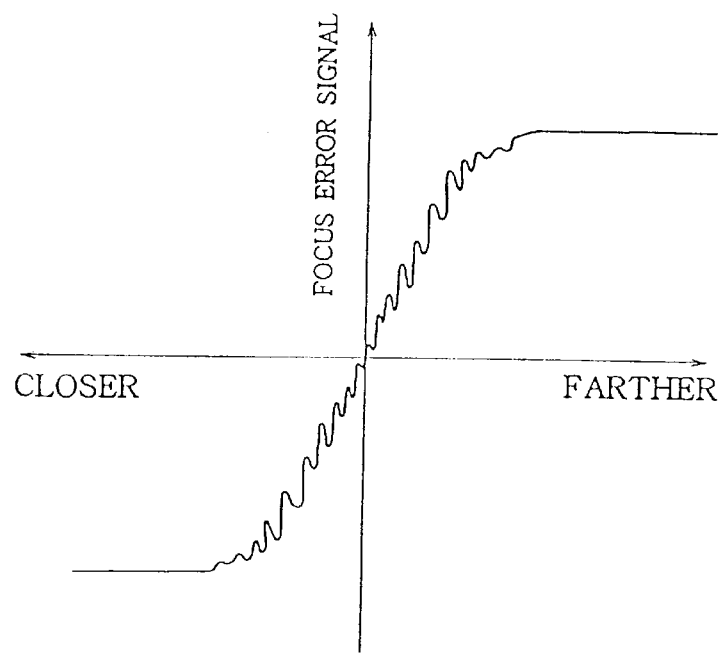
FIG. 3 is a graph showing a focus error signal produced in Prior Art Example 1.
Figure 4:
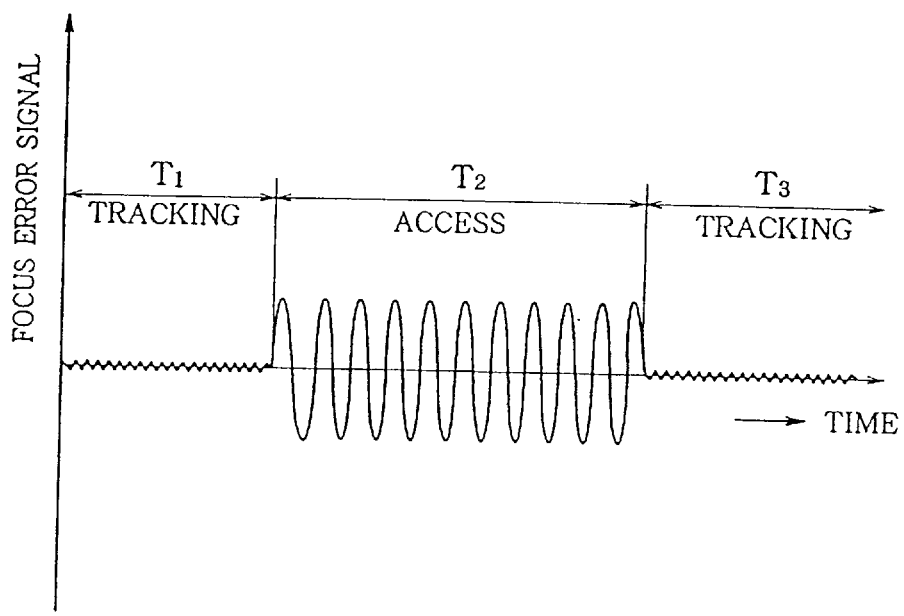
FIG. 4 is a diagram showing a focus error signal produced in Prior Art Example 1.
Figure 29:
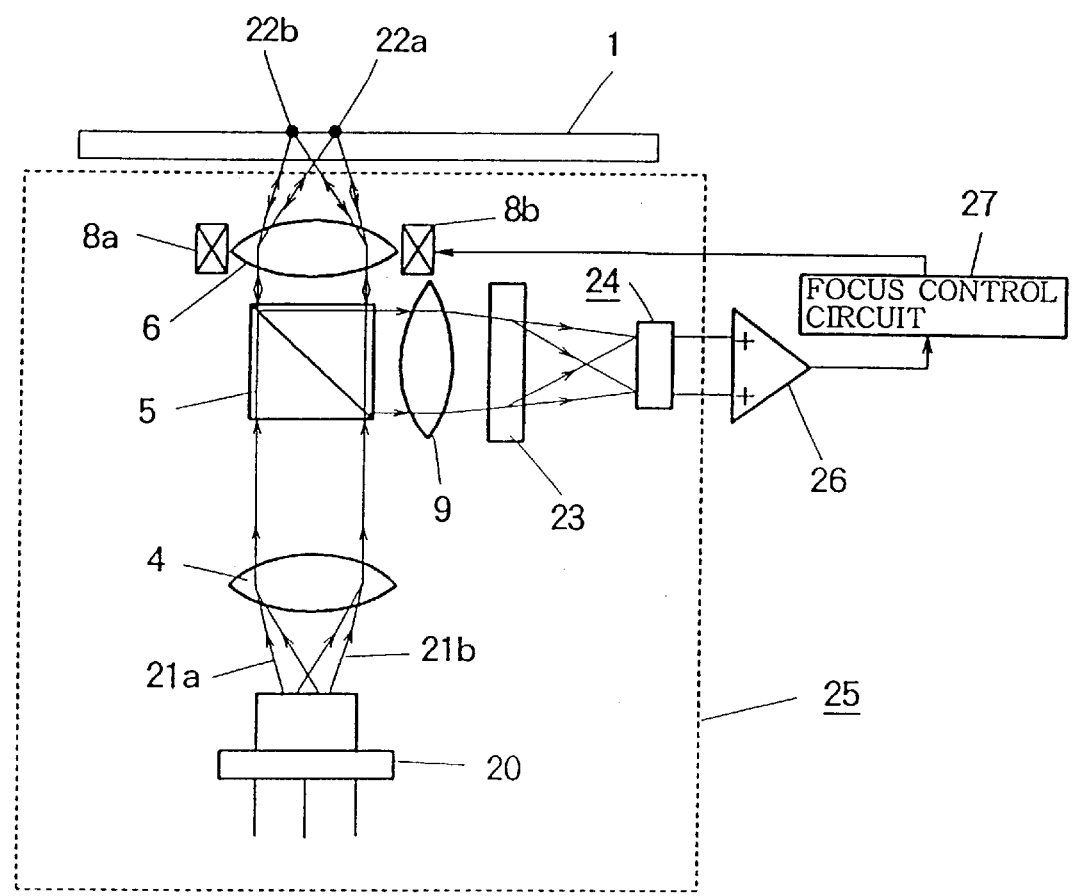
FIG. 29 is a schematic diagram showing a part of an optical disk device of Embodiment A1 of the present invention.
Figure 30:
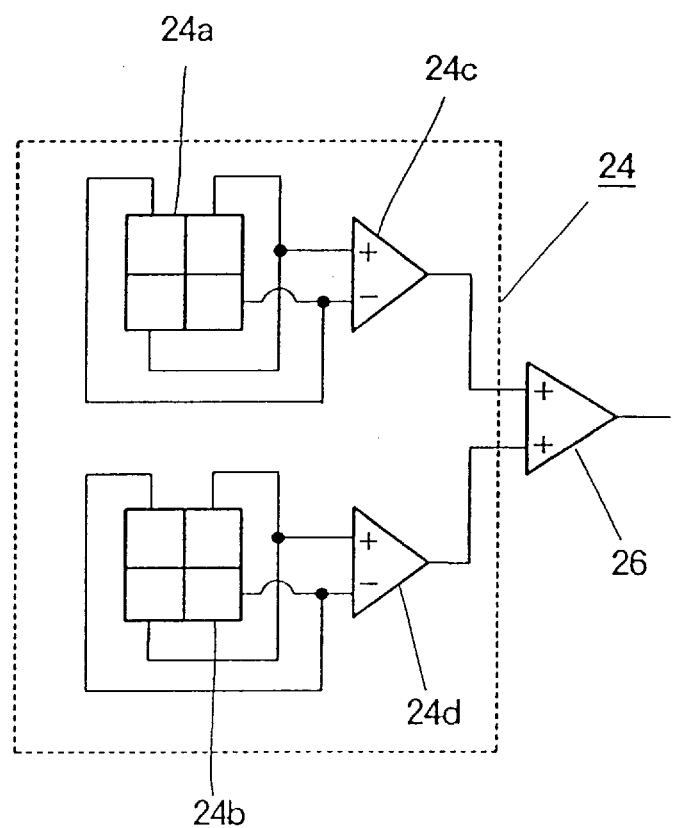
FIG. 30 is a detailed view of a photodetector in FIG. 29.
Figure 31:
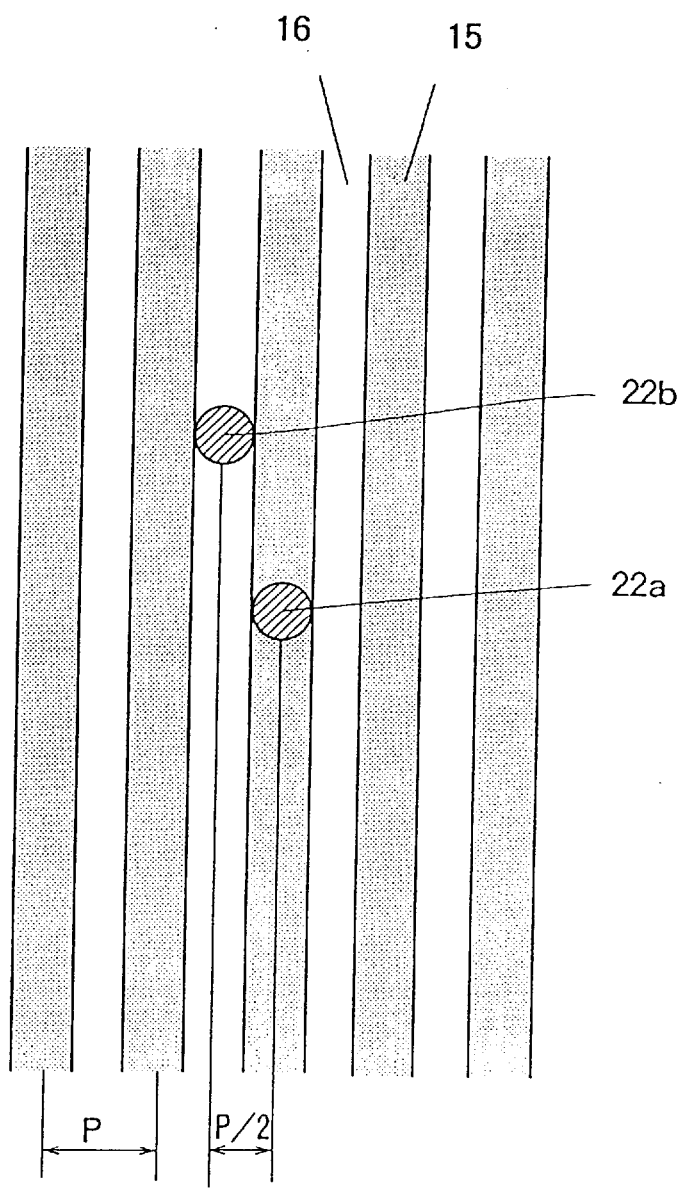
FIG. 31 is a schematic diagram showing the positions of the light spots on the information recording medium in Embodiment A1.
Figure 32:
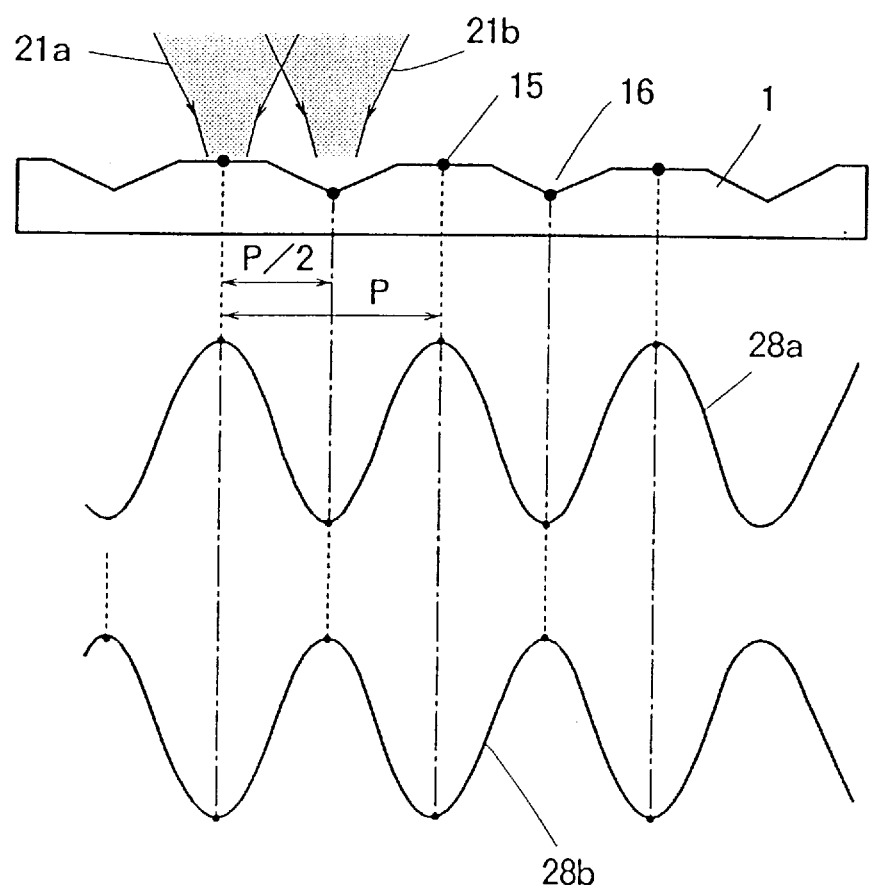
FIG. 32 is a schematic diagram showing the relationship between the information tracks of an optical disk device in Embodiment A1 and groove interference signals of the respective light spots.
Figure 33:
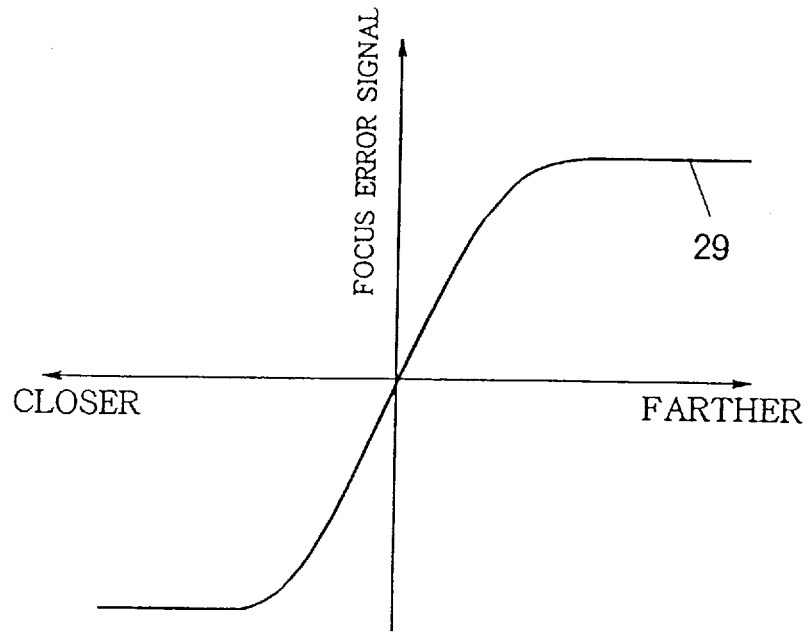
FIG. 33 is a graph showing the focus error signal after the calculation in the optical disk device of Embodiment A1.
Figure 34:
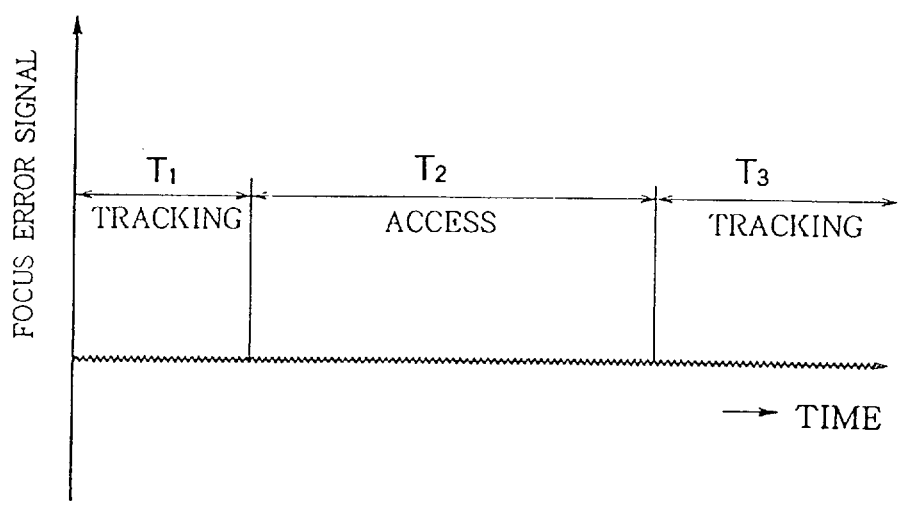
FIG. 34 is a diagram showing the focus error signal during track access and during tracking.

FIG. 29 shows a schematic diagram showing a part of an optical disk device of an embodiment, Embodiment A1, of the invention. FIG. 30 shows details of a photodetector assembly 24 in FIG. 29. FIG. 31 is a schematic diagram showing the relative position of each of optical spots on information tracks in the embodiment of FIG. 29. FIG. 32 is an enlarged view showing the relationship between the information tracks and the groove interference of each light spot. FIG. 33 shows a focus error signal after the calculation. FIG. 34 shows the focus error signal during track access. The members or items identical or corresponding to those in the prior art of FIG. 1 are denoted by identical reference numerals.

A semiconductor laser emits two light beams 21a and 21b, which are converged by an objective lens 6 to form two light spots 22a and 22b. The light spots 22a and 22b are separated, in the lateral direction of the information tracks, from each other by P/2 which is one half the track pitch P of the information tracks on the optical disk 1.

A detecting optical element 23, formed of a cylindrical lens or the like, detects the focus error. A photodetector assembly 24 is formed of four-division photo-detectors 24a and 24b, and differential amplifiers 24c and 24d. An optical head device section 25 is formed of the semiconductor laser 20, the objective lens 6, the photodetector assembly 24, and the like. An adder 26 adds the focus error signals from the photodetector assembly 24. A focus control circuit 27 is connected to receive the output of the adder 26.

The operation will next be described. It is first assumed that the intensities of the light spots 22a and 22b are equal. When the light spots 22a and 22b cross an information track as shown in FIG. 32, groove interference signals 28a and 28b are produced and introduced in the signals produced at the outputs of the differential amplifiers 24c and 24d. However the groove interference signals 28a and 28b due to the light spots 22a and 22b are 180° out of phase from each other, and have identical waveforms with identical amplitudes. This is because the period of the groove interference signal corresponds to the pitch of the information tracks, and the light spots 22a and 22b are separated by half the pitch of the information track in the direction perpendicular to the information tracks. By adding, at the adder 26, the signals output from the differential amplifiers 24c and 24d of the photodetector assembly 24, a focus error signal from which the groove interference signals are removed is obtained at the output of the adder 26, as shown in FIG. 33. Accordingly, even in the T2 region which corresponds to the period in which access to a target information track is made, the focus error signal free from the groove interference signals is obtained.

Embodiment A2

Figure 35:
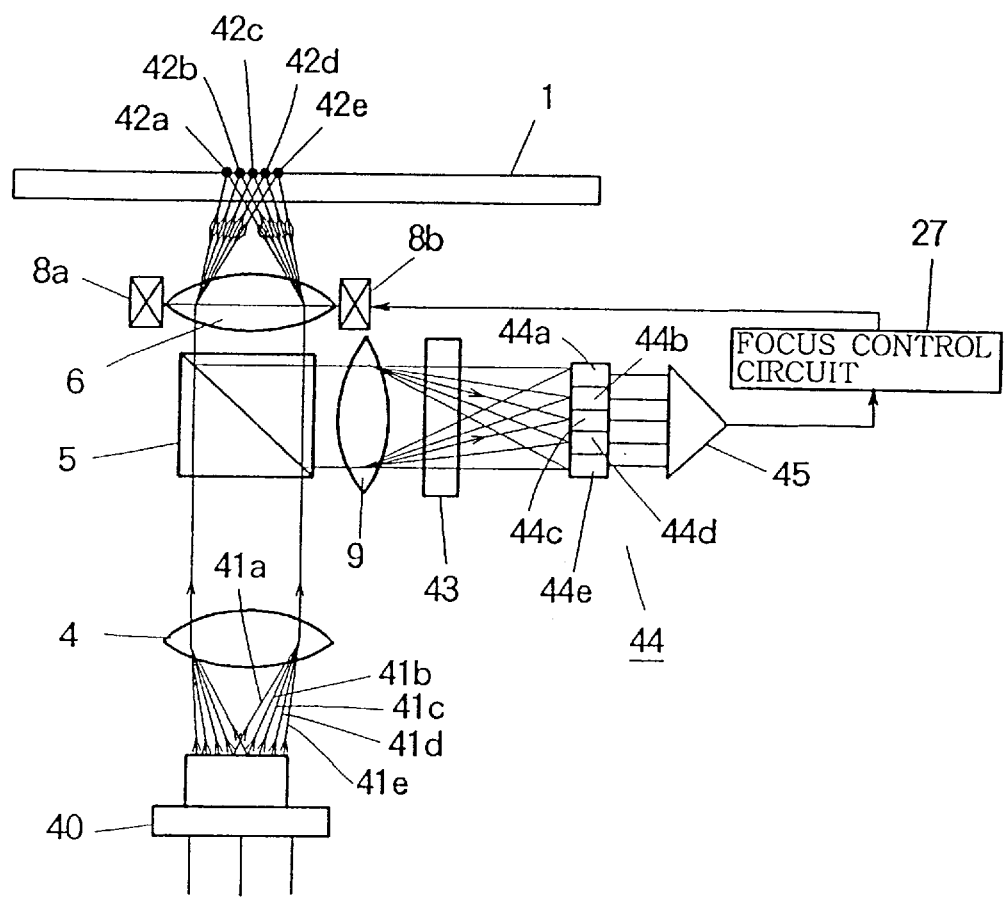
FIG. 35 is a schematic diagram showing a part of an optical disk device of Embodiment A2.
Figure 36:
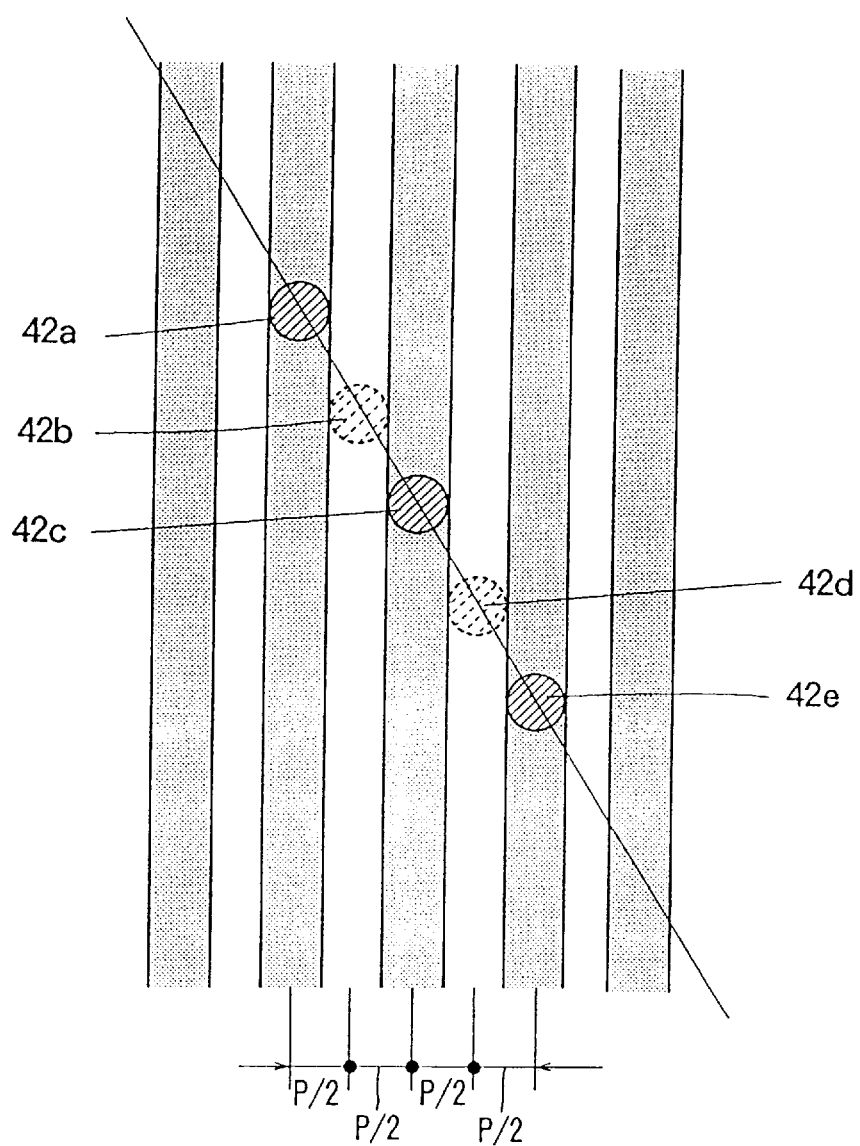
FIG. 36 is a schematic diagram showing the positions of the light spots on the information recording medium in Embodiment A2.

FIG. 35 shows a schematic diagram showing a part of the optical disk device of another embodiment, Embodiment A2. FIG. 36 is a schematic diagram showing the array of light spots on the information tracks in Embodiment A2. Members or items identical or corresponding to those in the Prior Art Example 1 of FIG. 1 or Embodiment A1 are denoted by identical reference numerals.

A semiconductor laser 40 emits three or more light beams 41a, 41b, 41c, 41d and 41e, which are converged by the objective lens 6 to form an array of light spots 42a, 42b, 42c, 42d and 42e. The adjacent pairs of light spots are separated from each other, in the lateral direction of the information tracks, by P/2 which is one half the pitch P of the information tracks on the optical disk 1. An optical detecting element 43 formed of a cylindrical lens or the like detects the focus error of the light spots 42a, 42b, 42c, 42d and 42e. A photodetector assembly 44 comprises four-division photodetectors 44a, 44b, 44c, 44d and 44e to receive the light beams 41a, 41b, 41c, 41d and 41e and differential amplifiers (not shown, but connected to the respective photodetectors 44a to 44e in the same way as the differential amplifiers 24c and 24d are connected to the optical detector light receiving sections 24a and 24b).

In Embodiment A2 shown in FIG. 35 and FIG. 36, parallel recording and parallel playback can be performed by the use of the light spots 42a, 42c, 42e converged onto the land parts of the adjacent information tracks, while the light spots 42b and 42d converged onto the groove parts are 180° out of phase from each other, so that the focus error signals obtained from the light spots converged onto the land parts, and the focus error signals obtained from the light spots converted onto the groove parts are selectively calculated on by the arithmetic processing unit 45, and the groove interference error is thus removed from the focus error signal. The calculation performed by the arithmetic processing unit 45 may be multiplication with respective coefficients and addition to remove the groove interference signals. This is because the groove interference signals obtained from the light spots separated by P/2 are 180° out of phase from each other so that they cancel each other when added, while the focus error signals obtained from the light spots separated by P/2 are of the same phase, and are therefore not canceled.

Embodiment A3

Figure 37:
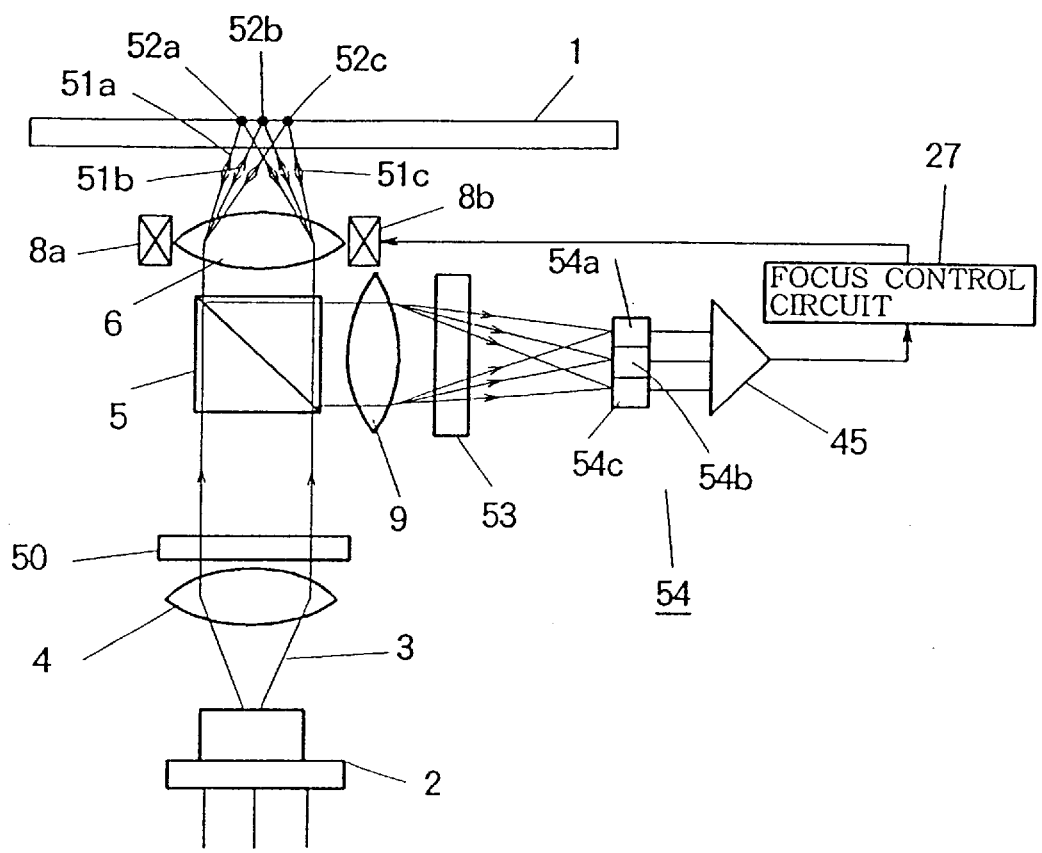
FIG. 37 is a schematic diagram showing a part of an optical disk device of Embodiment A3.
Figure 38:
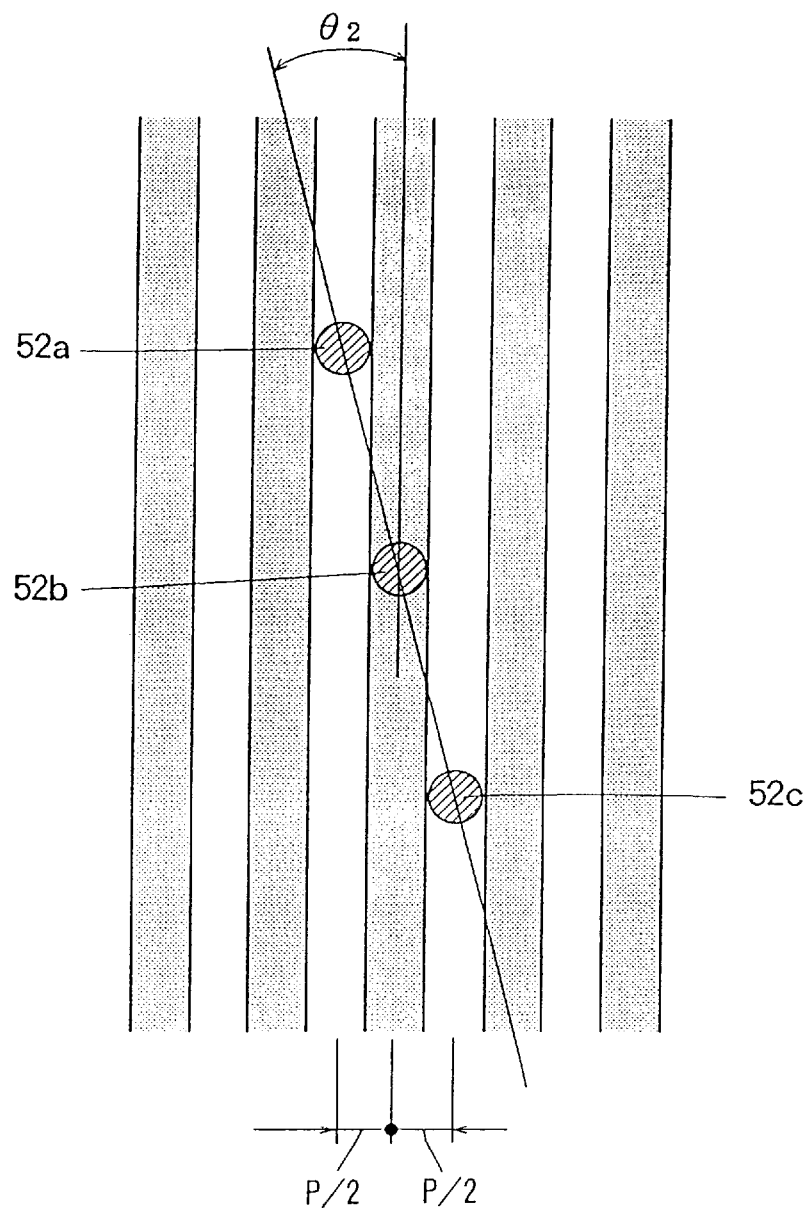
FIG. 38 is a schematic diagram showing the positions of the light spots on the information recording medium in Embodiment A3.

FIG. 37 is a schematic diagram showing a part of the optical disk device of another embodiment, Embodiment A3. FIG. 38 is a schematic diagram showing the array of light spots on the information tracks in Embodiment A2. Members or items identical or corresponding to those in Prior Art Example 1 of FIG. 1, Embodiment A1 or Embodiment A2 are denoted by identical reference numerals.

A diffraction grating 50 splits the light beams 3 from a semiconductor laser 2 into three light beams 51a, 51b and 51c, which are converged by the objective lens 6 to form an array of light spots 52a, 52b and 52c. The adjacent pairs of light spots are separated from each other, in the lateral direction of the information tracks, by P/2 which is one half the track pitch P of the information tracks on the optical disk 1. An optical detecting element 53 formed of a cylindrical lens or the like detect the focus error of the light spots 52a, 52b and 52c. A photodetector assembly 54 comprises four-division photodetectors 54a, 54b and 54c to receive the light beams 51a, 51b and 51c and differential amplifiers (not shown, but connected to the respective photodetectors 54a to 54c in the same way as the differential amplifiers 24c and 24d are connected to the optical detector light receiving sections 24a and 24b).

In Embodiment A3 shown in FIG. 37 and FIG. 38, the groove interference signal relating to the light spot 52b for convergence on the land part and the groove interference signals relating to the light spots 52a and 52c for convergence on the groove parts are 180° out of phase from each other. The calculation, e.g., multiplication with suitable coefficients and addition, is made by the arithmetic processing circuit 45 on the outputs of the optical detection section 54 in taking account of the ratio of the light strength of the light spots 52a, 52b and 52c which are dependent on the shape of the diffraction grating, and the like. The groove interference signals are thereby removed from the focus error signal. The distances between the light spots 52a, 52b and 52c are determined by the shape of the diffraction grating. The relative positions of the light spots 52a, 52b and 52c with respect to the information tracks can be adjusted by rotating the diffraction grating.

Embodiment A4

Figure 39:
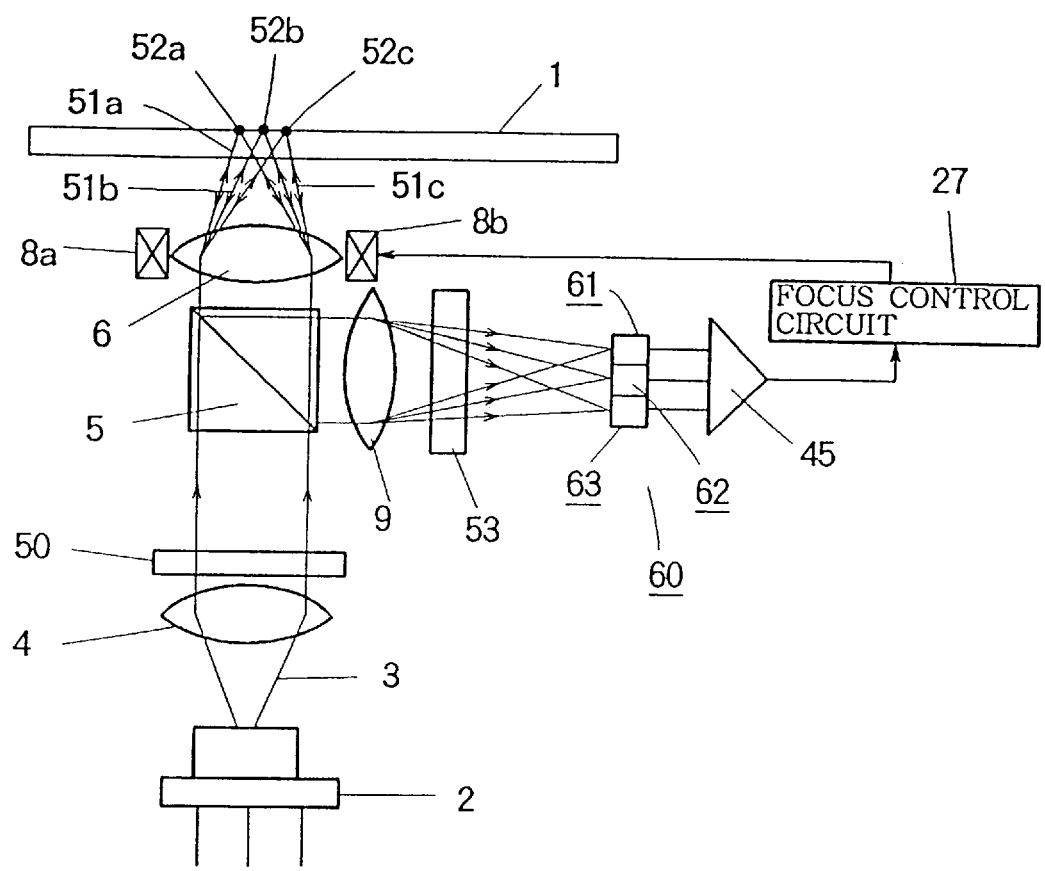
FIG. 39 is a schematic diagram showing a part of an optical disk device of Embodiment A4.
Figure 40:
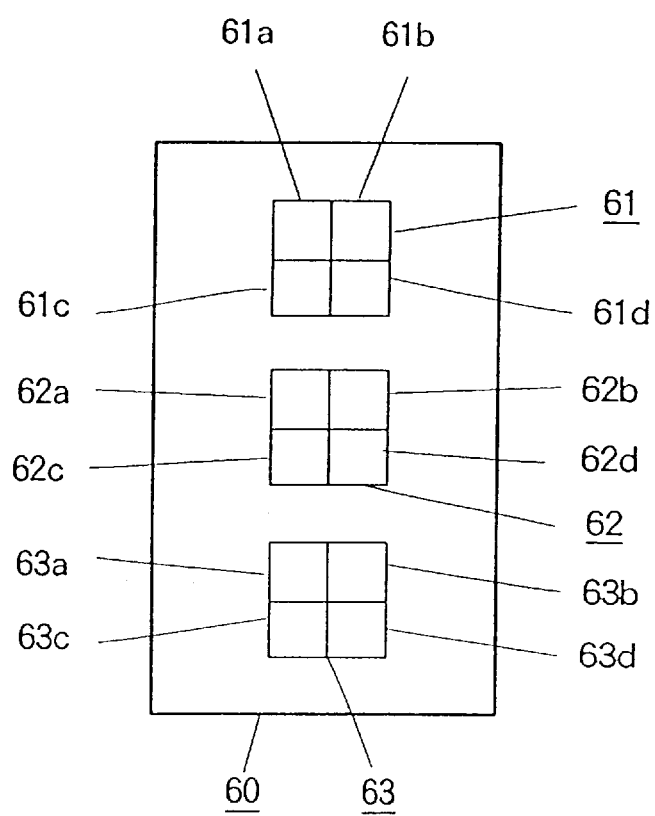
FIG. 40 is a detailed view or a photodetector in FIG. 39.

FIG. 39 is a schematic diagram showing a part of an optical disk device of another embodiment, Embodiment A4. FIG. 40 shows details of the optical detector section in FIG. 39. Members or items identical or corresponding to those in Prior Art Example 1 of FIG. 1 and Embodiment A1 to Embodiment A3 are denoted by identical reference numerals.

A photodetector assembly 60 comprises four-division photodetectors 61, 62 and 63 for detecting the light beams 51a, 51b and 51c, and differential amplifiers (not shown, but connected to the respective photodetectors 61 to 63 in the same way as the differential amplifiers 24c and 24d are connected to the photodetector light receiving sections 24a and 24b).

As shown in FIG. 40, each of the photodetectors 61, 62 and 63 has four-equally divided light receiving surfaces or sections 61a to 61d, 62a to 62d or 63a to 63d. When a suitable coefficient G is selected, then the tracking error of the light spots 52a, 52b and 52c relative to the information track on the optical disk 1 can be determined by the so-called push-pull method disclosed in Japanese Patent Kokai Publication No. S61-94246 in accordance with the following equation:

Tracking error signal=$(62a+62b-62c-62d)-G(61a+61b-61c-61d+63a+63b-63c-63d)$

In the above equation G is a coefficient that may be selected suitably. Similarly, if a suitable coefficient K is selected, the focus error of the light spots 52a, 52b and 52c relative to the information track on the optical disk 1 can be determined in accordance with the following equation:

Focus error signal=$(62a-62b-62c+62d)-K(61a-61b-61c+61d+63a-63b-63c+63d)$

In the above equation, K is a coefficient that may be suitably selected.

Embodiment A5

Figure 41:
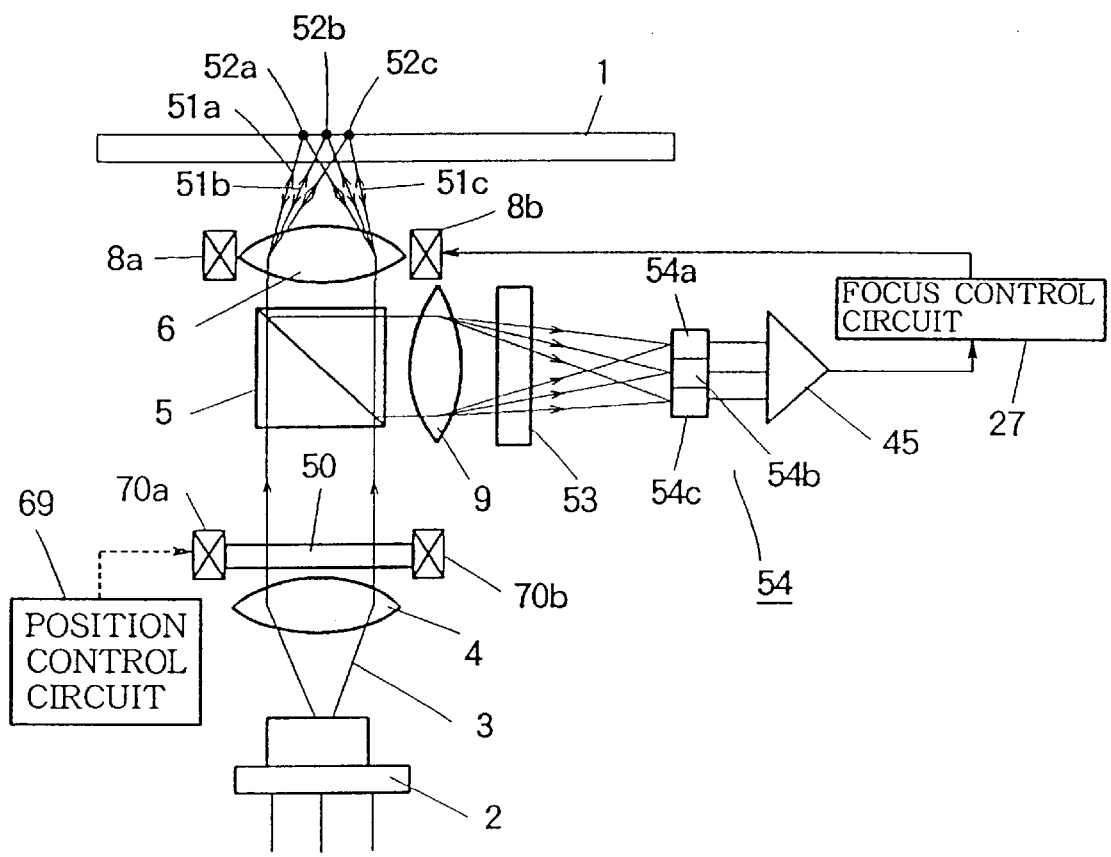
FIG. 41 is a schematic diagram showing a part of an optical disk device of Embodiment A5.
Figure 42:
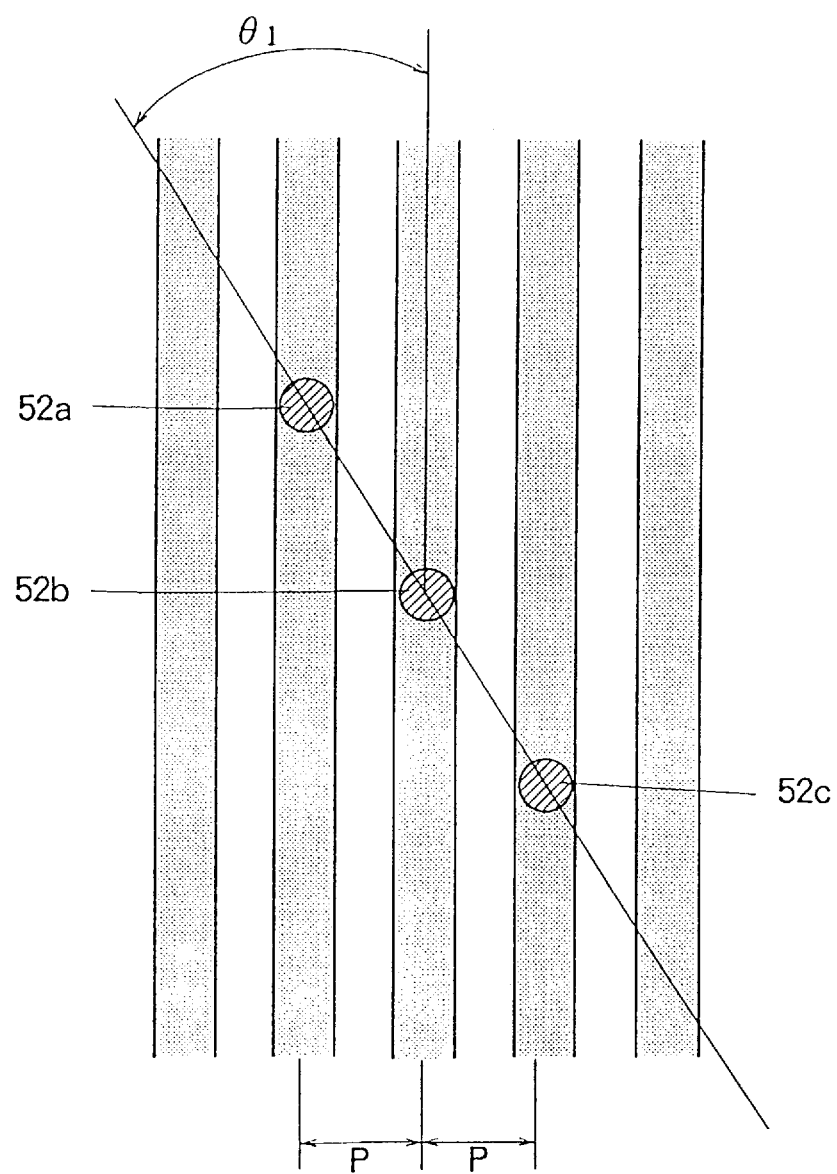
FIG. 42 is a schematic diagram showing the positions of the light spots on the information recording medium in Embodiment A5.

FIG. 41 is a schematic diagram showing a part of the optical disk device of another embodiment, Embodiment A5. FIG. 42 shows the positions of the array of light spots on the information tracks in Embodiment A5. Members and items identical or corresponding to those in Prior Art Example 1 of FIG. 1 and Embodiment A1 to Embodiment A4 are denoted by identical reference numerals. In FIG. 41, a light beam 3 emitted from a laser beam 2 is divided by a diffraction grating 50 into three light beams a, 51a, 51b and 51c. The diffraction grating 50 is supported such that it can rotate in a plane perpendicular to the light beam 3, i.e., about the optical axis of the light beam from the collimator lens 4 or about an axis parallel with the optical axis. Drive coils 70a and 70b drive the diffraction grating 50 for such rotation, in accordance with a current from a position control circuit 69.

During tracking for recording and playback, the light spots 52a, 52b and 52c are disposed being separated by one track pitch P in the lateral direction, as shown in FIG. 42. This is achieved by setting an angle between the longitudinal direction of the information track and the longitudinal direction of the array of the light spots θ1. With such an arrangement, parallel recording and parallel playback can be achieved.

During access, the light spots 52a, 52b and 52c are disposed being separated by half track pitch P/2 in the lateral direction, as shown in FIG. 38. This is achieved by setting an angle between the longitudinal direction of the information track and the longitudinal direction of the array of the light spots at θ2. The outputs of the photodetector assemble 54 are used for calculation at the arithmetic processing unit 45, to remove the groove interference signal from the focus error signal.

The switching between the first state in which the angle between the direction of the track and the direction of the array is set at θ1 and the second state in which the angle between the direction of the track and the direction of the array is set at θ2 is achieved by rotating, under control of the position control circuit 69, the diffraction grating 50 by means of the drive coils 70a and 70b. As the diffraction grating 50 is rotated, the array of light spots is rotated to vary the angle between the longitudinal direction of the information track and the longitudinal direction of the array of the light spots, from θ1 to θ2, or from θ2 to θ1.

Embodiment A6

Figure 43:
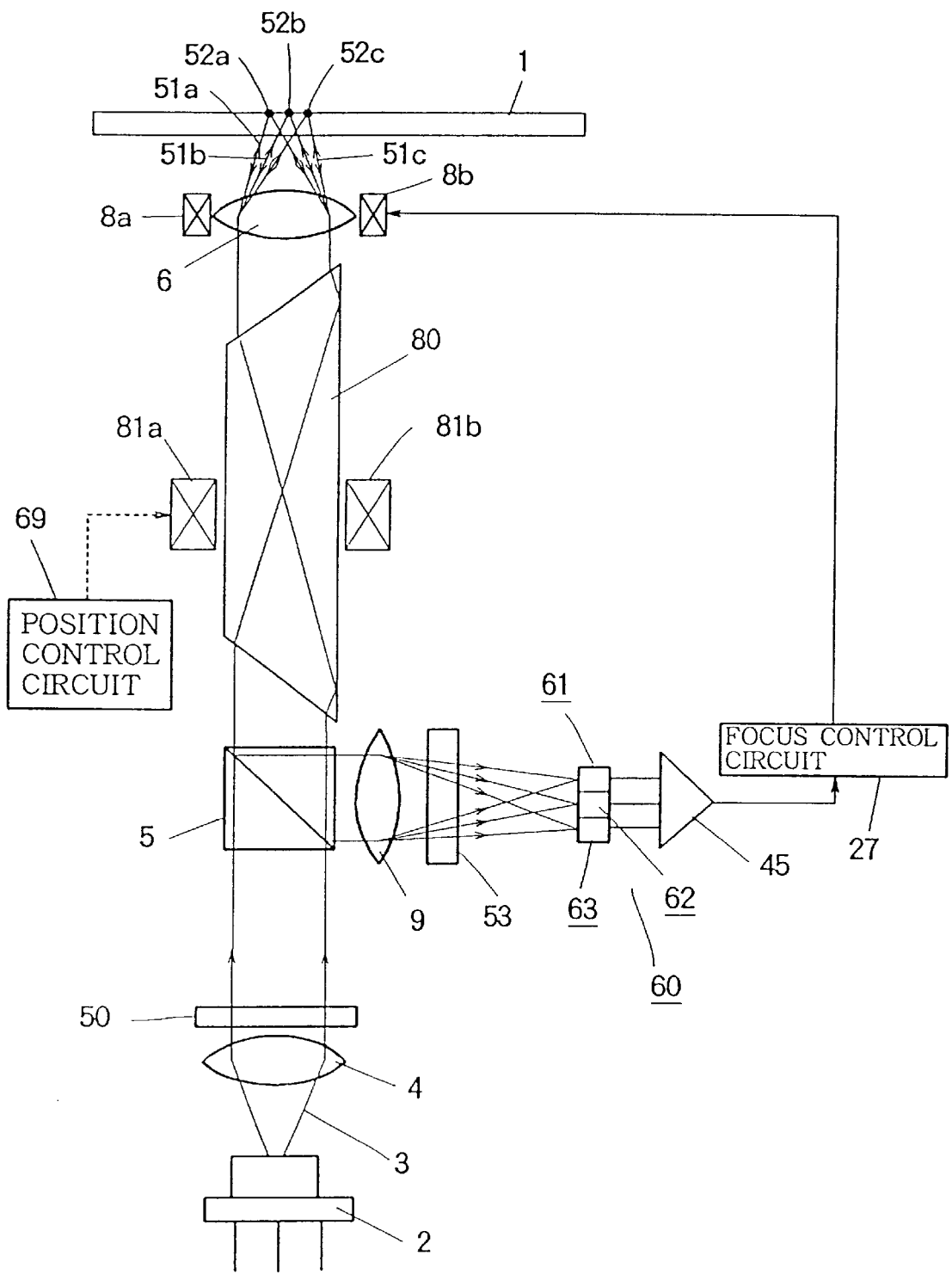
FIG. 43 is a schematic diagram showing a part of an optical disk device of Embodiment A6.
Figure 44:
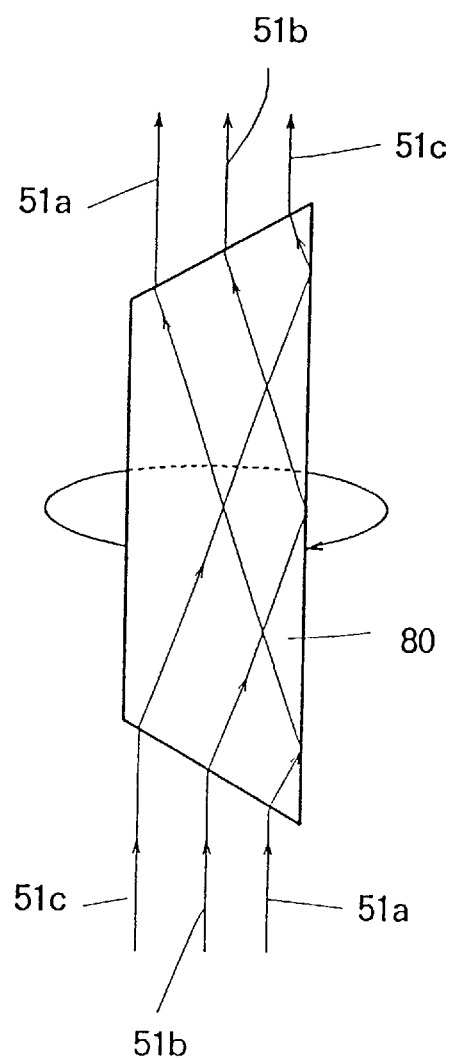
FIG. 44 is a diagram showing the optical paths in the dove prism in FIG. 43.

FIG. 43 shows a part of an optical disk device of another embodiment, Embodiment A6. FIG. 44 shows the light paths in the dove prism in FIG. 43. Members and items identical or corresponding to those in Prior Art Example 1 and Embodiment A1 to Embodiment A5 are denoted by identical reference numerals. In FIG. 43, a dove prism 80 (having a longitudinal cross section in the shape of a trapezoid as illustrated) changes the relationship of the optical paths of the light beams 51a, 51b and 51c into which the light beam 3 has been divided by the diffraction grating 50. Drive coils 81a and 81b rotate the dove prism 80 in a plane perpendicular to the light beam 3, i.e., about the optical axis of the light beam from the beam splitter 5 or an axis parallel with the optical axis. The drive coils 81a and 81b rotates the dove prism 80 in accordance with a current from a position control circuit 69.

In Embodiment A6, during tracking for recording and playback, the angle between the direction of the track and the direction of the array is set at θ1 so that the light spots 52a, 52b and 52c are disposed being separated by a track pitch P, as shown in FIG. 42, to thereby enable parallel recording and parallel playback. During access, the angle between the direction of the track and the direction of the array is set at θ2 so that the light spots 52a, 52b and 52c are disposed being separated by a track pitch P/2, as shown in FIG. 38, to thereby eliminate the effects of the groove interference. That is, the outputs of the photodetector assembly 60 are used for calculation at the arithmetic processing circuit 45 to remove the groove interference signal from the focus error signal.

The switching between the first state in which the angle between the direction of the track and the direction of the array is set at θ1 and the second state in which the angle between the direction of the track and the direction of the array is set at θ2 is achieved by rotating, under control of the position control circuit 69, the dove prism 80 by means of the drive coils 81a and 81b. As the dove prism is rotated, the array of light spots is rotated, such that the angle between the direction of the information track and the direction of the array is changed from θ1 to θ2, or from θ2 to θ1.

Advantages of Embodiments A1 to A6

Advantages of Embodiments A1 to A6 described are as follows. By performing focus control in accordance with the focus error signals, e.g., by the sum of the focus error signals, obtained from the reflected light beams of the light spots disposed to illuminate the land part and the groove part respectively, e.g., separated by half a pitch of the information track, the effect of the groove interference can be removed. Accordingly, even during the track access, the focus error signal free from the groove interference signals is obtained.

When three or more light spots are used, parallel recording or parallel playback is achieved.

When a diffraction grating is used for producing a plurality of light spots, the light source itself may be of a type which emits a single light beam, and the cost of the device can be lowered.

By rotating the diffraction grating, the positions of the light spots can be adjusted with a high accuracy.

Moreover, by rotating the diffraction grating, the positions of the light spots can be switched between a first state in which the separation between light spots is appropriate for tracking, for parallel recording or playback, and a second state in which the separation between light spots is appropriate for accessing, for eliminating the effects of the groove interference.

By the use of the dove prism, it is possible not to move the light spots on the photodetectors even when the dove prism is rotated to vary the positions of the light spots on the information recording medium to switch the angle formed by the array of light spots and the information groove between a first value suitable for tracking and a second value suitable for accessing.

By using a tracking sensor of a differential push-pull method, a simple sensor optical system is achieved.

Embodiment B1

Figure 5:
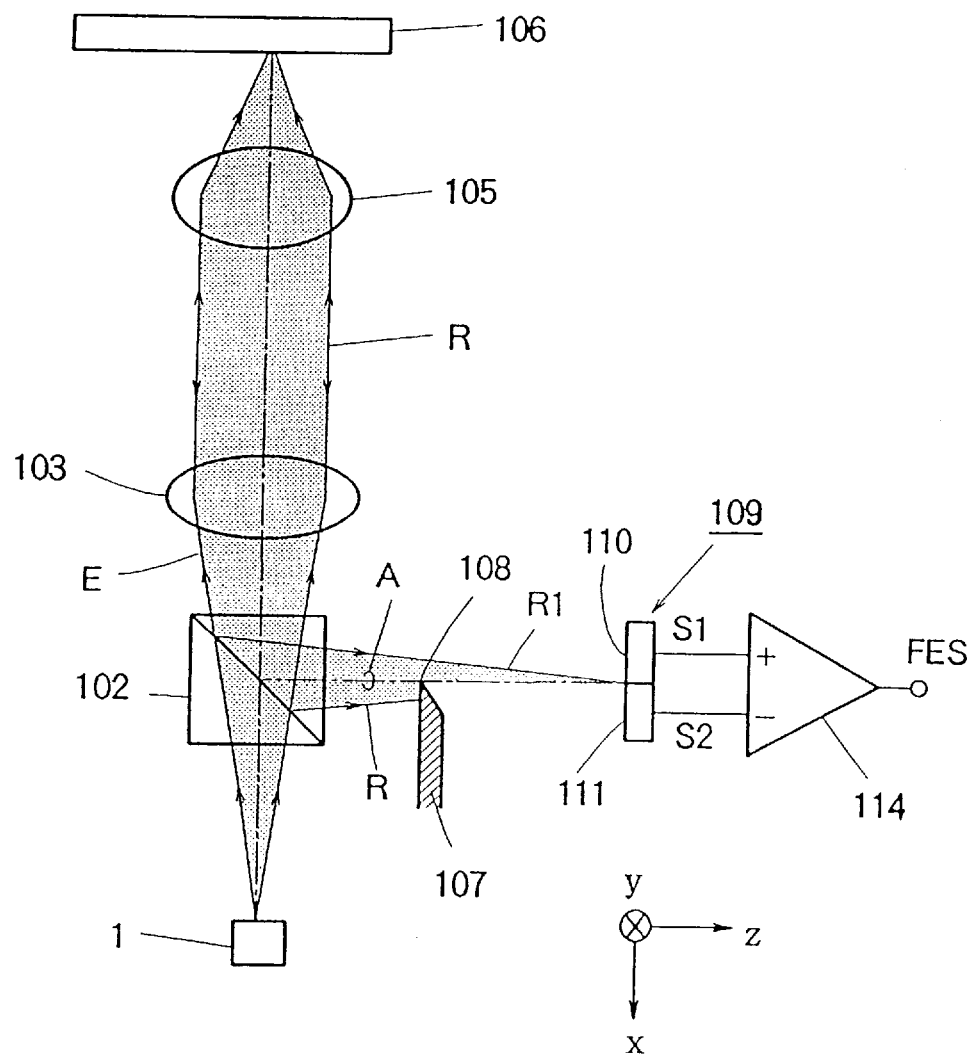
FIG. 5 is a diagram showing the configuration of a focus error detecting device of Prior Art Example 2.
Figure 45:
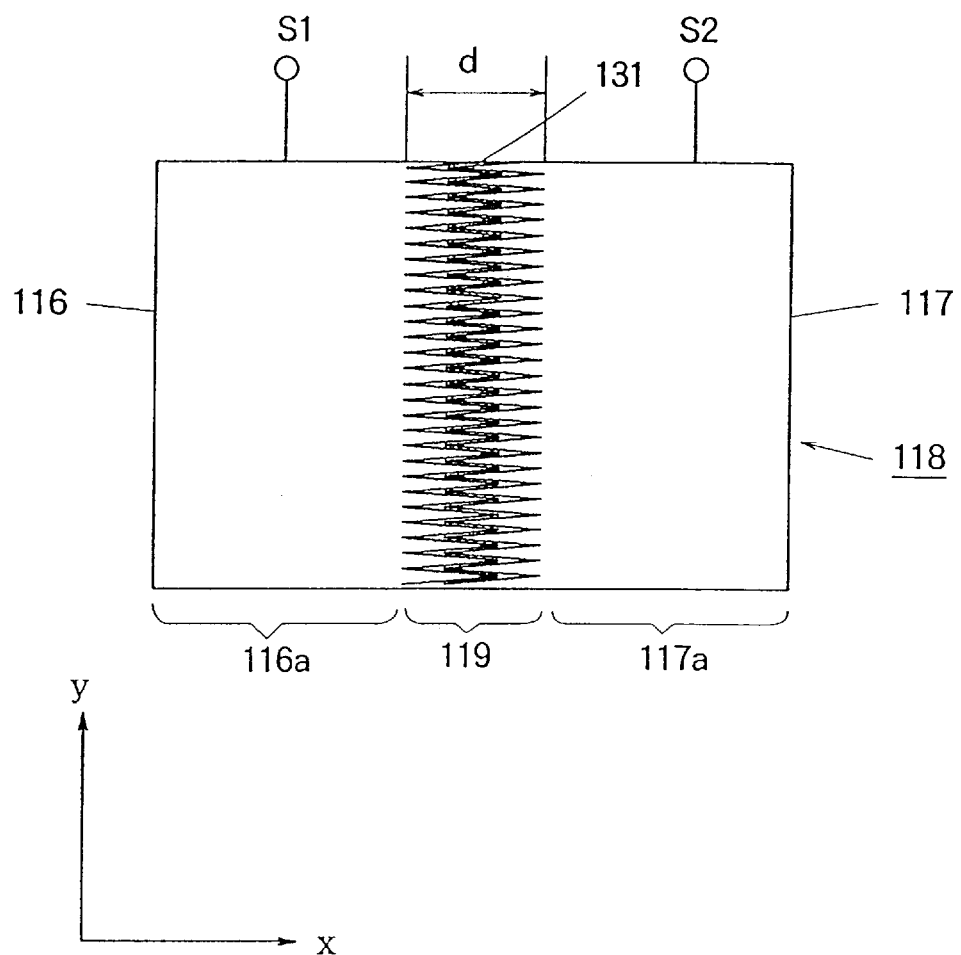
FIG. 45 is a plan view showing a two-division photodetector in Embodiment B1.
Figure 46:
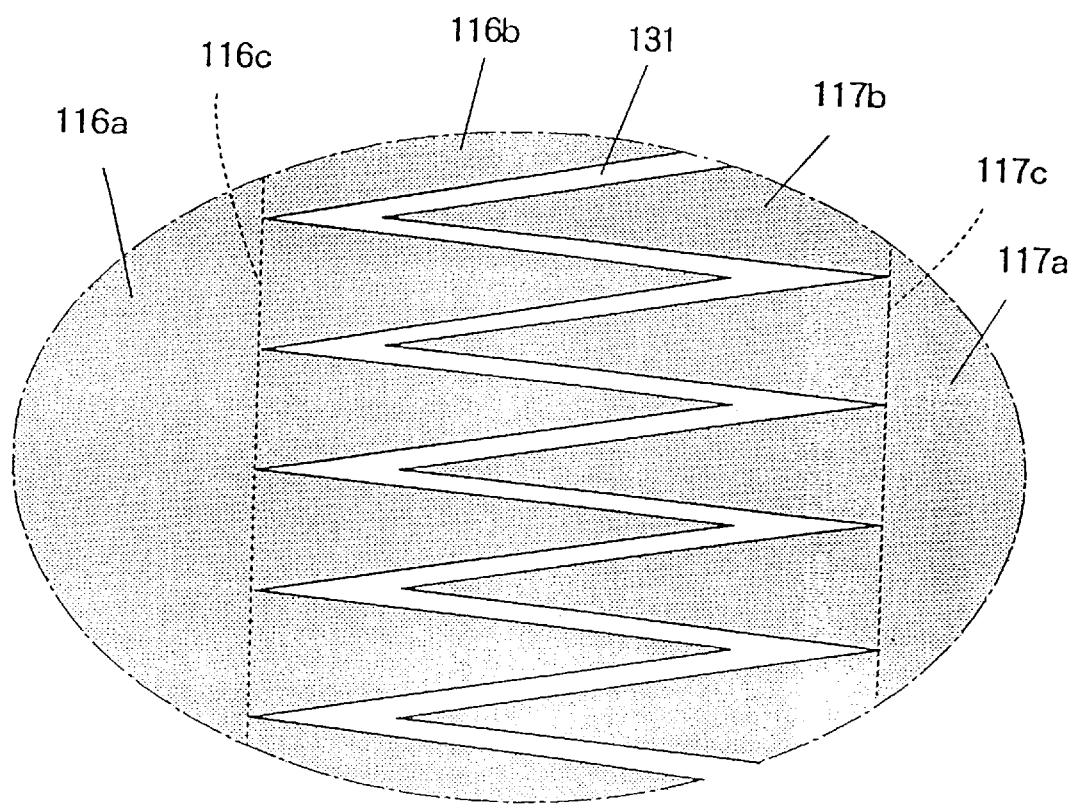
FIG. 46 is an enlarged view of the photodetector of FIG. 45.

FIG. 45 is a plan view showing a two-division photodetector of a focus error detecting device of another embodiment, Embodiment B1, of the invention. FIG. 46 is a partial enlarged view of the division band. The configuration of the focus error detecting device of this embodiment is generally identical to that the focus error detecting device of Prior Art Example 2 of FIG. 5. However, in place of the two-division photodetector 9, there is provided a two-division photodetector 118 having first and second light receiving sections or surfaces 116 and 117 separated by a division line 131 in a division band 119. The division band 119 is optically aligned with the upper edge 108 of the knife edge 107.

The division band 119 is a rectangular region interposed between rectangular main parts 116a and 117a of the light receiving surfaces 116 and 117. One edges of the main parts 116a and 117a are coincident with opposite edges of the division band 119.

Apart from the main parts 116a and 117a, the light receiving surfaces 116 and 117 have arrays of tapered portions or projections 116b and 117b (FIG. 46) projecting from the edges 116c and 117c (FIG. 46, FIG. 47) of the main parts 116a and 117a. The arrays of tapered projections are interdigitated with each other. In the illustrated example, the arrays of tapered projections are bounded by the division line 131 in the form of a saw-tooth or triangular wave, extending in a zigzag pattern. The width of the division band is denoted by d, while the pitch of the triangular wave is denoted p.

Figure 47:
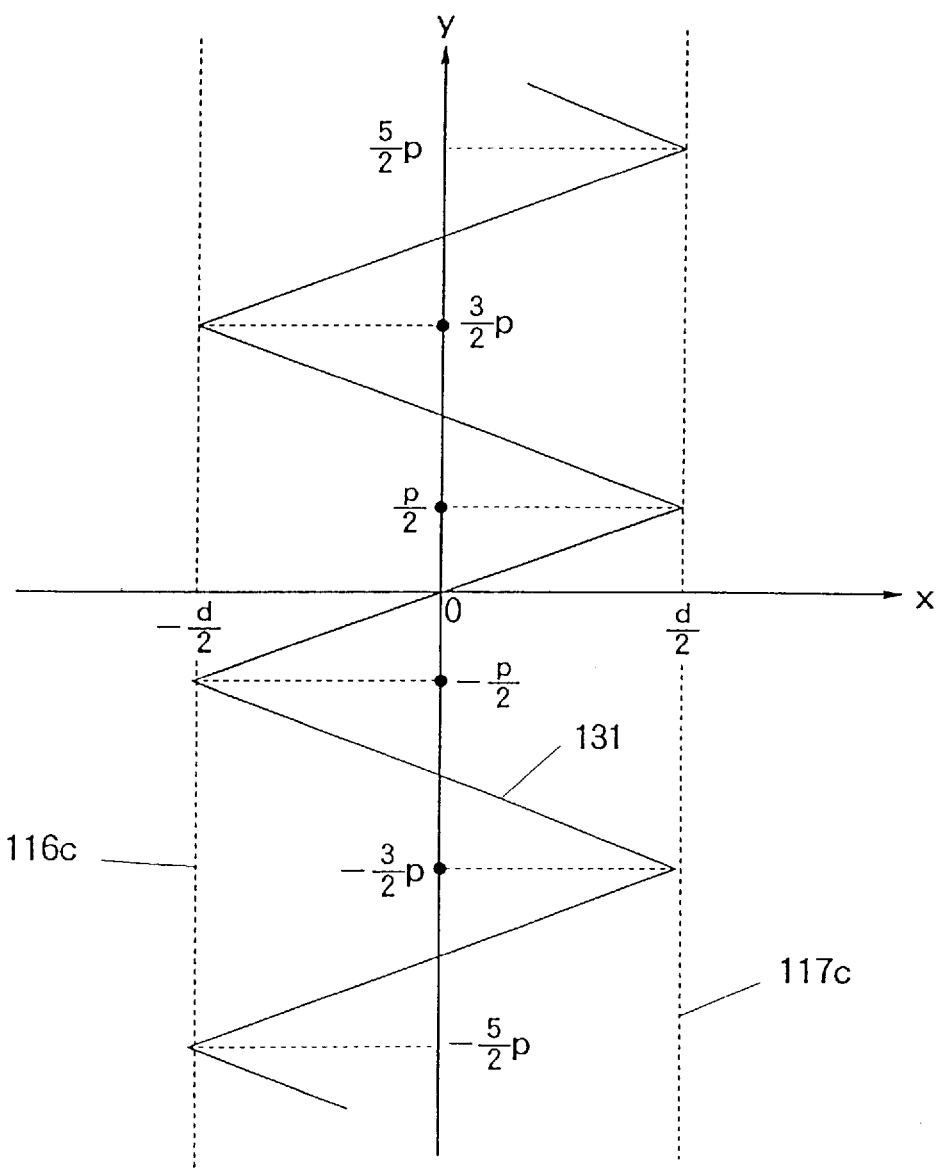
FIG. 47 is a plan view showing the division line on x and y coordinates.

FIG. 47 shows the division line 131 on the assumption that the width of the division line 131 is negligibly narrow, and the origin (x=0, y=0) of the x-y coordinate system is on the central line of the division band 119. As seen from FIG. 47, the division line 131 is expressed by:

$$x=(p/d)x+2np$$

$$y=-(p/d)x+(2n-1)p$$

where $$-d/2 \leq x \leq d/2;$$

and n is an integer.

The operation of Embodiment B1 will next be described with reference to FIG. 5 to FIG. 11 which were also used for the description of Prior Art Example 2. However, it is to be noted that the two-division photodetector 109 is replaced by the two-division photodetector 118. It is assumed that the pitch p of the triangular wave is negligibly small compared with the size of the light spot on the two-division photodetector 118. The operation of the focus error detecting device using the two-division photodetector 118 is generally identical to that of Prior Art Example 2, but is briefly described next.

The two-division photodetector 118 is so positioned that when the focal point of the emitted light beam E is on the information recording medium 106, the reflected light beam R1 is focused on the two-division photodetector 118 and in the division band 119 so that the output currents S1 and S2 are equal to each other.

When the information recording medium 106 is closer to the objective lens 105 than the focal point, the reflected light beam R1 is incident on the two-division photodetector 118 before it is focused. As a result, more of the reflected light beam R1 is incident on the light receiving surface 116 than on the light receiving surface 117. When the information recording medium 106 is farther away from the objective lens 105 than the focal point, the reflected light beam R1 is focused before it is incident on the two-division photodetector 118. As a result, more of the reflected light beam R1 is incident on the light receiving surface 117 than on the light receiving surface 116.

Figure 6:
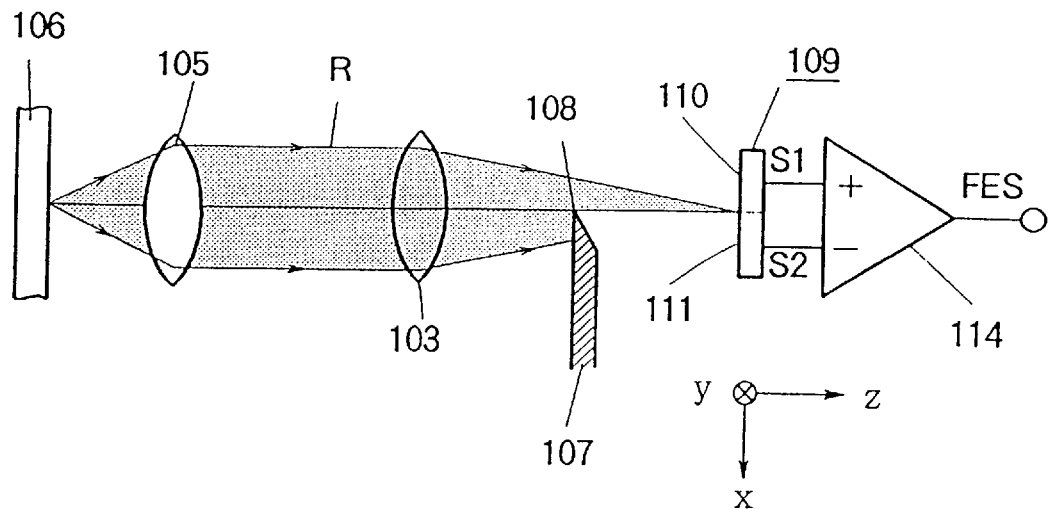
FIG. 6 is a diagram showing focusing of the reflected light beam on the photodetector.
Figure 7:
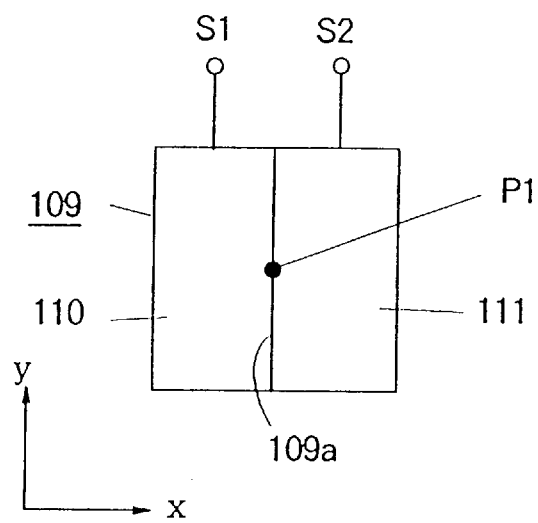
FIG. 7 is a diagram showing the light receiving surfaces in the state shown in FIG. 6.
Figure 8:
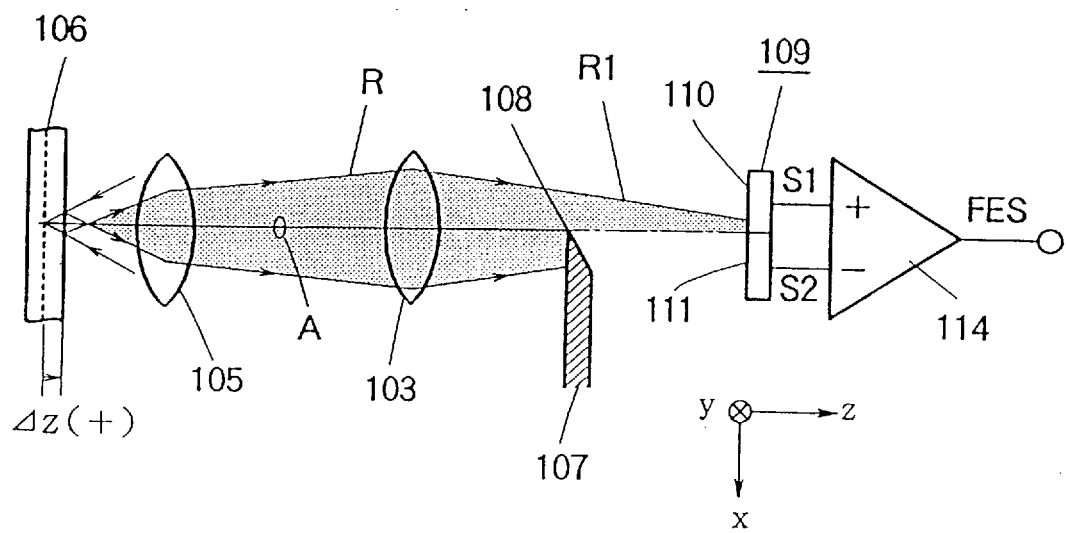
FIG. 8 is a diagram slowing misfocusing of the light beam of the reflected light beam on the photodetector.
Figure 9:
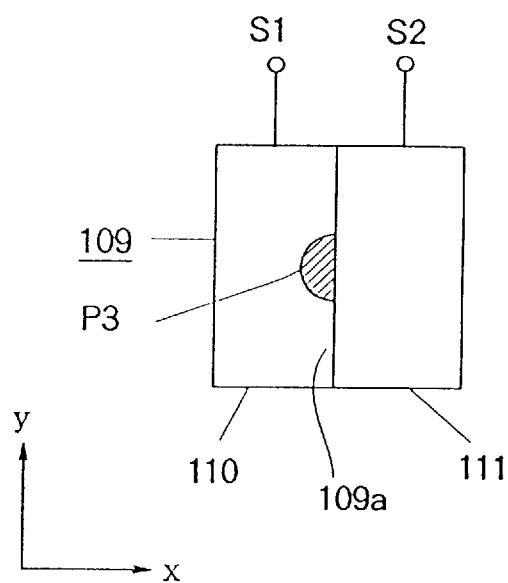
FIG. 9 is a diagram showing the light receiving surfaces in the state shown in FIG. 8.
Figure 10:
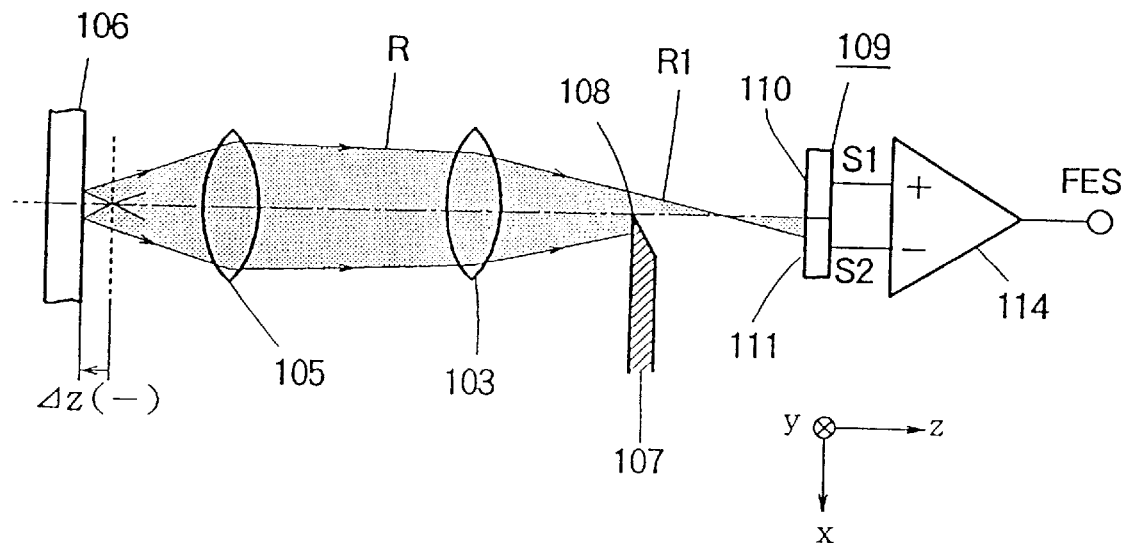
FIG. 10 is a diagram showing misfocusing of the reflected light beam on the photodetector.
Figure 11:
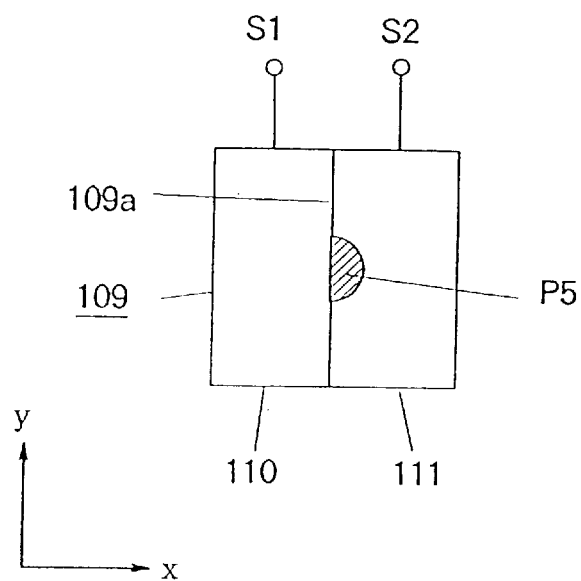
FIG. 11 is a diagram showing the light receiving surfaces in the state shown in FIG. 10.
Figure 12:
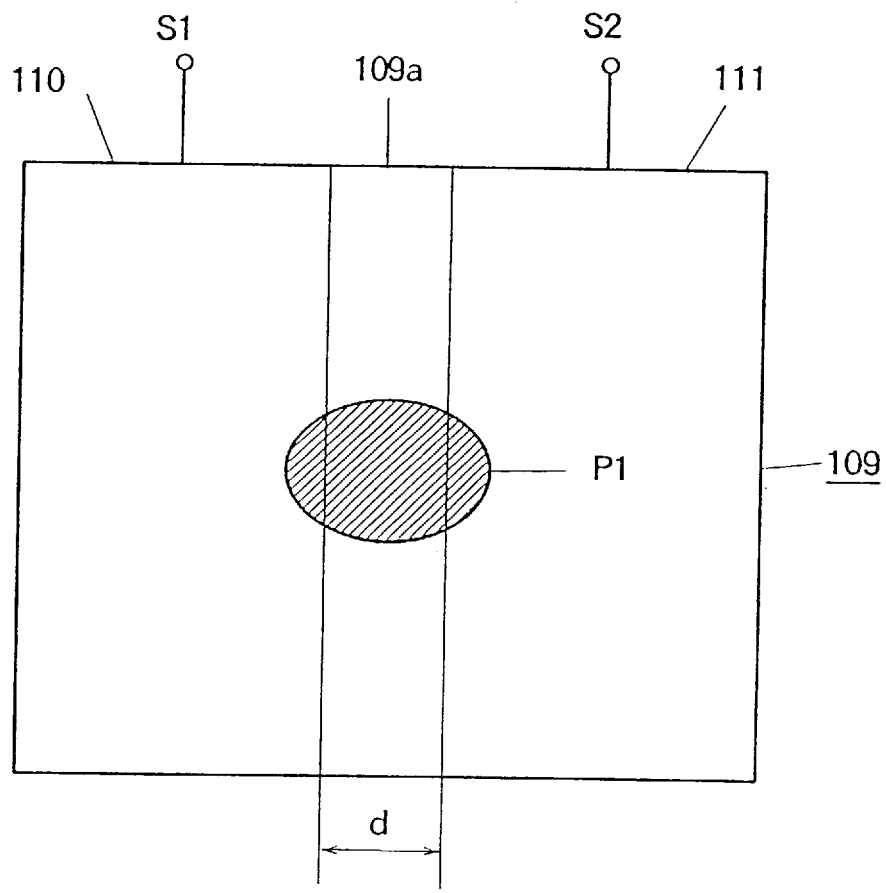
FIG. 12 is an enlarged plan view showing the light receiving surfaces of the photodetector of Prior Art Example 2.
Figure 13:
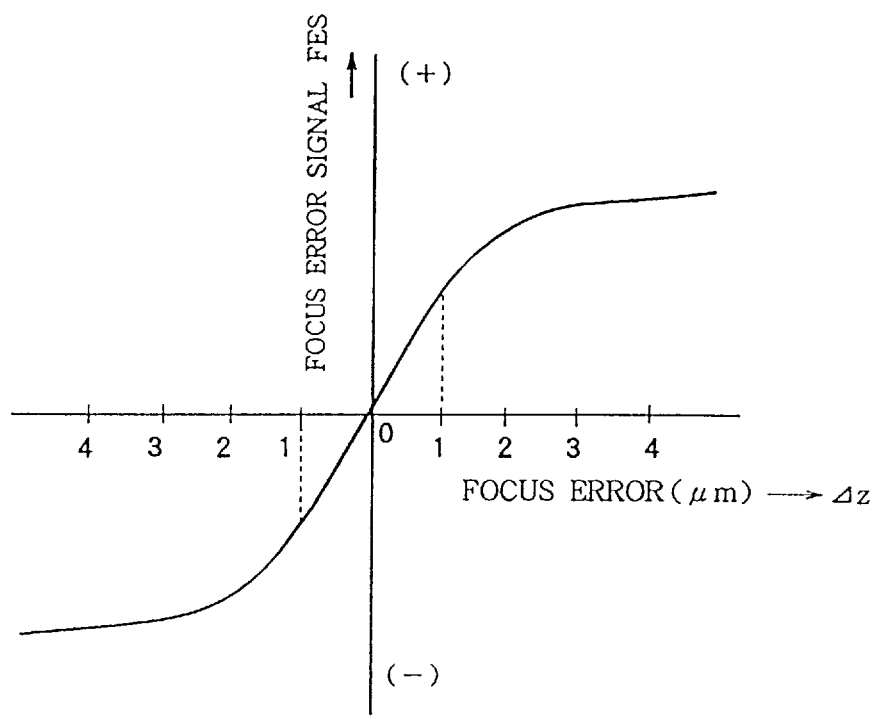
FIG. 13 is a diagram showing the characteristics of the focus error detecting device of Prior Art Example 2.
Figure 14:
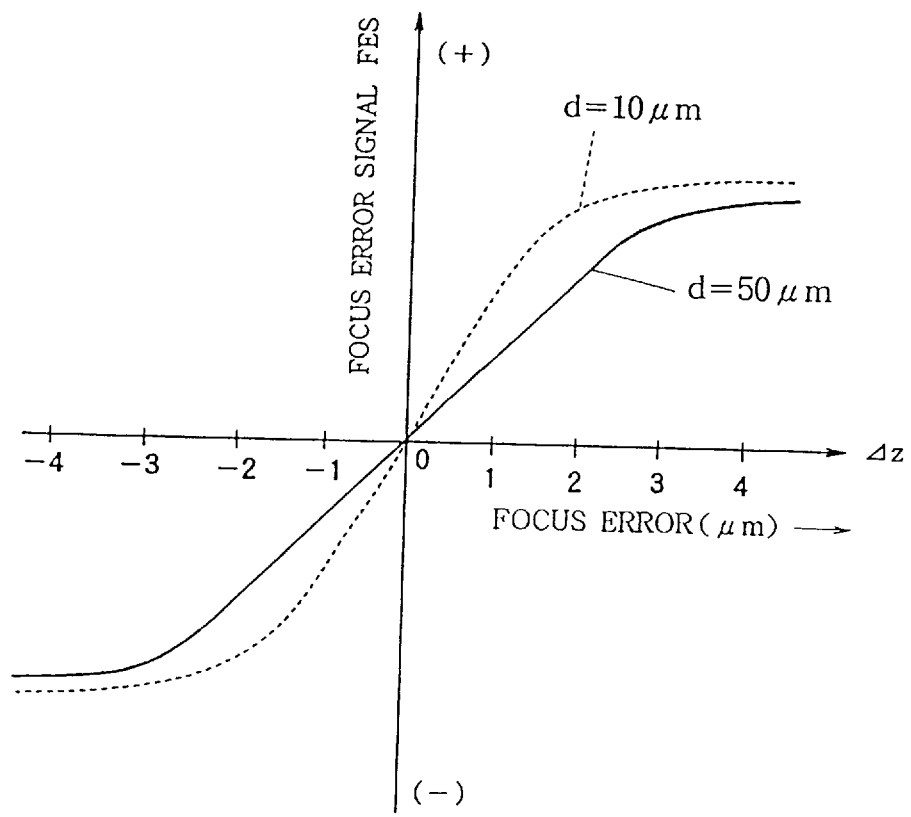
FIG. 14 is a diagram showing the characteristics of the focus error signal of Prior Art Example 2.

The light receiving surfaces 116 and 117 generate currents S1 and S2 which correspond to the amount of received light, so the focus error signal FES is obtained by determining the difference between S1 and S2. The difference between S1 and S2 is zero when the distance between the objective lens 105 and information recording medium 106 is proper and the emitted light beam E is focused on the information recording medium 106, as illustrated in FIG. 6 and FIG. 7. When the distance between the objective lens 105 and the information recording medium 106 is shorter or longer, the difference is not zero (a positive or negative value). The polarity of the value of the difference depends on whether the distance between the objective lens 105 and the information recording medium 106 is shorter or longer. The focus error signal FES is passed through a phase compensator, and an amplifier, and supplied to an objective lens actuator (not shown) to control the focal point of the emitted light to be on the information recording medium 106.

Let us refer to FIG. 47 to consider the linear zone of the focus error detecting device using the two-division photodetector 118. Let us take that part of the light beam incident on the two-division photodetector 118 which falls within the area within the radius w (w<<d) centered on a point:

$$x = x_1 (-d/2 \leq x_1 \leq d/2)$$

Figure 15:
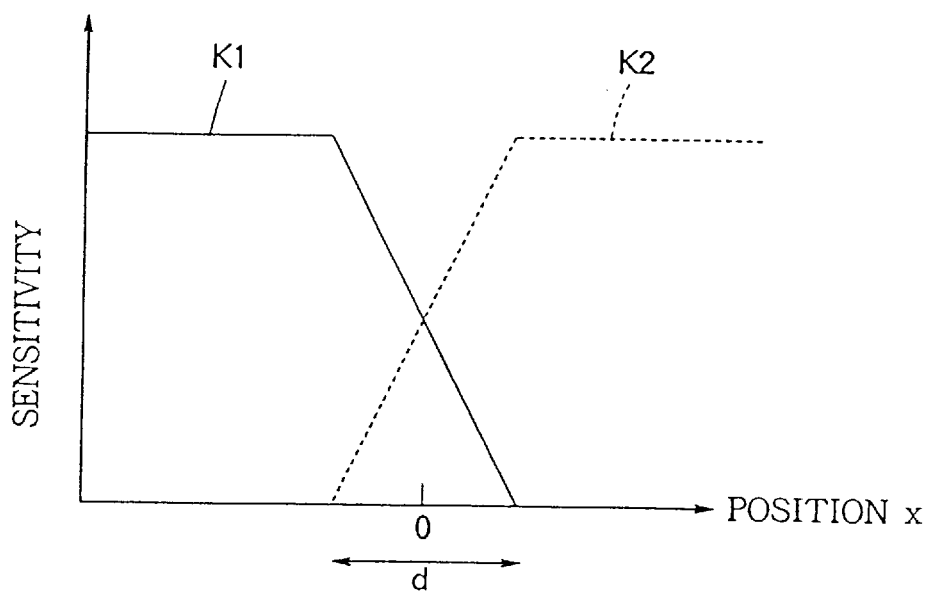
FIG. 15 is a diagram showing the sensitivity of the light receiving surfaces.

Let us assume that p is sufficiently smaller than w. Of the partial light beam, the part satisfying:

$$(d/2 + x_1)/d$$

is incident on the light receiving surface 116, while the part satisfying:

$$(d/2 - x_1)/d$$

is incident on the light receiving surface 117. The output currents S1 and S2 are therefore proportional to the value of $x_1$ (x coordinate) of the center of the partial light beam, and thus varies linearly. That is the currents varies as shown in FIG. 15. In other words, using the configuration shown in FIG. 45 and FIG. 46 produces the same effect of expanding the linear zone as that which is obtained by enlarging the width of the division line 109a in the prior art configuration. In addition, it is not associated with the problems of degradation of the frequency response that associated the prior art configuration.

Figure 48:
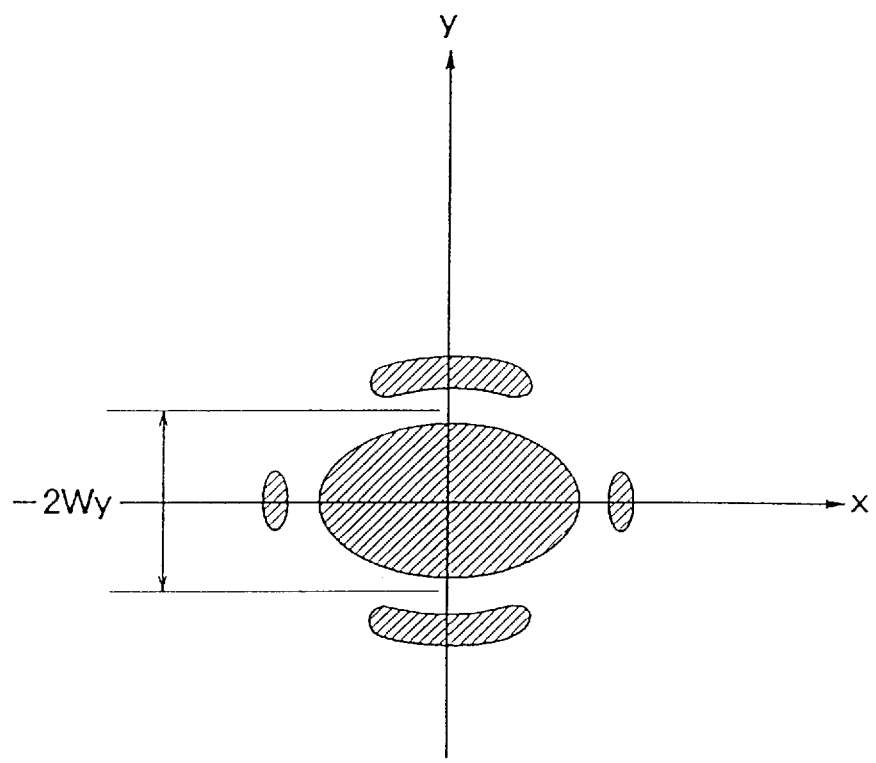
FIG. 48 is a diagram showing the shape of the spot formed on the photodetector when the focal point is on the information recording medium.
Figure 49:
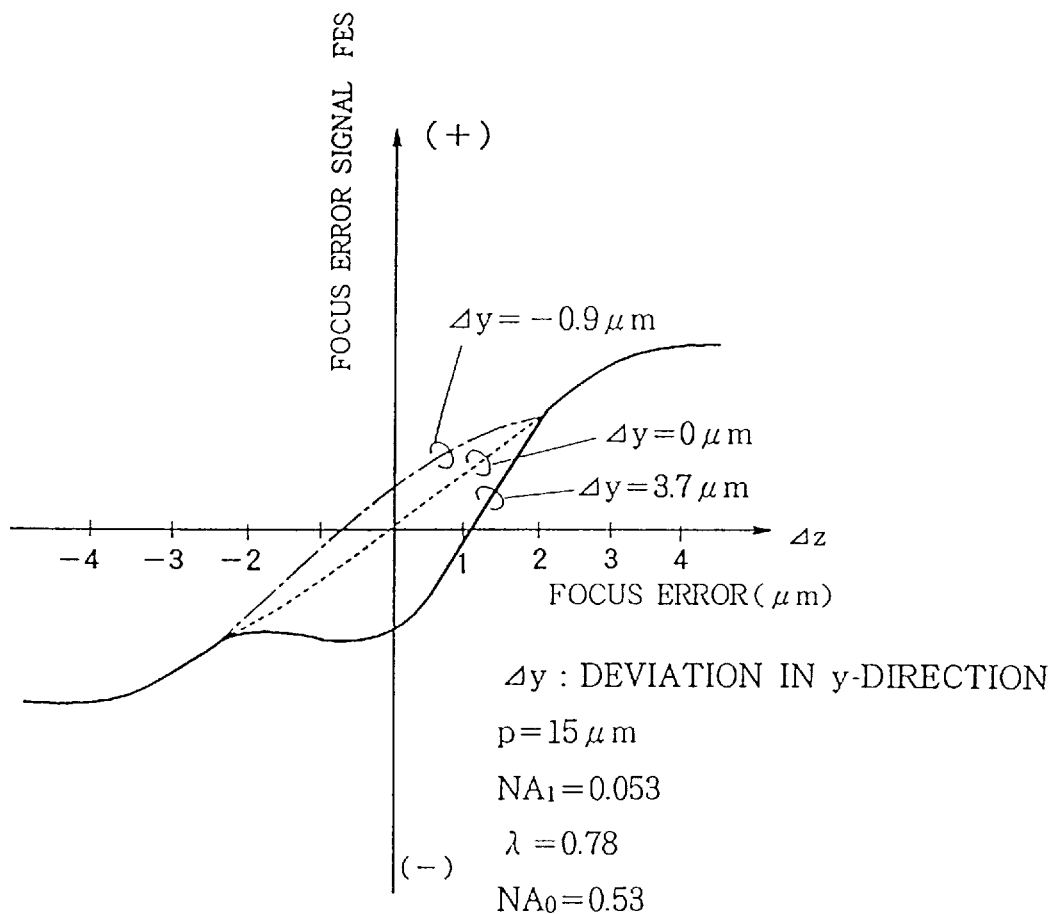
FIG. 49 is a diagram showing the characteristics of the focus error signal in Embodiment B1.

In the actual two-division photodetector, the width d of the division band 119 cannot be made smaller than a certain value due to a restraint of manufacturing process, so that the pitch p cannot be made smaller than a certain value. It is therefore necessary to make the diameter of the light spot on the two-division photodetector 118 to be sufficiently large compared with the pitch p. This is achieved by appropriately setting the angle of convergence α (as indicated in FIG. 6) or the numerical aperture $NA_1$, ($NA_1$)=sin α). Half the reflected light beam R is obscured or shielded by the knife edge 107 and the remaining half is incident on the two-division photodetector 118 as the light beam R1. When the focal point of the emitted light beam E is exactly on the information recording medium 106, the (dimension $2w_y$ of the light spot on the two-division photodetector 118 in the direction parallel with the division band (in the y direction) is given by:

$$2w_y = 1.22 \lambda / NA_1$$

as shown in FIG. 48.

On the assumption that the pitch p is constant, calculation of the focus error signals has been made for various values of $NA_1$ (i.e., for various values of $2w_y$).

Figure 50:
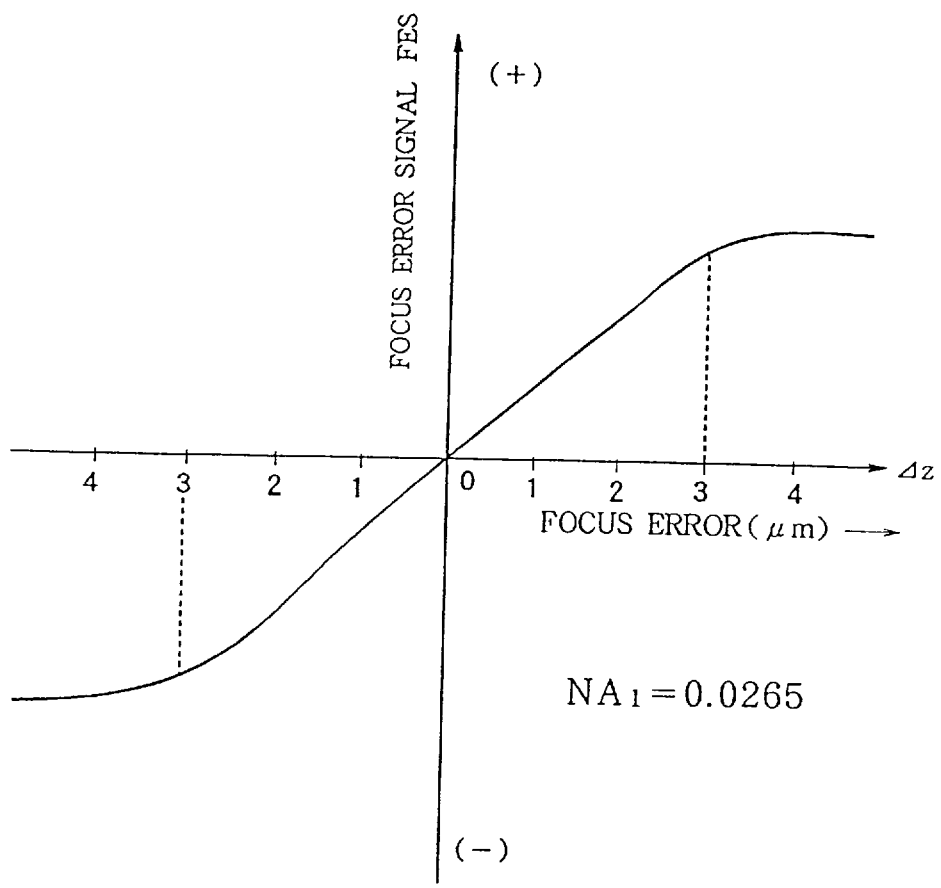
FIG. 50 is a diagram showing the characteristics of the focus error signal in Embodiment B1.

When $NA_1$ is large, the deviation of the light spot in the y direction gives an influence on the focus error signal. When $NA_1$ is smaller than $$NAa = 5\lambda/8p$$

the influence given by the deviation of the light spot in the y direction on the focus error signal is very small. When $NA_1$ is smaller than $$NAa = \lambda/2p$$

the focus error signal does not vary with the deviation of the light spot deviation in the y direction. When the pitch p is 15 μm and the wavelength λ of the light source is 0.78 μm, NAa is 0.026 and the dimension $2w_y$ in the y direction is 36.6 μm. FIG. 50 shows a focus error signal FES obtained when $NA_1$=0.026, p=15 μm, d=8 μm, and $NA_0$ (numerical aperture of the objective lens) =0.53. As will be seen from FIG. 50, a linear zone of 5 to 6 μm is obtained.

As has been described, an advantage of the above embodiment is that the linear zone over which the focus error signal varies linearly with respect to the focus error is expanded. Moreover, it is not necessary to expand the width of the division line, so that the degradation in the frequency response can be avoided.

Embodiment B2

In Embodiment B1, the division band 119 is formed of a division line 119a of a triangular waveform. As an alternative, a configuration shown in FIG. 51 may be used. As illustrated, a two-division photodetector 120 has first and second light receiving surfaces 121 and 122 including main parts 121a and 122a. One edges 121c and 122c of the main parts 122a and 122b are coincident with opposite edges of the division band 119.

The division band 119 contains a plurality of strings of minute light receiving surfaces 123 each formed of an array or group of light receiving surfaces 123 interconnected by a connection line 124 which extends in the lateral direction of the division band (x direction). Each string of the light receiving surfaces 123 is connected, by the connection line 124, to one of the main parts 121a and 122a and extends toward and is terminated in the vicinity of the other of the main parts 121a and 122a.

More specifically, each of the strings of light receiving surfaces belongs either to a first group or to a second group. The first group of strings is connected to the edge 121c of the main part 121a of the first light receiving surface 121, and the minute light receiving surfaces 123 belonging to the first group also form part of the first light receiving surface 121. The second group of strings is connected to the edge 122c or the main part 122a of the light receiving surface 122, and the minute light receiving surfaces 123 belonging to the second group also form part of the second light receiving surface 122.

The strings of the first group extend toward and are terminated near the edge 122c of the main part 122a of the other light receiving surface 122. The strings of the second group extend toward and are terminated near the edge 121c of the main part 121a of the other light receiving surface 121.

The first and second groups of strings are at alternate positions, i.e., they are interdigitated. The strings which are connected to the identical main part 121a or 122a are separated from each other by a pitch p.

The area of each minute light receiving surfaces 123 is sufficiently smaller than the dimensions of the light spot.

The minute light receiving surfaces 123 of each string have different sizes. The size of the minute light receiving surfaces 123 decreases with, e.g., in proportion to, the increasing distance from the light receiving surface 121 or 122 to which each of the minute light receiving surfaces 123 is connected. On a central line of the division band 119, the minute light receiving surfaces of substantially equal sizes are aligned in the longitudinal direction of the division band 119 (y direction). In the vicinity of the edges 121c or 122c of the main part 121a or 122a of the light receiving surface 121 or 122, the size of the minute light receiving surfaces 123 is maximum or minimum.

The two-division photodetector 120 of Embodiment B2 differs from the two-division photodetector 118 of Embodiment B1 in that the minute light receiving surfaces 123 are connected by connection lines 124, but the former operates in the same way as the latter. For instance, let us consider a portion of the light beam incident on the central line (x=0) of the division band 119, where the above-mentioned light beam has a uniform intensity distribution. Substantially half the portion is incident on the minute light receiving surfaces 123 belonging to the light receiving surface 121, and the remaining half of the portion is incident on the minute light receiving surfaces 123 belonging to the light receiving surface 122. The output currents from the light receiving surfaces 121 and 122 are substantially equal. When a portion of the light beam is incident on a point intermediate between the central line and the edge of the light receiving surface 121, at a point $x_1$, the amount of light incident on the minute light receiving surfaces 123 belonging to the light receiving surface 121 increases in proportion to the distance ($x_1$) from the central line, and the amount of light incident on the minute light receiving surfaces 123 belonging to the light receiving surface 122 decreases as the distance ($x_1$) increases. The output currents of the light receiving surfaces 121 and 122 vary linearly with respect to the position $x_1$ of the point of incidence. The areas where light receiving surface does not exist is smaller than in the prior art configuration, so that the degradation of the frequency response is avoided, and yet a wide linear zone is achieved.

Figure 51:
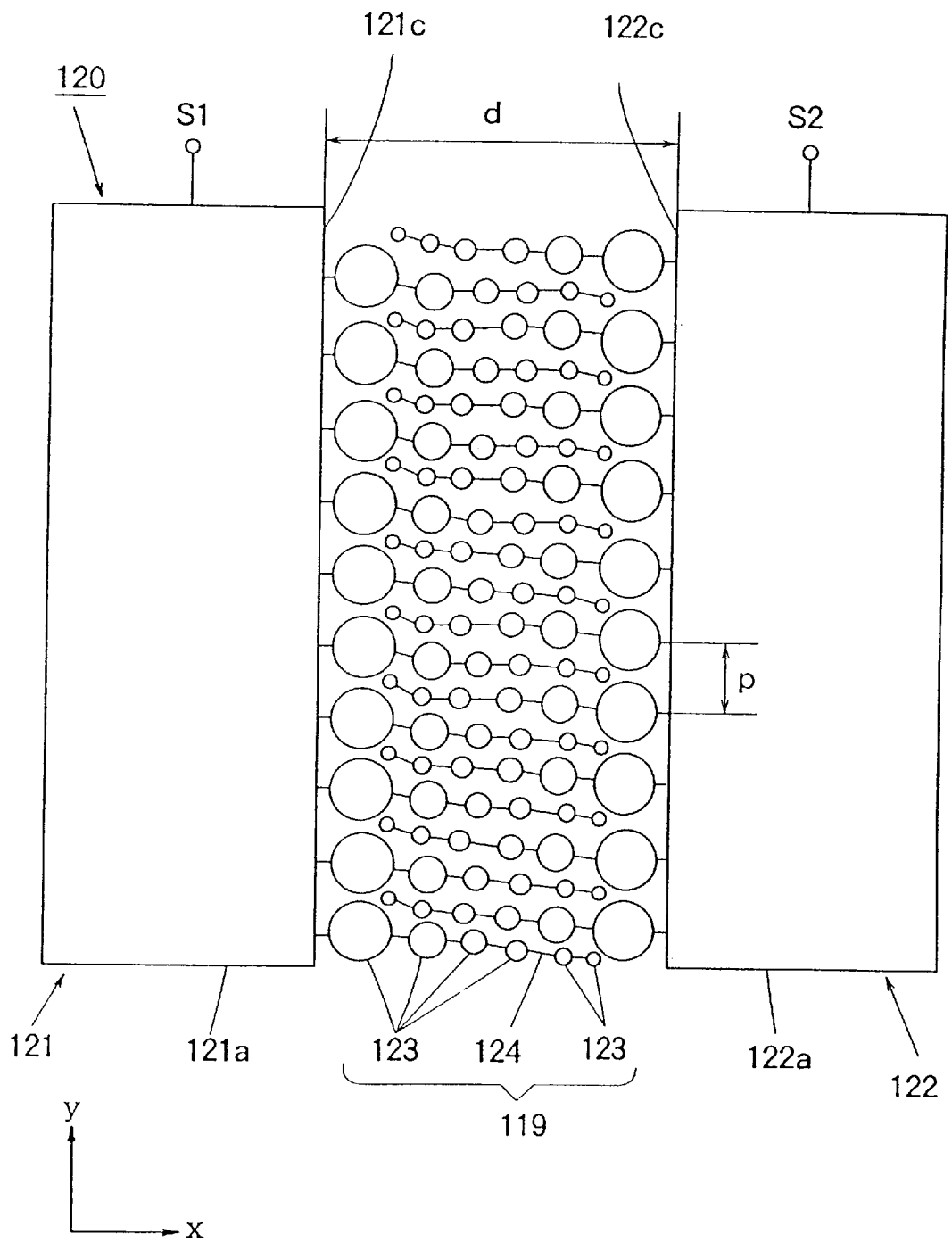
FIG. 51 is a plan view showing a two-division photodetector in Embodiment B2.

In the example shown in FIG. 51, the minute light receiving surfaces are circular or disk-shaped, but they may of different shape. What is essential is that the dimensions of the minute light receiving surfaces decrease with, e.g., in approximate proportion to, the increasing distance from the main part of the light receiving surface 121 or 122 to which the minute light receiving surfaces are connected.

Embodiment B3

Figure 52:
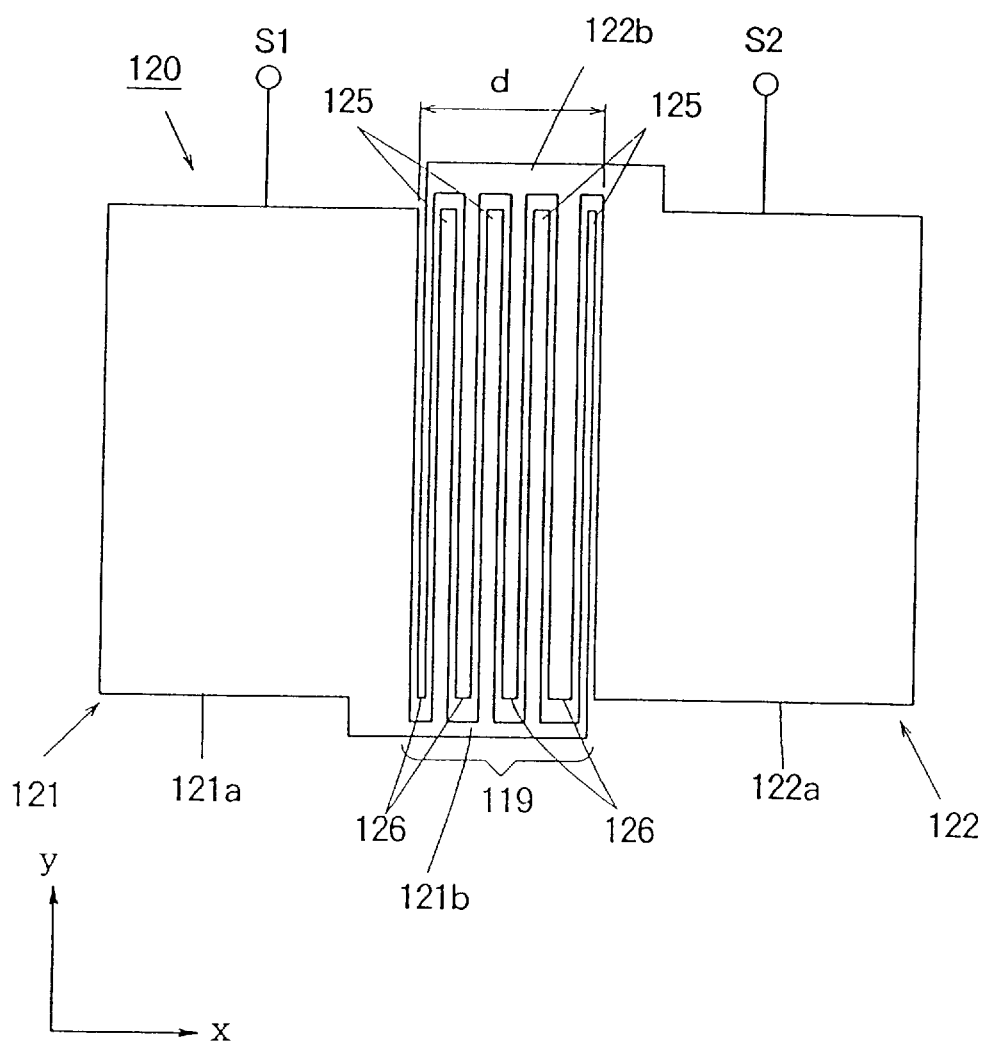
FIG. 52 is a plan view showing a two-division photodetector in Embodiment B3.

In Embodiment B1 and Embodiment B2, the light receiving surfaces or strings of light receiving surfaces extend laterally in the division band 119 (in the direction perpendicular to the direction in which the division band extends). As an alternative, a configuration shown in FIG. 52 may be used. In the illustrated configuration, first and second groups of stripe-shaped light receiving surfaces 125 and 126 are arranged in the division band 119. The stripe-shaped light receiving surfaces 125 and 126 extend in the the direction parallel with the boundary lines between the the main parts 121a and 122a, and the division band 119.

The first group of stripe-shaped light receiving surfaces 125 are connected to a common lateral extension 121b, which extends laterally along a lower edge of the division band 119, and is connected to the main part 121a of the light receiving surface 121. The second group of stripe-shaped light receiving surfaces 126 are connected to a common lateral extension 122b, which extends laterally along an upper edge of the division band 119, and is connected to the main part 122a of the light receiving surface 122.

The first and second groups of stripe-shaped light receiving surfaces 125 and 126 form parts of the light receiving surfaces 121 and 122, respectively and are interdigitated.

The width of each stripe-shaped light receiving surface 123 is sufficiently smaller than the light spot size. The stripe-shaped light receiving surfaces 125 belonging to the light receiving surface 121 have different widths. The stripe-shaped light receiving surfaces 125 farther away from the main part 121 of the light receiving surface 121 have a smaller width. The stripe-shaped light receiving surfaces 126 belonging to the light receiving surface 122 have different widths. The stripe-shaped light receiving surfaces 126 farther away from the main part 122a of the light receiving surface 122 leave a smaller width. The width decreases linearly with the distance from the main part of the light receiving surface 121 or 122 to which the stripe-shaped light receiving surfaces belong. The width of the division lines is set sufficiently smaller than the size of the light spot. The two-division photodetector 120 of FIG. 52 operates in the same way as the two-division photodetectors of FIG. 45 and FIG. 51. Thus, the linear zone can be expanded, and the degradation of the frequency response can be avoided.

The two-division photodetectors of Embodiment B1 to Embodiment B3 can be used not only for the focus error detecting device for used in a optical recording/playback device, but also for a focus error detecting device in automatic focusing cameras.

Embodiment C1

Figure 16:
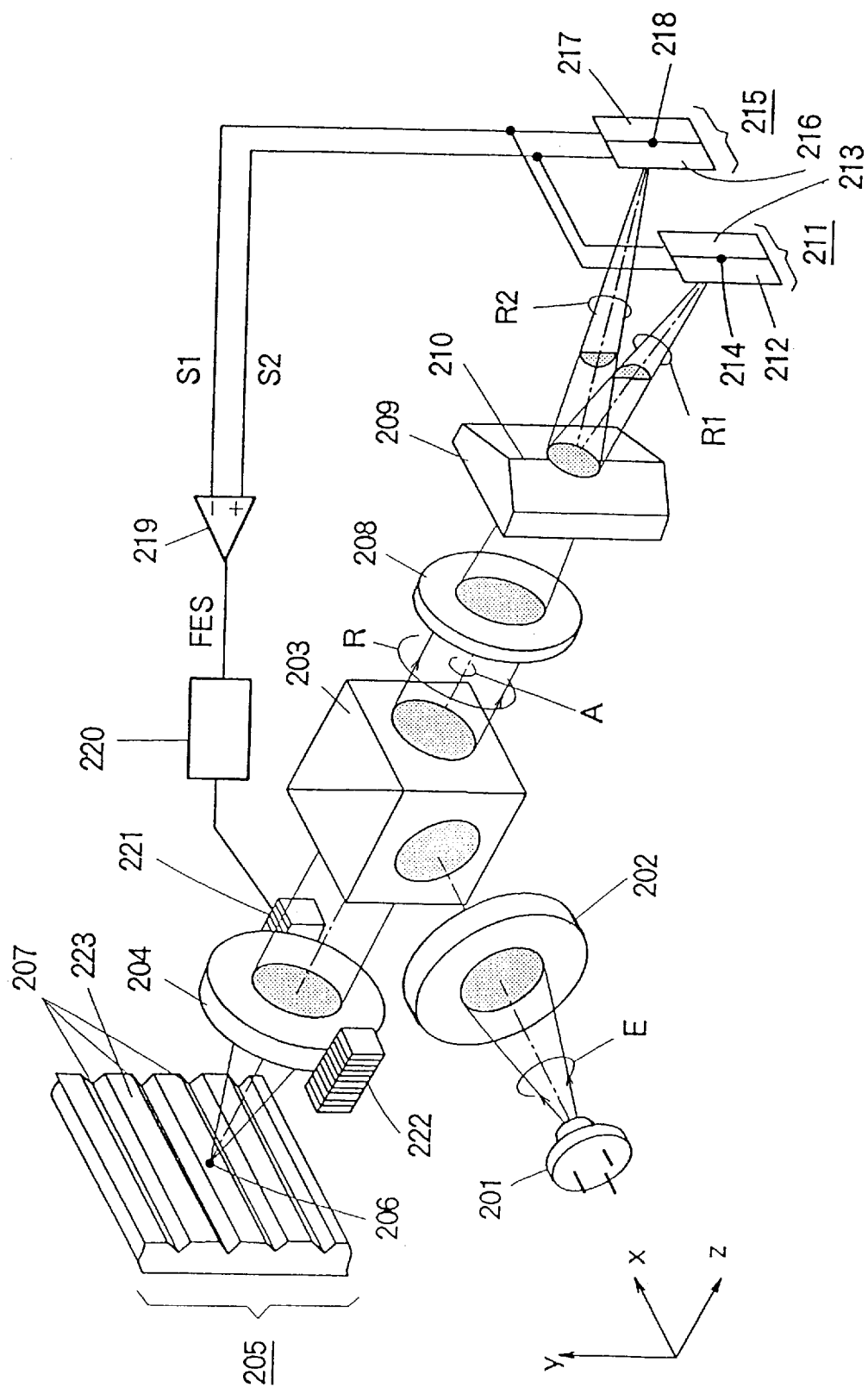
FIG. 16 is a perspective view showing a focus error detecting device of Prior Art Example 3.
Figure 17:
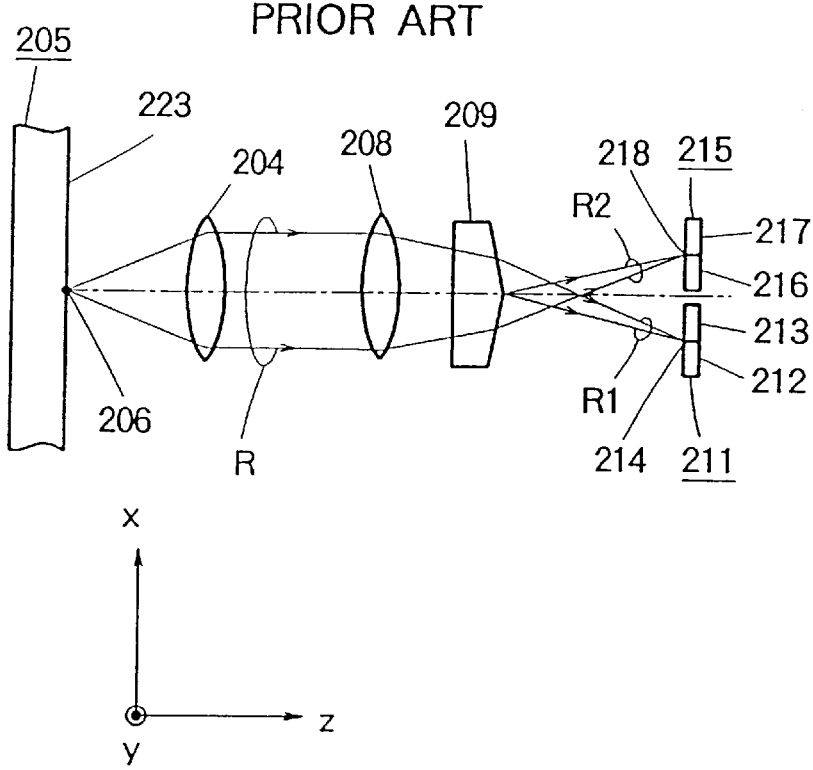
FIG. 17 is a schematic diagram showing the optical paths which are assumed when the illuminating light is focused on the information recording surface.
Figure 18:
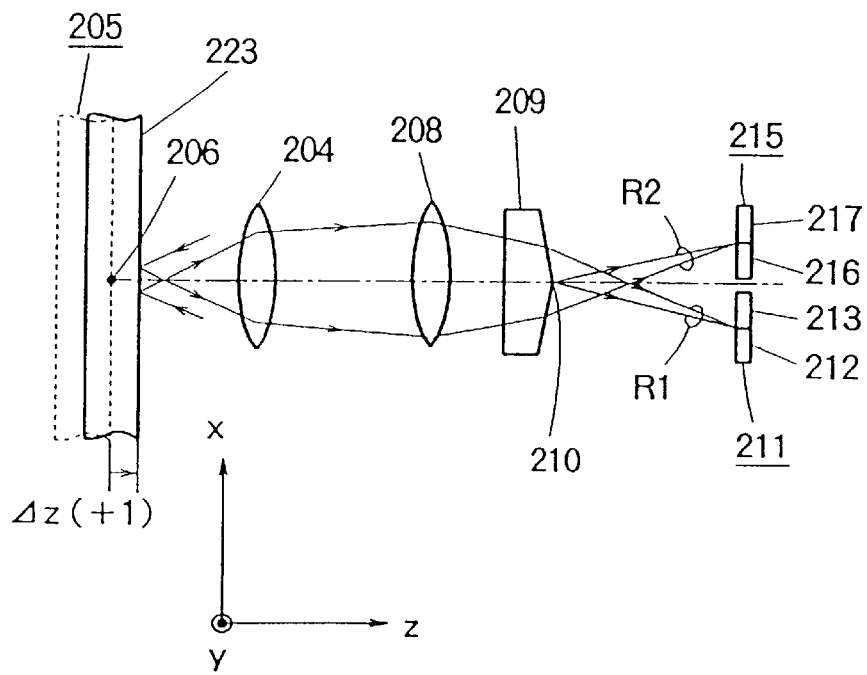
FIG. 18 is a diagram showing the light beams incident on the photodetectors in the prior art device when the information recording surface is closer to the objective lens.
Figure 19:
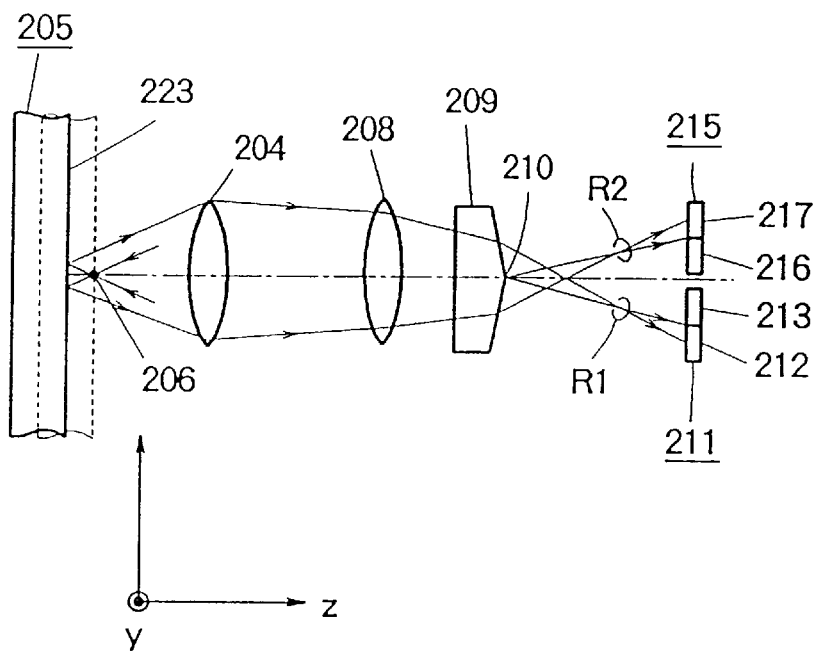
FIG. 19 is a diagram showing the light beams incident on the photodetectors in the prior art device when the information recording surface is farther from the objective lens.
Figure 20:
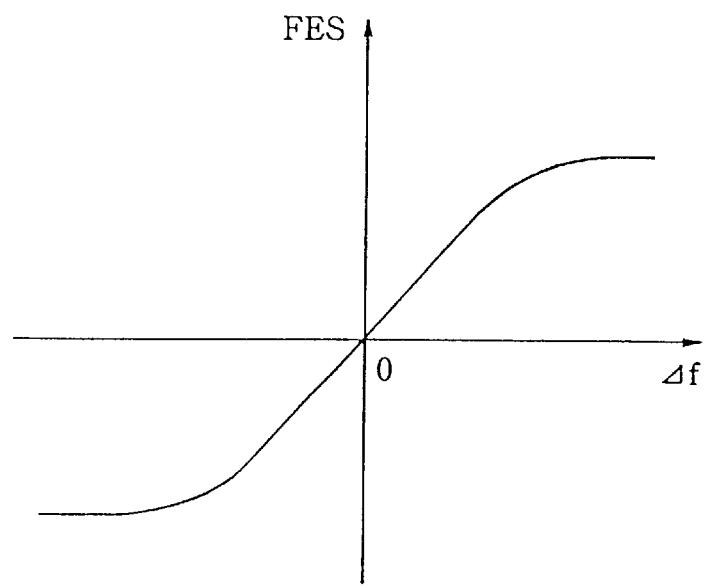
FIG. 20 is a graph showing the focus error signals obtained by the focus error detecting device of Prior Art Example 3.
Figure 21:
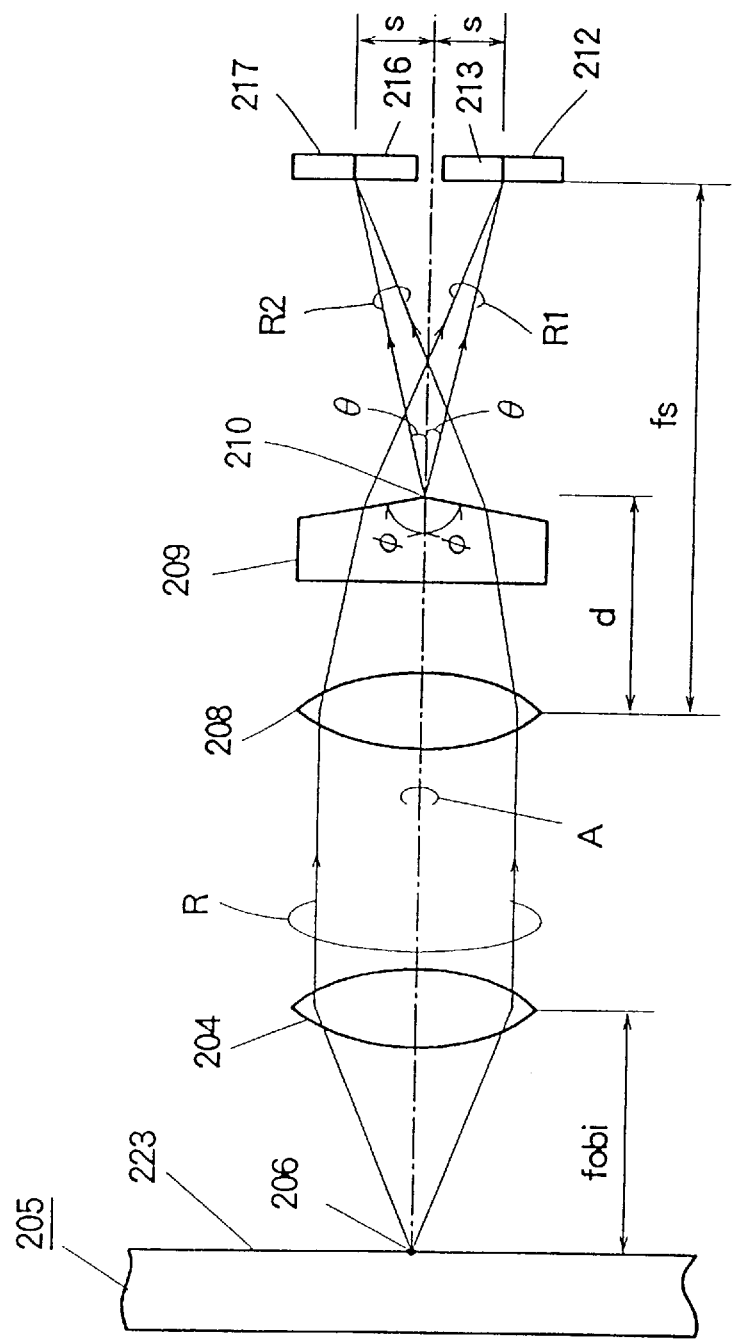
FIG. 21 is a diagram for explaining the parameters of the optical parts in the prior art focus error detecting device.
Figure 22:
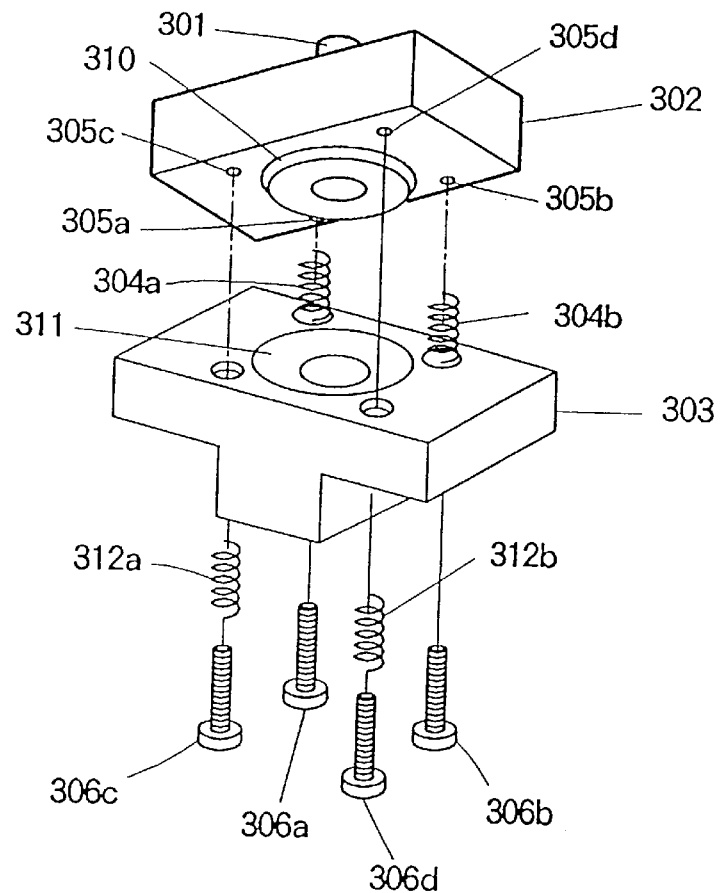
FIG. 22 is an exploded perspective view showing a pertinent part of an optical means inclination angle adjusting device of Prior Art Example 4.
Figure 23:
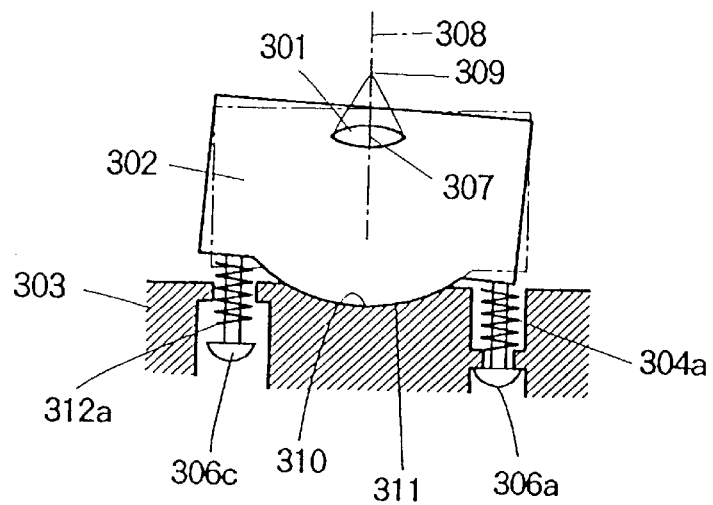
FIG. 23 is a sectional view of the optical means inclination angle adjusting device of FIG. 22.
Figures 24, 24A:
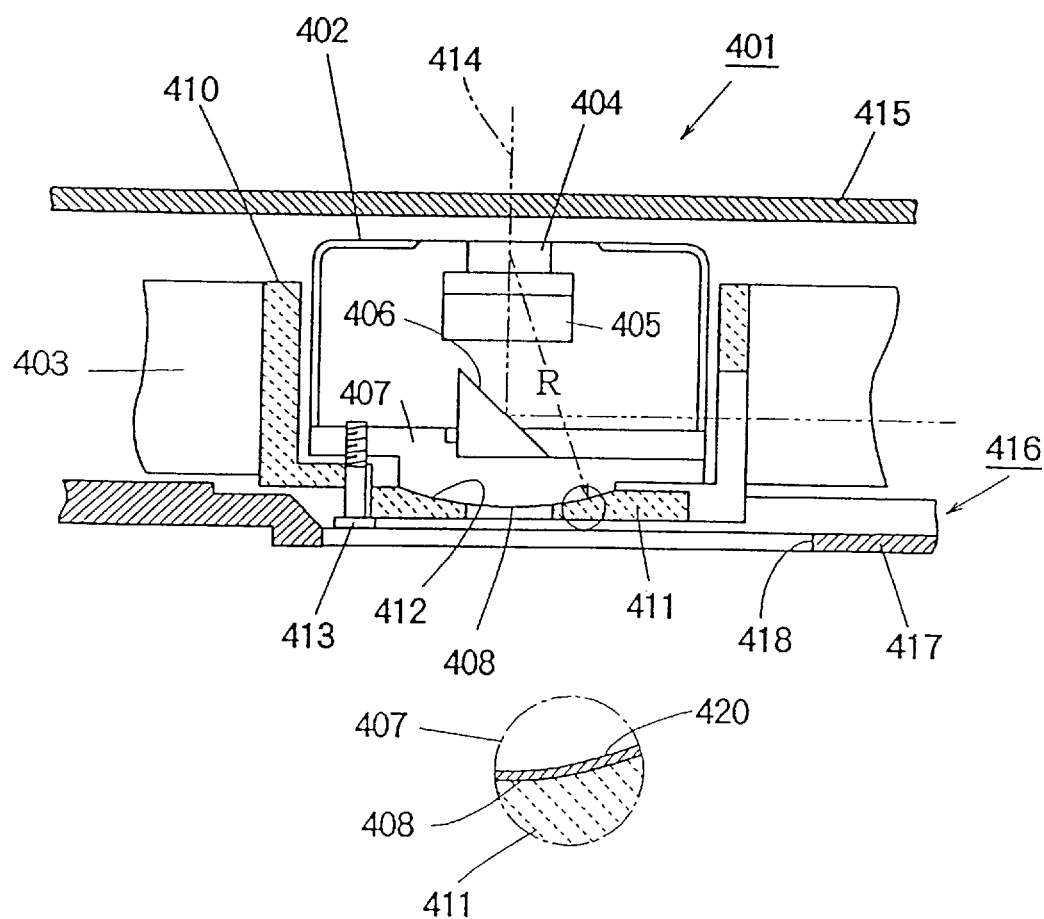
FIG. 24 is a sectional view showing the pertinent portion of an optical disk device of Prior Art Example 5.
Figure 25:
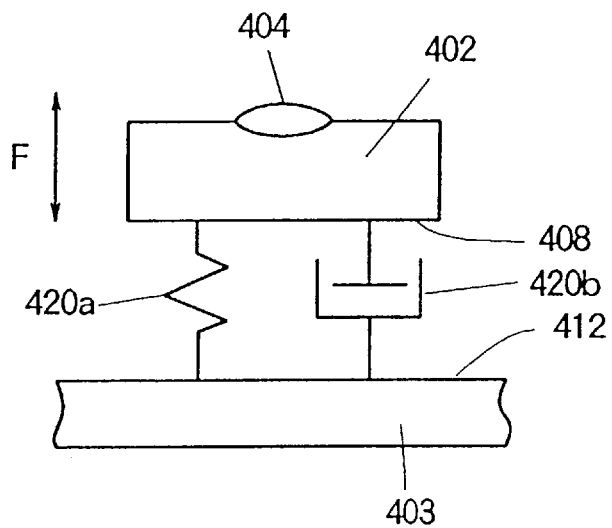
FIG. 25 is a schematic diagram for explaining the mechanical characteristics of an adhesive material for used bonding in Prior Art Example 5.
Figure 26:
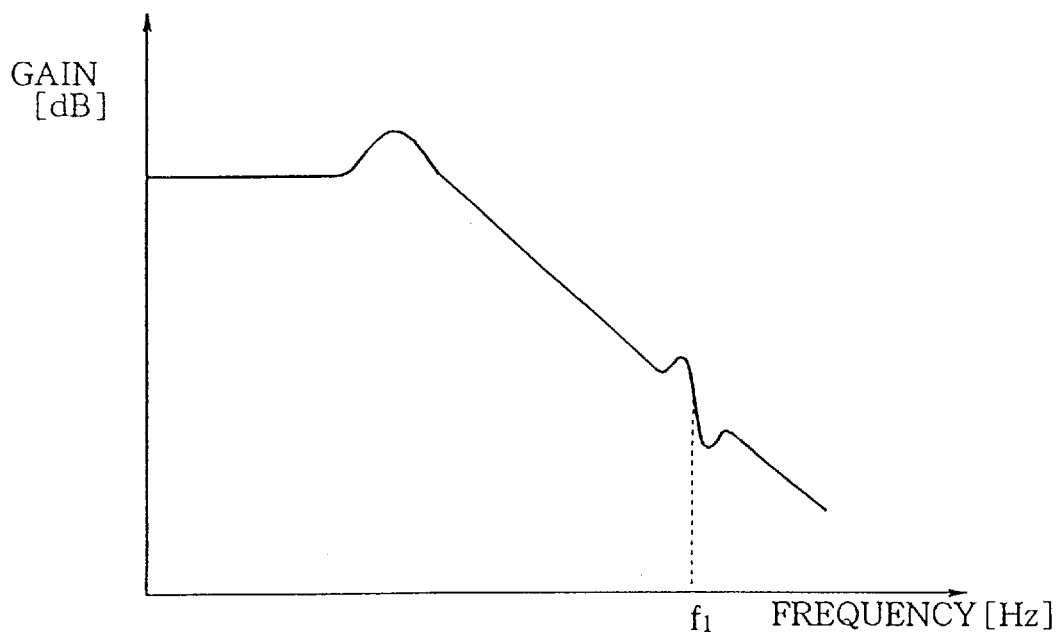
FIG. 26 is a diagram showing the focus direction frequency characteristics of the optical disk device of Prior Art Example 5.
Figure 27:
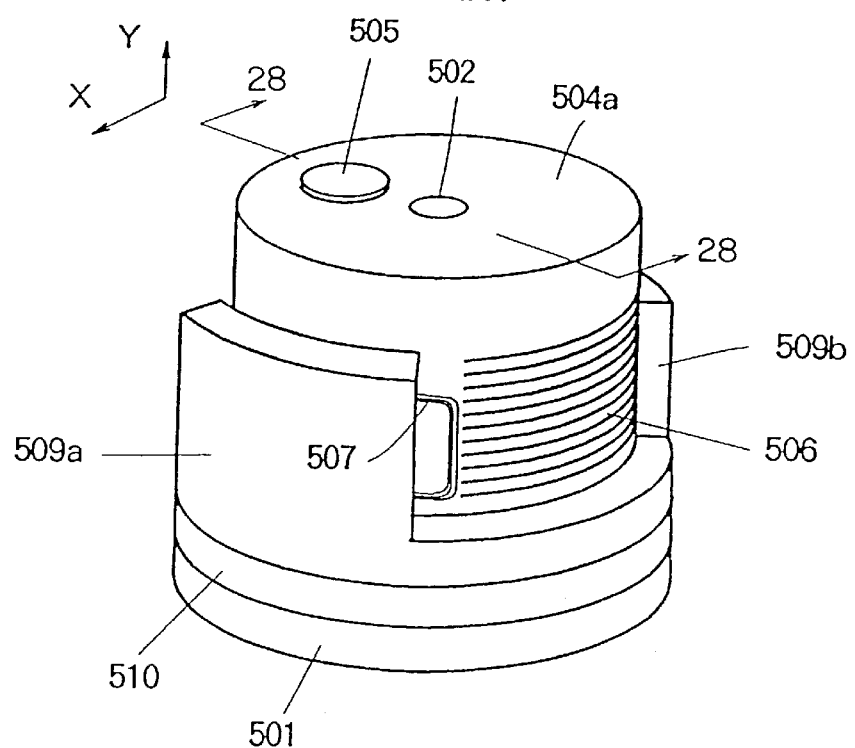
FIG. 27 is a perspective view of an objective lens drive device of Prior Art Example 6.
Figure 28:
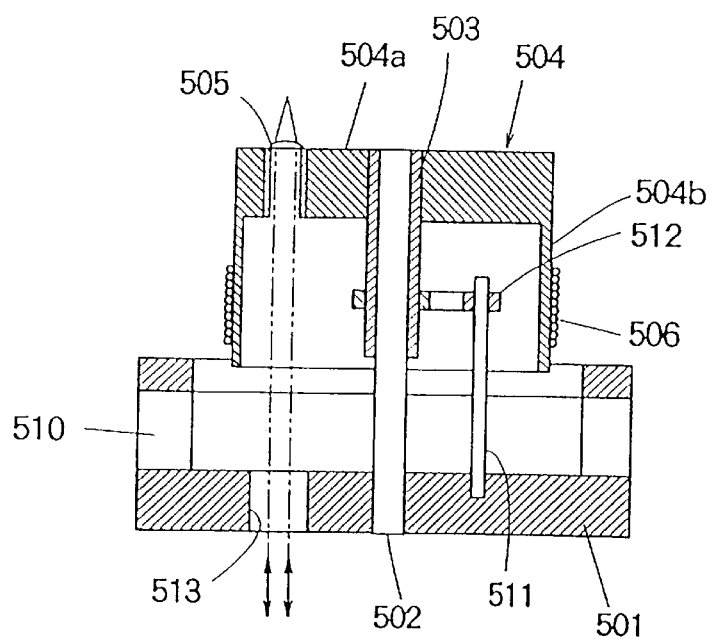
FIG. 28 is a sectional view along line A—A in FIG. 27.
Figure 53:
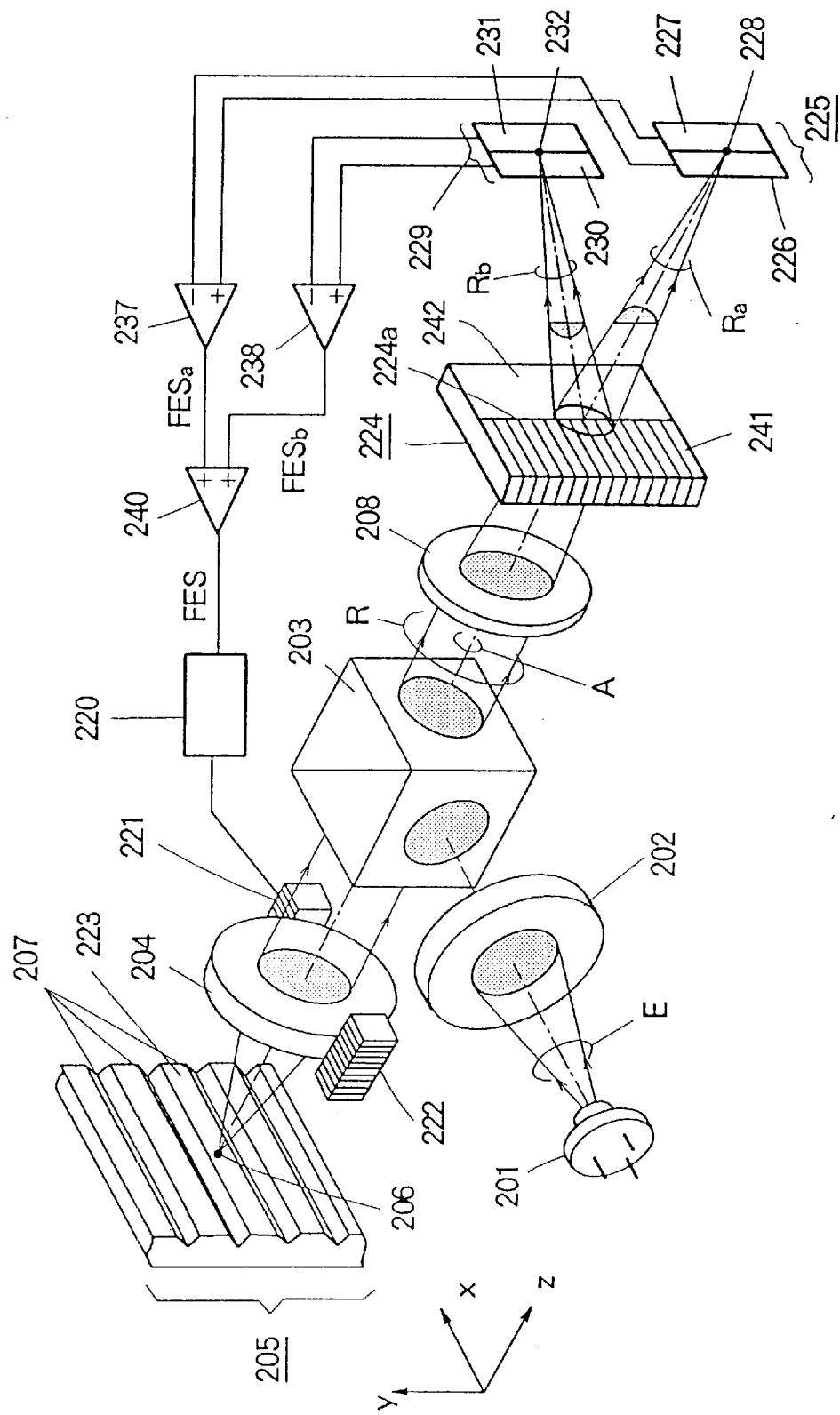
FIG. 53 is a perspective view of a focus error detecting device of Embodiment C1.

FIG. 53 shows a focus error detecting device of an embodiment, Embodiment C1, of the invention. FIG. 54 to FIG. 59 show the focusing or misfocusing and splitting of the light beams under different conditions. Members denoted by reference numerals 201 to 208 and 220 to 223 in FIG. 53 are identical or corresponding to those with identical reference numerals in FIG. 16. Denoted by reference numeral 224 is a light beam splitting element for splitting the reflected light beam R from the information recording medium 205 into two or more light beams. The light beam splitting element 224 has a diffraction grating part 241 formed on one half of the light beam splitting element 224, and a non-diffraction grating part 242 formed on the other half of the light beam splitting element 224. The diffraction grating part 241 deflects part of the light beam incident on it by diffraction. The non-diffraction grating part 242 permits passage of light (part of the reflected light incident on the non-diffraction grating part) without diffraction.

The boundary line or division line 224a between the diffraction grating part 241 and the non-diffraction grating part 242 is disposed to cross the optical axis A of the reflected light beam R and divides the reflected light beam into two equal halves. The division line 224a is orthogonal to a line tangential to a guide groove on the information recording medium on which the light is incident. In other words, a line obtained by projecting the division line 224a on the information recording medium is orthogonal to the guide grooves.

In the example illustrated, two light beams, including the light beam Ra from the non-diffraction grating part 242 and the light beam Rb from the diffraction grating part 241, are shown. However, when the diffraction grating part 241 produces two or more light beams, the light beam splitting element 224 splits the reflected light beam R into three or more light beams.

A two-division photodetector 225 receives the light beam Ra from the non-diffraction grating part 242 and is composed of light receiving surfaces 226 and 227 disposed in a plane perpendicular to the optical axis A. The light spot formed on the photodetector 225 by the light beam Ra is indicated by reference numeral 228. Another two-division photodetector 229 receives the light beam Rb from the diffraction grating part 241 and is composed of light receiving surfaces 230 and 231 disposed in a plane perpendicular to the optical axis A. The light spot formed on the photodetector 229 by the light beam Rb is indicated by reference numeral 232. The division line between the light receiving surface 226 and 227 and the division line between the light receiving surfaces 230 and 232 are parallel with the direction of the division line between the diffraction grating part 241 and non-diffraction grating part 242 (y direction).

A differential amplifier 237 determines the difference between the outputs of the light receiving surfaces 226 and 227 to produce a focus error signal FESa representing the difference. Similarly, a differential amplifier 238 determines the difference between the outputs of the light receiving surfaces 230 and 231 to produce a focus error signal FESb representing the difference. An adder 240 adds the focus error signals FESa and FESb to produce a focus error signal FES.

The operation of Embodiment C1 will next be described with reference to FIG. 54 to FIG. 59. For recording and playing back information, the emitted light beam E from the light source 201 is converted by the collimating lens 202 into a collimated light beam, and is reflected at the beam splitter 203 to be directed to the objective lens 204. The emitted light beam E is then converged by the objective lens 204 to form a focused spot 206 on the information recording surface 223. The reflected light beam R from the information recording surface 223 is passed through the objective lens 204 and the beam splitter 203, and is then converged by the converging lens 208. The reflected light beam R is then incident on the light beam splitting element 224, and one half Ra of the light beam R having a semicircular cross section which is incident on the non-diffraction grating part 242 proceeds without being deflected, and is directed to the photodetector 225. The other half Rb of the light beam R having a semicircular cross section which is incident on the diffraction grating part 241 is deflected due to diffraction and is directed to the photodetector 229.

Figure 54:
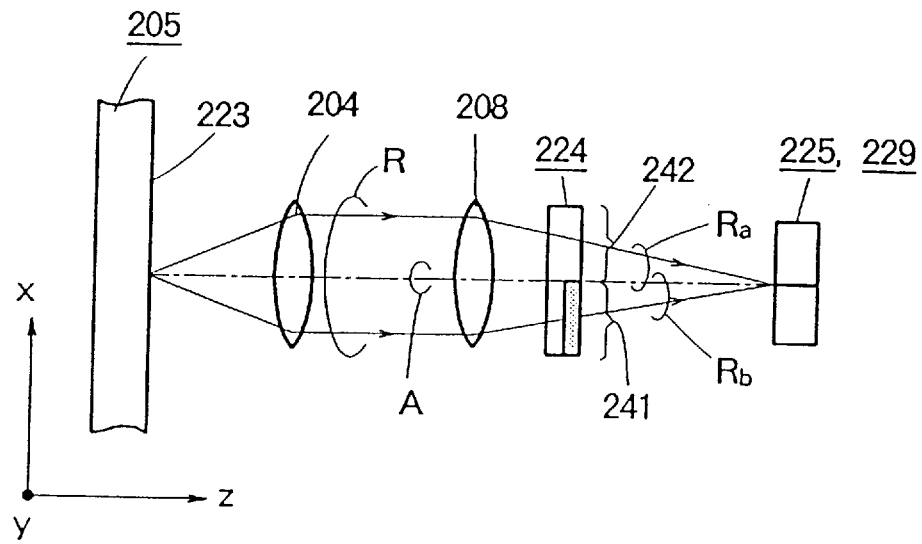
FIG. 54 is a schematic diagram showing the optical paths which are assumed when the illuminating light is focused on the information recording surface.
Figure 55:
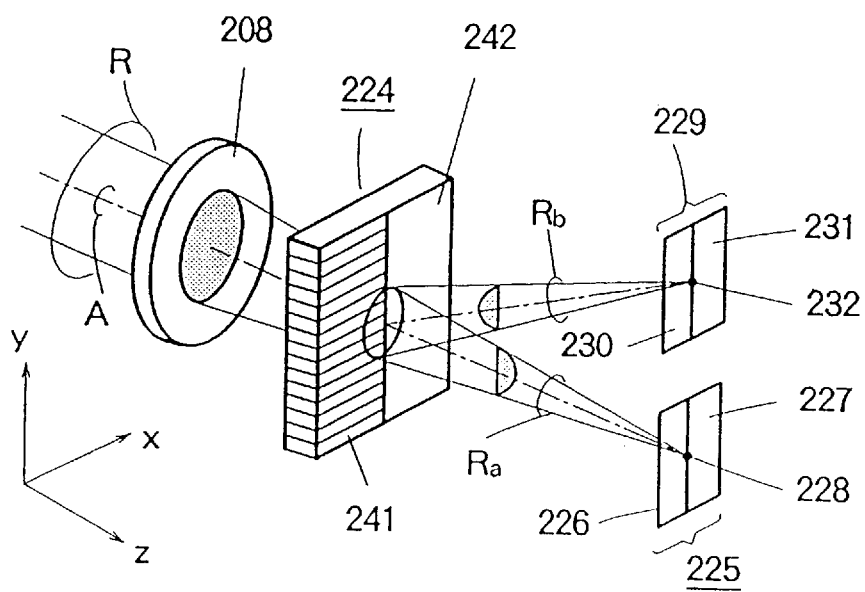
FIG. 55 is a diagram showing the light beams incident on the photodetectors of Embodiment C1 when the illuminating light is focused on the information recording surface.

As shown in FIG. 54 and FIG. 55, the photodetector 225 is so positioned that when the focused spot 206 of the emitted light beam E is on the information recording surface 223 of the information recording medium 205, the focused spot 228 of the light beam Ra is on the photodetector 225 and on the division line between the light receiving surfaces 226 and 227. Similarly, the photodetector 229 is so positioned that when the focused spot 206 of the emitted light beam E is on the information recording surface 223 of the information recording medium 205, the focused spot 232 of the light beam Rb is on the photodetector 229 and on the division line between the light receiving surfaces 230 and 231. The "focused spot" as used herein means the light spot obtained at a point where the light beam is at a minimum diameter. When the focused spot 206 of the emitted light beam 206 is on the information recording surface 223, the amounts of light received by the light receiving surfaces 226 and 227 are equal to each other, so that their outputs are equal. Also the amounts of light received by the light receiving surfaces 230 and 231 are equal to each other, and outputs of the light receiving surfaces 230 and 231 are equal. As a result, the focus error signals FESa and FESb are both zero, and the focus error signal FES which is the sum of FESa and FESb is also zero.

Figure 56:
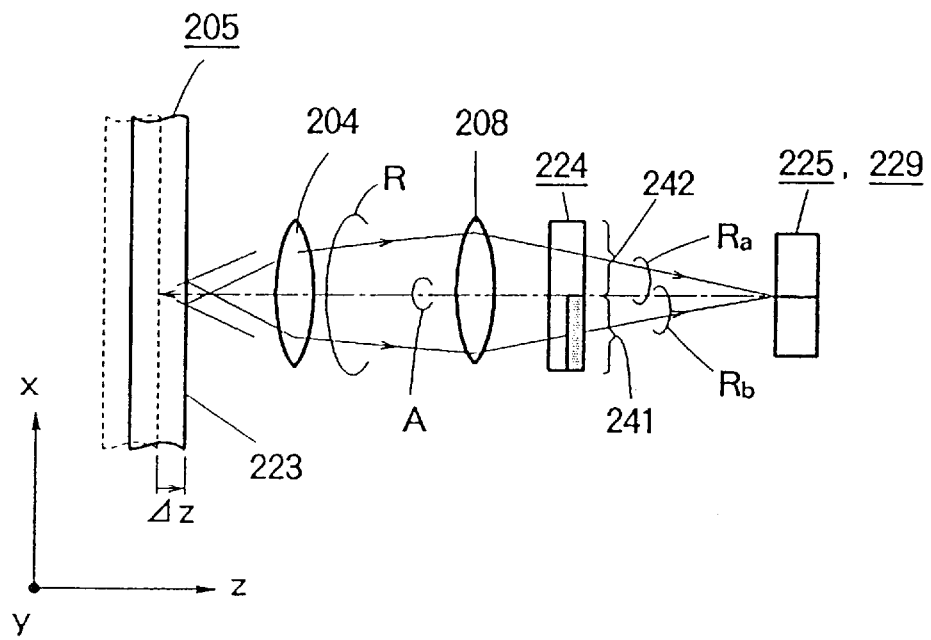
FIG. 56 is a schematic diagram showing the optical paths which are assumed when the information recording surface is closer to the objective lens than the focal point.
Figure 57:
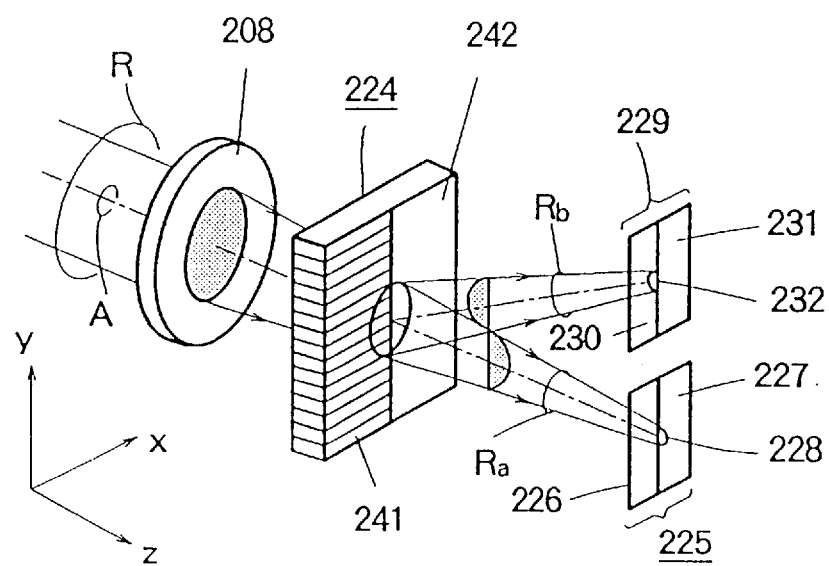
FIG. 57 is a diagram showing the light beams incident on the photodetectors of Embodiment C1 when the information recording surface is closer to the objective lens.

When the information recording medium 205 is closer to the objective lens 205 by Δz, the light beams Ra and Rb are incident on the photodetectors 225 and 229 before they are focused, as shown in FIG. 56 and FIG. 57, more of the light beam Ra is incident on the light receiving surface 227 and less on the light receiving surface 226. Similarly, more of the light beam Rb is incident on the light receiving surface 230 and less on the light receiving surface 231. As a result, the output of the light receiving surface 227 is larger than the output of the light receiving surface 226, so that the focus error signal FESa is positive, and the output of the light receiving surface 230 is larger than the output of the light receiving surface 231, so that the focus error signal FESb is positive. The focus error signal FES, which is the sum of FESa and FESb is also positive.

Figure 58:
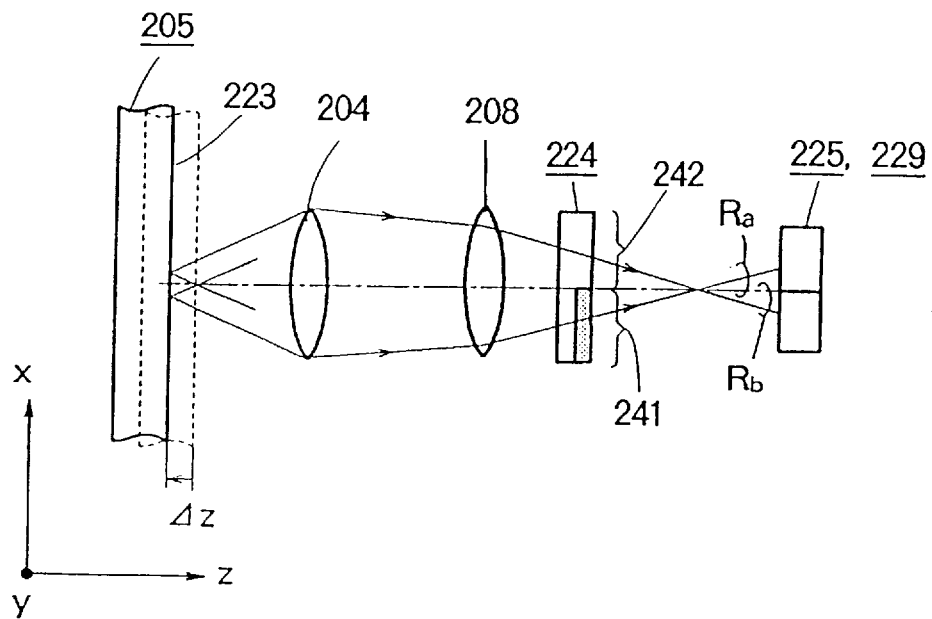
FIG. 58 is a schematic diagram showing the optical paths which are assumed when the information recording surface is farther away from the objective lens than the focal point.
Figure 59:
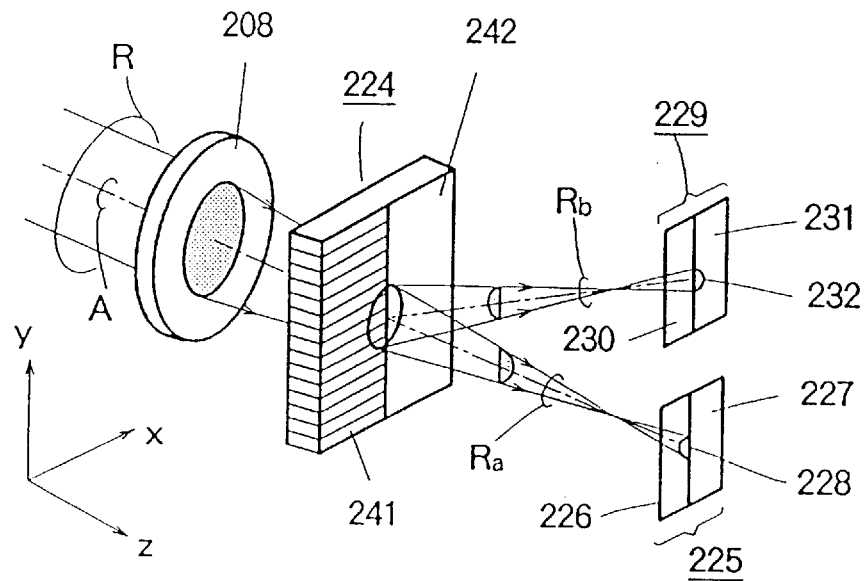
FIG. 59 is a diagram showing the light beams incident on the photodetectors of Embodiment C1 when the information recording surface is closer to the objective lens.

When the information recording medium 205 is farther away from the objective lens 205 by Δz, the light beams Ra and Rb are incident on the photodetectors 225 and 229 after they are focused, as shown in FIG. 58 and FIG. 59, more of the light beam Ra is incident on the light receiving surface 226 and less on the light receiving surface 227. Similarly, more of the light beam Rb is incident on the light receiving surface 231 and less on the light receiving surface 230. As a result, the output of the light receiving surface 226 is larger than the output of the light receiving surface 227, so that the focus error signal FESa is negative, and the output of the light receiving surface 231 is larger than the output of the light receiving surface 230, so that the focus error signal FESb is negative. The focus error signal FES, which is the sum of FESa and FESb, is also negative.

Figure 60:
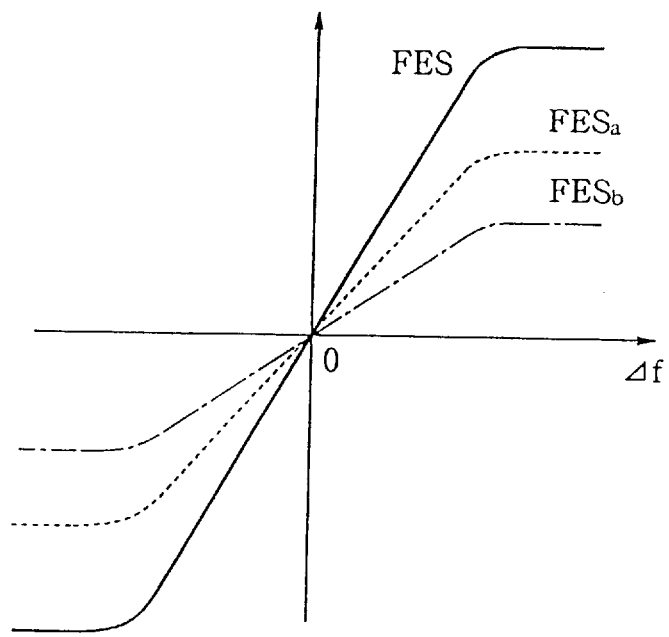
FIG. 60 is a graph showing the characteristics of the focus error signals obtained by the focus error detecting device of Embodiment 1.

In summary, when the distance between the information recording medium 205 and the objective lens 204 is appropriate and the focused spot 206 is exactly on the information recording surface 223, the focus error signal FES is zero. When the distance between the information recording medium 205 and the objective lens 204 is shorter, the focus error signal FES is positive. When the distance between the information recording medium 205 and the objective lens 204 is longer, the focus error signal FES is negative. FIG. 60 shows the relationship between the focus error Δf and the focus error signals FES, FESa and FESb. The FES is is passed through the phase compensator amplifier 220 and supplied to the objective lens drive mechanisms 221 and 222 to maintain focused spot 206 on the information recording surface 223.

The division line 224a between the diffraction grating part 241 and the non-diffraction grating part 242 of the light beam splitting element 224 has the same function as the ridge 210 (see FIG. 16) of the roof-shaped prism. As described above, the division line 224a between the diffraction grating part 241 and the non-diffraction grating part 242 extends in a direction (y direction) which is orthogonal to the tangential direction (x direction) of the guide groove 207 of the information recording medium 205. This is to minimize the effect of disturbance appearing in the focus error signal FES which may occur when the light spot 206 crosses the guide groove 207.

If the structure of the diffraction grating is so determined that substantially all the light beam incident on the diffraction grating part 241, and the photodetectors are so disposed as to receive substantially all the diffracted light beam, substantially all the light beam incident on the light beam splitting element 224 is utilized for the generation of the focus error signal FES, and an efficient focus error detecting device can be configured. Furthermore, if the period of the grating of the diffraction grating is constant, and if the diffraction grating part 241 is so formed that the grating lines are substantially perpendicular to the division line 224a, the light spot on the photodetector 229 simply moves along the division line when the wavelength of the light source 201 varies, so that no offset is generated in the focus error signal FESb or FES. The division line of the photodetector 225 and the division line of the photodetector 229 are aligned, i.e., on a common line.

The reason that two photodetectors 225 and 229 are provided to produce the focus error signal FES is that, when two photodetectors are housed in a single package, offset in the focus error signal that may be generated when the two photodetectors are shifted in the direction (x direction) perpendicular to the division line can be suppressed. The shift in the y direction does not produce the offset in the focus error signal.

The reason that the offset is suppressed against the shift in the x direction is as follows: As shown in FIG. 54 and FIG. 55, the photodetectors 225 and 229 are so positioned that when the focused spot 206 of the emitted light beam E is on the information recording surface 223, the outputs from the light receiving surfaces 226 and 227 are equal and the outputs from the light receiving surfaces 230 and 231 are equal, as described above. When the photodetectors 225 and 229 are shifted in the x direction by the same distance, the outputs of the light receiving surfaces 226 and 230 are increased while the outputs of the light receiving surfaces 227 and 231 are decreased, so FESa is decreased and FESb is increased. If the characteristics of FESa and FESb are identical, FES which is the sum of FESa and FESb is unchanged. Even if the characteristics of FESa and FESb are not identical, FESa and FESb change in opposite direction (the signs of the offsets in FESa and FESb are opposite) so that the offset in FES is smaller, as the offsets in FESa and FESb are partially canceled.

Advantages derived by the use of the light beam splitting element 224 of the above embodiment in place of the roof-shaped prism 209 are as follows:

Firstly, the width of the region forming the division line between the diffraction grating part 241 and the non-diffraction grating part 242 can be made very small (e.g., to 10 μm or less), so that the scattering at this region can be made small.

Secondly, the division line of the light splitting element 224 can be positioned with an accuracy of the order of 10 μm or less, and the light beam splitting element 224 can be made at a lower cost, compared with the roof-shaped prism. This is because the light beam splitting element can fabricated with photolithographic, etching or holographic technique, which are also used for processes of fabricating semiconductor devices.

Embodiment C2

Figure 61:
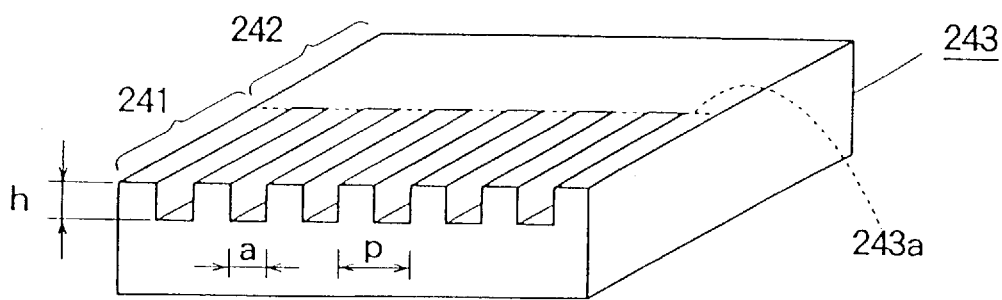
FIG. 61 is a perspective view showing a light beam splitting element having a plane diffraction grating with relief surface structures.

In place of the light beam splitting element 224 shown in FIG. 53, a light beam splitting element 243 having a plane-type diffraction part 241, shown in FIG. 61, may be used. As shown in FIG. 61, a groove has a rectangular cross section and has a two-value phase depth, the depth of the groove is h, the period is p, and the width of the groove is a. The division line 243a between the diffraction grating part 241 and the non-diffraction grating part 242 is substantially rectilinear. The direction of the grooves and the direction of the division line 243a are orthogonal to each other.

The depth h and the width a of the grooves are so selected as to substantially satisfy the following relationships:

$$h=\lambda/\{2(n-1)\} \quad (7)$$

$$a=p/2 \quad (8)$$

where

λ represents the wavelength of the light source, and n represents the index of refraction of the material forming the light beam splitting element 243.

This corresponds to applying a phase modulation of a duty ratio of 50% and the depth of 180 degrees to the incident light beam. The duty ratio of 50% means that the width of each groove is one half the pitch of the grooves. The depth of 180 degree is such a depth that produces a phase difference of 180 degrees between light that passes through the groove and light that passes through a part other than the groove. If it is assumed that there is no Fresnel loss at the front and rear surfaces of the light beam splitting element 243, 40.5% of the light beam incident on the diffraction grating part will be a first order diffraction light, another 40.5% of the light beam incident on the diffraction grating part will be a minus first order diffraction light, and the remaining 20% of the incident light beam will be third order or higher order diffraction lights, and no zero-th order diffraction light is produced.

Figure 62:
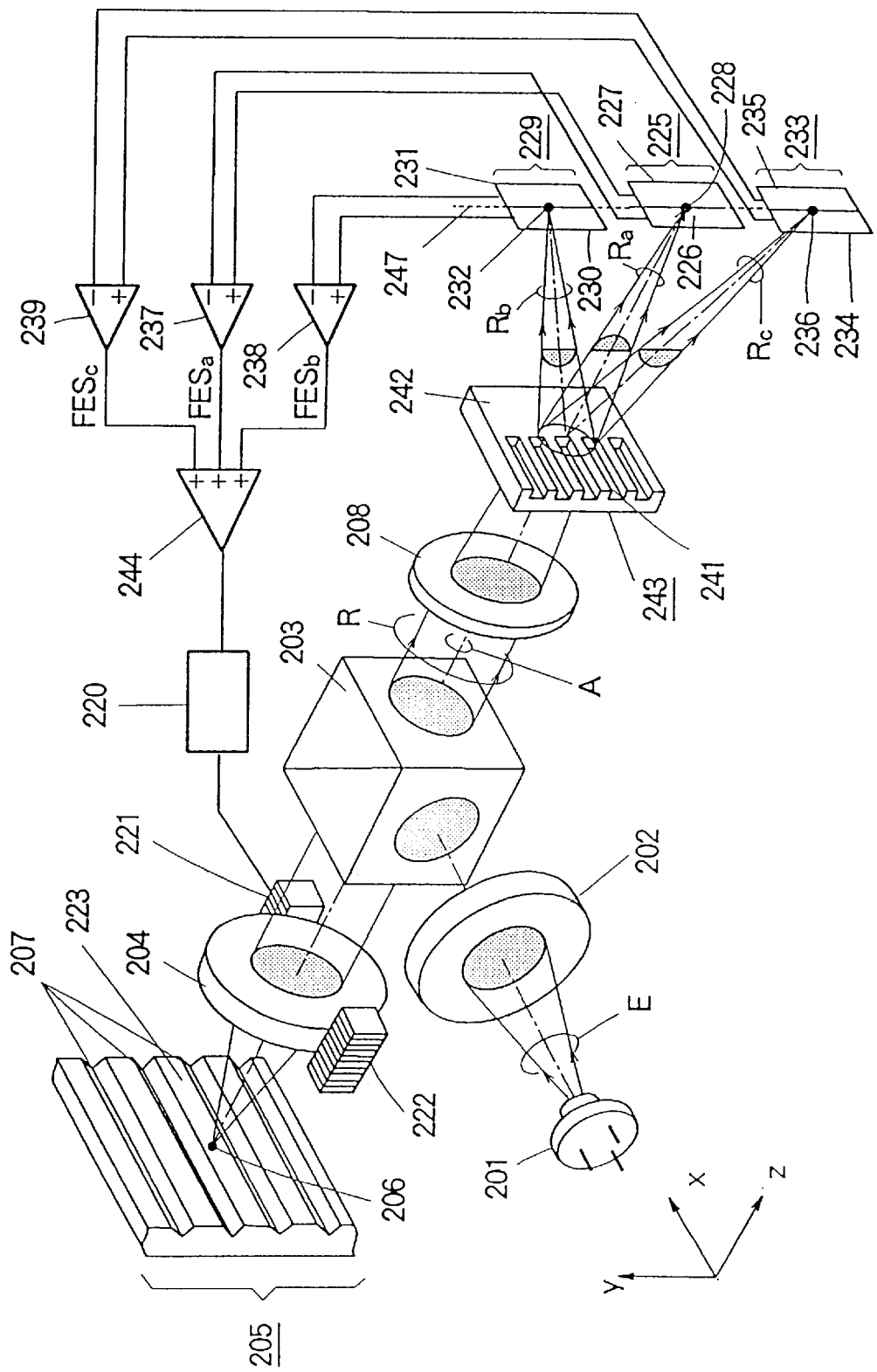
FIG. 62 is a diagram showing a focus error detecting device of Embodiment C2.
Figure 63:
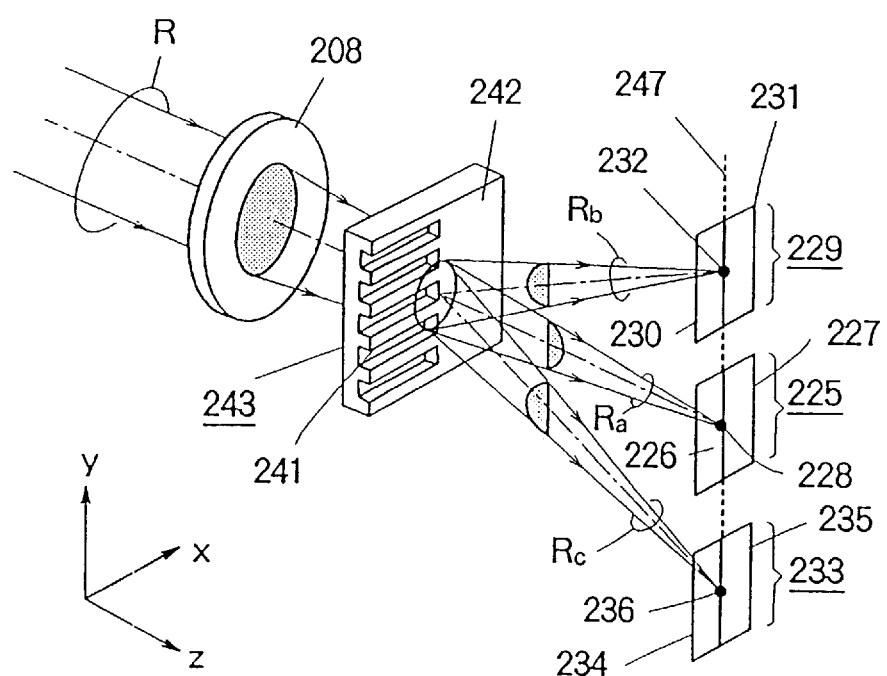
FIG. 63 is a diagram showing the light beams incident on the photodetectors of Embodiment C2 when the illuminating light is focused on the information recording surface.
Figure 64:
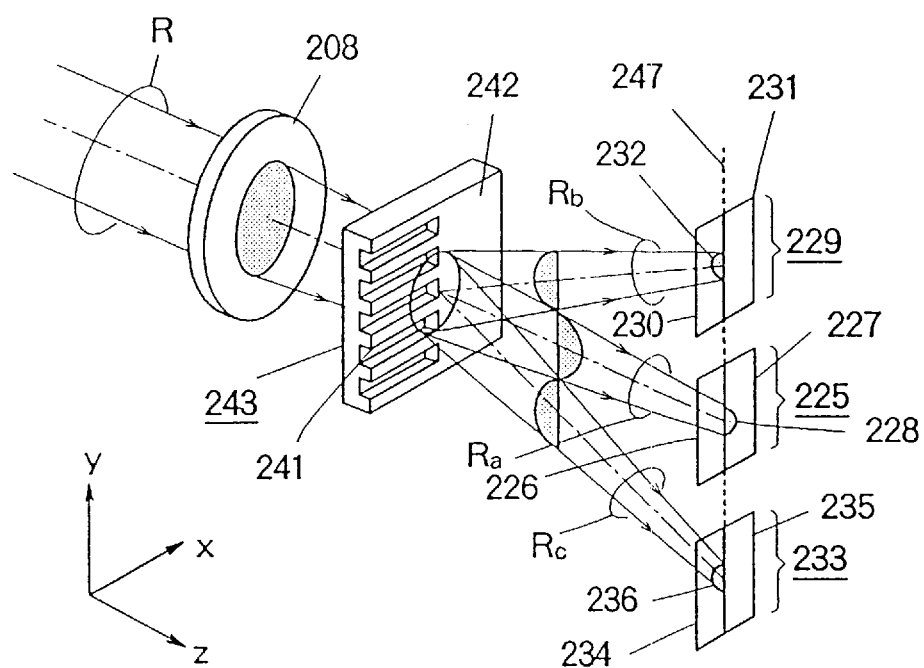
FIG. 64 is a diagram showing the light beams incident on the photodetectors of Embodiment C2 when the information recording surface is closer to the objective lens.
Figure 65:
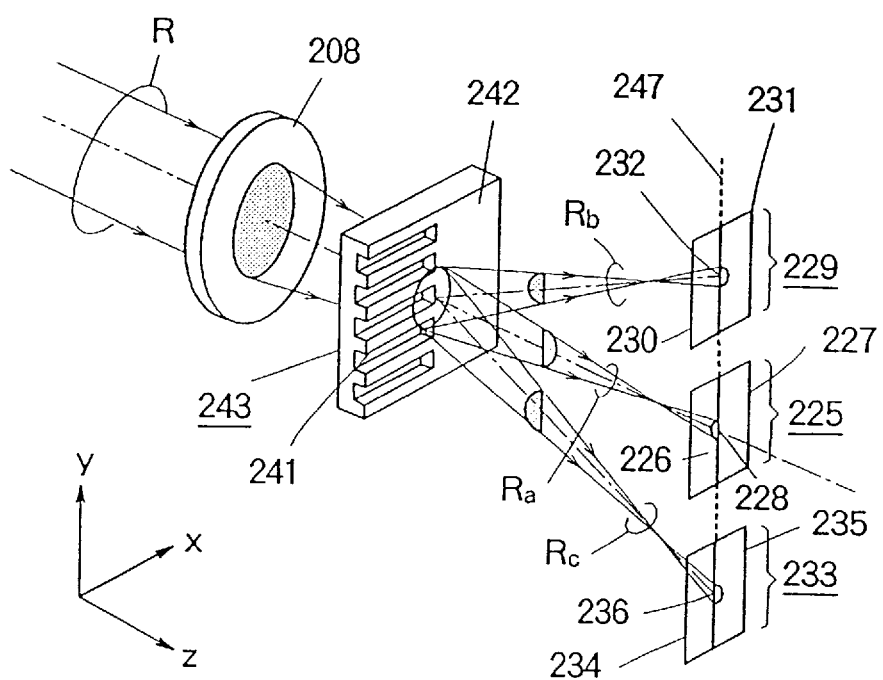
FIG. 65 is a diagram showing the light beams incident on the photodetectors of Embodiment C2 when the information recording surface is farther away from the objective lens.

FIG. 62 shows a focus error detecting device according to Embodiment C2. FIG. 63 to FIG. 65 shows how the split beams are focused under different conditions. Reference numerals 201 to 208, 220 to 223, 225 to 238, 241 and 242 in FIG. 62 denote elements identical or corresponding to those of Embodiment C1 denoted by identical reference numerals.

The light beam splitting element 243 splits the reflected light beam R from the information recording medium 205 into three light beams Ra, Rb and Rc, and the division line between the diffraction grating part 241 and the non-diffraction grating part 242 divides the reflected light beam R into substantially equal halves. The light beam Ra is that part of the reflected light beam R which is passed without being diffracted. The light beam Rb is the plus first order diffraction light diffracted at the diffraction grating part 242. The light beam Rc is the minus first order diffraction light diffracted at the diffraction grating part 242. If the reflected light beam R incident on the diffraction grating part 242 has a completely circular cross section having a uniform intensity distribution, and the division line is exactly at the center of the circular cross section of the reflected light beam, then 50% of the reflected light beam R will be the light beam Ra, 20.25% of the reflected light beam R will be the light beam Rb, and another 20.25% of the reflected light beam R will be the light beam Rc. The remaining 9.5% of the reflected light beam R will produce diffracted light beams of higher orders which are deflected at a greater deflection angles, so that they are not received by the photodetectors in FIG. 62. However, if desired, additional photodetectors may be provided to receive the higher order diffraction light.

If the three light beams Ra, Rb and Rc are used, about 90% of the incident light beam is utilized for the generation of the focus error signal FES. If the diffraction lights of the higher order are additionally used, greater part (nearer to 100%) of the incident light is utilized.

In FIG. 62, a two-division photodetector 233 for receiving the light beam Rc are provided in addition to the photodetectors 225 and 229 receiving the light beams Ra and Rb. The photodetector 233 is formed of light receiving surfaces 234 and 235 arranged in a plane perpendicular to the optical axis A. The light spot on the photodetector 233 is indicated by reference numeral 236. The direction of the division line between the light receiving surfaces 234 and 235 is identical to the directions of the division line between the diffraction grating part 241 and the non-diffraction grating part 242, i.e., the y direction, and the division lines of the three photodetectors 225, 229 and 233 are aligned with each other, i.e., on a common line 247.

FESa and FESb denote the focus error signals from the photodetectors 225 and 229, like in Embodiment C1, while FESc denotes a focus error signal obtained from the photodetector 33 and represents the difference between the outputs of the light receiving surfaces 234 and 235. A differential amplifier 239 determines the difference to obtain the focus error signal FESc. An adder 244 adds the focus error signals FESa, FESb and FESc to produce the focus error signal FES.

The operation of the present embodiment will next be described with reference to FIG. 63 to FIG. 65. For recording and playing back information, the emitted light beam from the light source 201 is converted by the collimating lens 202 into a collimated light beam and is then reflected by the beam splitter 203 to be directed to the objective lens 204. The emitted light beam E is then converged by the objective lens 204 to form a focused spot 206 on the information recording surface 223. The reflected light beam R from the information recording surface 223 is passed through the objective lens 204 and the beam splitter 203 and is converged by the converging lens 208. The process described so far is identical to that of Embodiment C1.

The reflected light beam R is split by the light beam splitting element 243 into three light beams Ra, Rb and Rc. The light beam Ra is incident on the photodetector 225, the light beam Rb is incident on the photodetector 229 and the light beam Rc is incident on the photodetector 233. The cross sections of the light beams Ra, Rb and Rc are semicircular, as shown in FIG 62.

The operation for detecting the focus error in this embodiment is identical to that of Embodiment C1. The difference is that the light beam Rc is also used in the same way as the light beam Rb. FIG. 63 shows the focused spots 228, 232 and 236 on the photodetectors 225, 229 and 233 that result when the focused spot of the emitted light beam E is on the information recording surface 223 of the information recording medium 205. The diffraction grating on the light beam splitting element 243 has grating lines which are linear and of a constant interval, so that the light beam incident on the diffraction grating part is deflected in a direction perpendicular to the directions of the grating lines. The focused spots 228, 232 and 234 are aligned with each other along a linear line 247. The amounts of light incident on the light receiving surfaces 234 and 235 are equal, and the outputs from the light receiving surfaces 234 and 235 are also equal to each other. Focus error signal FESc is therefore zero, as are the focus error signals FESa and FESb. The focus error signal FES, which is the sum of FESa, FESb and FESc, is also zero.

FIG. 64 shows the focused spots 228, 232 and 236 on the photodetectors 225, 229 and 233 that result when the information recording medium 205 is closer to the objective lens 204 by ΔZ. More of the light beam Rc is received by the light receiving surface 234 while less is by the light receiving surface 235. The focus error signal FESc which is the difference between the outputs of the light receiving surfaces 234 and 235 will be positive, as do the the focus error signals FESa and FESb. The focus error signal FES which is the sum of FESa, FESb and FESc will therefore be positive.

FIG. 65 shows the focused spots 228, 232 and 236 on the photodetectors 225, 229 and 233 that result when the information recording medium 205 is farther away from the objective lens 204 by ΔZ. More of the light beam Rc is received by the light receiving surface 235 while less is by the light receiving surface 234. The focus error signal FESc which is the difference between the outputs of the light receiving surfaces 234 and 235 will be negative, as do the the focus error signals FESa and FESb. The focus error signal FES which is the sum of FESa, FESb and FESc will therefore be negative.

Figure 66:
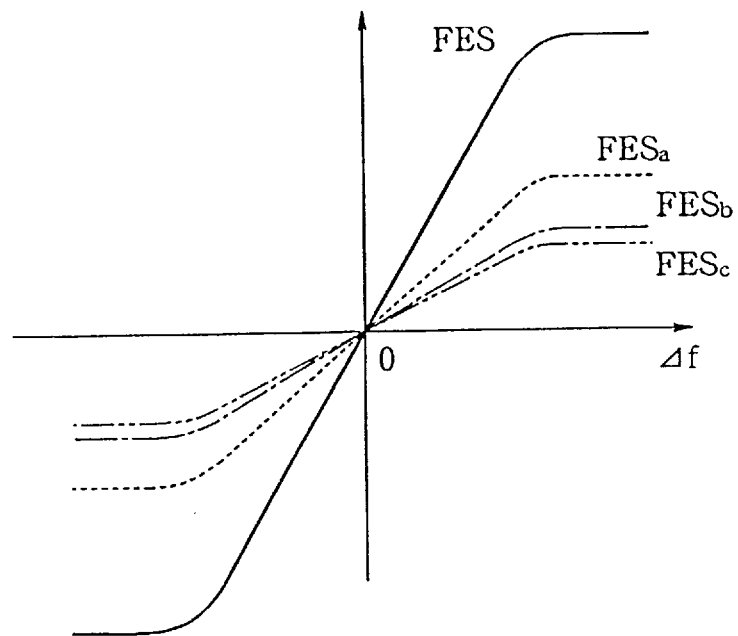
FIG. 66 is a graph showing the focus error signals obtained by the focus error detecting device of Embodiment 2.

FIG. 66 shows the relationship between the focus error Δf (the distance between the focused spot 206 and the information recording surface 223) and the focus error signals FESa, FESb, FESc and FES.

In order to minimize the disturbance in the focus error signal FES when the light spot 206 crosses the guide grooves 207, the direction of the division line between the diffraction grating part 241 and the non-diffraction grating part 242 is set at a direction orthogonal to the tangential direction (x direction) of the guide grooves 207.

The reason that three photodetectors 225, 229 and 233 are provided to produce the focus error signal FES is that where three photodetectors are housed in a single package, the offset in the focus error signal that may be generated when the three photodetectors are shifted in the direction (x direction) perpendicular to the division line can he suppressed. The shift in the y direction does not produce the offset in the focus error signal.

The reason that the offset is suppressed against the shift in the x direction is identical to that described with reference to Embodiment C1.

As illustrated in FIG. 63, the photodetectors 225, 229 and 233 are so positioned that when the focused spot 206 of the emitted light beam E is on the information recording surface 223, the outputs from the light receiving surfaces 226 and 227 are equal, and the outputs from the light receiving surfaces 230 and 231 are equal, and the outputs from the light receiving surfaces 234 and 235 are equal, as described above. When the photodetectors 225, 229 and 233 are shifted in the x direction by the same distance, the outputs of the light receiving surfaces 226, 230 and 234 are increased while the outputs of the light receiving surfaces 227, 231 and 235 are decreased, so FESa is decreased and FESb and FESc are increased. The sign of the offset of the focus error signal FESa and the sign of the offsets of the focus error signals FESb and FESc are opposite, so that the the offset of the focus error signal FES which is their sum is smaller than the offsets of the focus error signals FESa, FESb or FESc.

Figure 67:
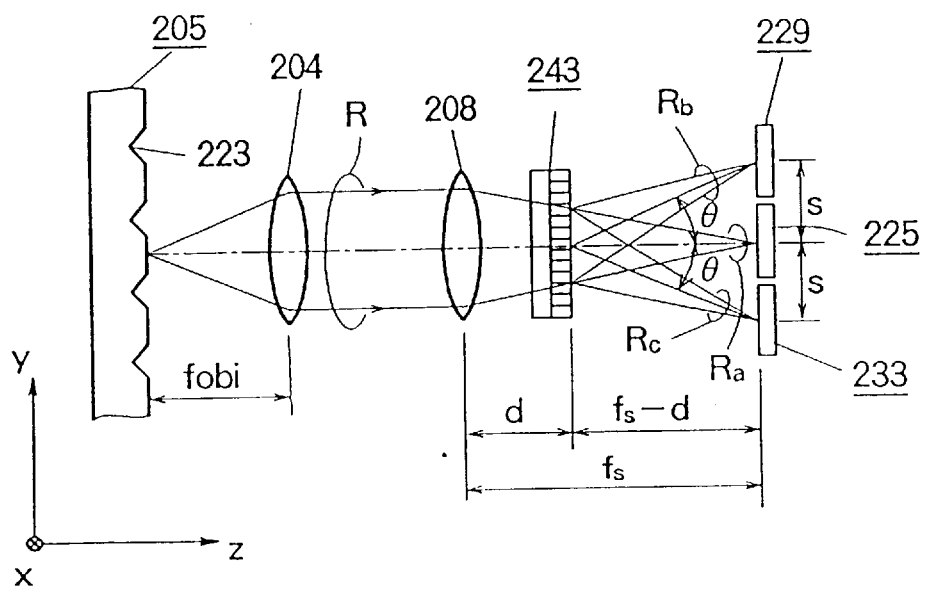
FIG. 67 is a diagram for explaining the parameters of the optical parts in the focus error detecting device of Embodiment C2.

Now consideration is given, with reference to FIG. 67, to the parameters of the optical parts in a situation where Embodiment C2 is applied to a focus error detecting device of a typical optical disk device. Assume that the numerical aperture NAobj of the objective lens 204 is 0.55, the diameter of the entrance pupil of the objective lens 204 is 3 mm, the focus length fobj of the objective lens is 3.3 mm, the focus length fs of the converging lens is 33 mm, the optical distance d from the converging lens 208 to the light beam splitting element 243 is 11 mm, and the distance s from the center of the photodetector 229 or 233 to the photodetector 225 is 0.3 mm (in such a case (where s=0.3 mm or less) it is easy to accommodate the photodetectors 225, 229 and 233) in one package. These values are identical to those of the situation where the conventional focus error detecting device described above is applied to the above-mentioned typical optical disk device. The deflection angle θ is so set as to satisfy the following relationship.

$$\theta = \text{Arc tan}\,\{s/(fs-d)\} \qquad (9)$$

The period of the diffraction grating is related to the wavelength λ and the deflection angle θ as follows:

$$p = \lambda/\sin\theta \qquad (10)$$

If λ is 0.78 μm, θ and p are given by:

$$\theta = \text{Arc tan}\,\{0.3/(33-11)\} = 13.6(\text{mrad}) \qquad (11)$$

$$p = 0.78/\sin\,(0.0136) = 57.2(\mu m) \qquad (12)$$

In view of the equations (7) and (8), the depth h and the width a of the groove of the diffraction grating are given as follows:

$$h = 0.78/\{2(1.5-1)\} = 0.78(\mu m) \qquad (13)$$

$$a = 57.2/2 = 28.6(\mu m) \qquad (14)$$

Forming diffraction grating having grooves with a rectangular cross section with a depth of 0.78 μm and a width of 28.6 μm by photolithography is achieved without difficulty.

Finally, let us consider a situation where the wavelength λ varies. The deflection angle θ varies in accordance with equation (10), so that the positions of the focused spots 232 and 236 on the photodetectors 229 and 233 of the diffracted light beams Rb and Rc vary. However, the three focused spots, 228, 232 and 236 are originally on the common line 247, and the division lines of the photodetectors 225, 229 and 233 are also on the common line 247, so that the focused spots move along the division lines. Moreover, the diffraction grating having a constant interval does not have any lens effect, so that the size and shape of the focused spots do not vary. As a result, the effect given by the variation in the wavelength of the light source on the size and shape of the focused spots is negligible.

In the embodiments described, the diffraction grating part 241 and the non-diffraction grating part 242 are transparent. However, they may be of a reflection type.

FIG. 62, the light beam splitting element 243 is placed in a converging light beam, but it may be provided In a collimated light beam. In this case, the converging lens 208 is provided between the light beam splitting element 243 and the photodetectors 225, 229 and 233.

Figure 68:
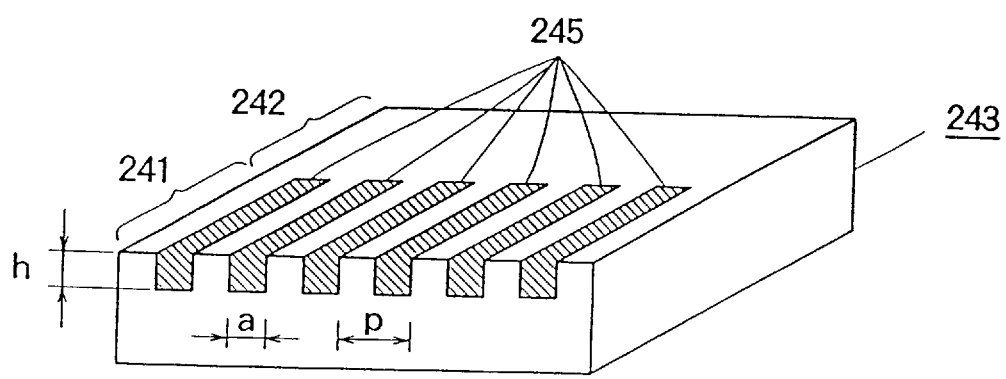
FIG. 68 is a perspective view showing a light beam splitting element having a plane diffraction grating of a refraction index modulation type.

In FIG. 62, the diffraction grating part 241 is formed as a relief structure on the surfaces of the light beam splitting element 243. However, the diffraction grating part may be formed as a refraction index modulation type structure, shown in FIG. 68. In the figure, regions 245 have a refraction index varied by $\Delta n$ relative to the refraction index n of the substrate of the light beam splitting element, and have a depth h, and a width a, and a pitch p. It is desirable if the depth h and the width a are so selected to substantially satisfy the following relationships:

$$h=\lambda/(\Delta n) \tag{15}$$

$$a=p/2 \tag{16}$$

The above conditions are identical to those of equations (7) and (8), and correspond to application of a phase modulation of a duty ratio of 50% and the depth of 180 degrees to the incident light beam.

The description has been made with respect to a situation where the present invention is applied to the focus error detecting device of an optical recording/playback device. The invention however can be applied to an automatic focusing cameras.

Because the focus error detecting device of the above embodiments is configured as described above, it has the following advantages.

Since the light beam splitting element having a diffraction grating formed on one half thereof is used, the focus error detecting device is less costly and its operation is stable and efficient.

When a light beam splitting element having a plane-type diffraction grating, the plane-type diffraction grating is formed with photolithographic and etching technique, a focus error detecting device which has a simple construction and has a stable performance and which is less costly can be realized. If the characteristics of FESa and FESb are identical, the shift of the photodetectors mounted in one package hardly affects FES which is the sum of FESa and FESb. Even if the characteristics of FESa and FESb are not identical, FESa and FESb change in opposite direction (the signs of the offsets in FESa and FESb are opposite) so that the offset in FES is smaller, as the offsets in FESa and FESb are partially canceled.

Advantages derived by the use of the light beam splitting element 224 of the above embodiment in place of the roof-shaped prism 209 are as follows:

Firstly, the width of the region forming the division line between the diffraction grating part 241 and the non-diffraction grating part 242 can be made very small (e.g., to $10\mu$ or less), so that tire scattering at this region can be made small.

Secondly, the division line of the light splitting element 224 can be positioned with an accuracy of the order of 10 $\mu$m or less, and the light beam splitting element 224 can be made at a lower cost, compared with the roof-shaped prism. This is because the light beam splitting element can fabricated with photolithographic, etching or holographic technique, which are also used for processes of fabricating semiconductor devices.

With the configuration of Embodiments C1 and C2, part of the light beam incident on the diffraction grating is deflected while the remaining part is not deflected, so that the reflected light beam is split.

When the plane-type diffraction grating is used, the phase of the wave front of the incident light beam is spatially modulated to form a diffracted light.

Embodiment C3

Figure 69:
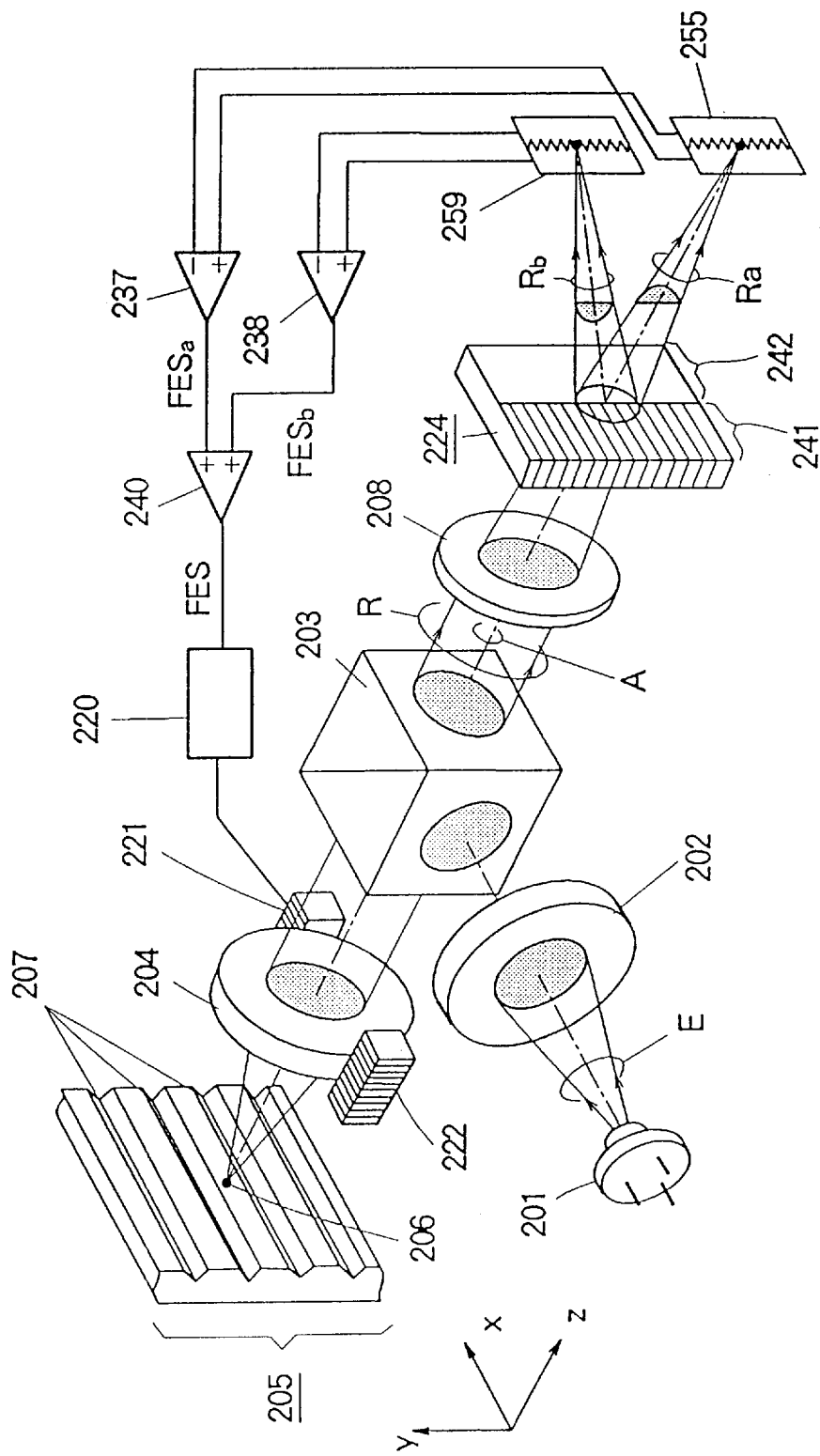
FIG. 69 is a perspective view of a focus error detecting device of Embodiment C3.

FIG. 69 shows a focus error detecting device of an embodiment, Embodiment C3. The illustrated focus error detecting device is similar to the focus, error detecting device of Embodiment C1. But for the two-division photodetectors, those described in connection with Embodiment B1 are used. In other words, embodiment C3 is formed by combining the inventive concept of Embodiment B1 with the inventive concept of Embodiment C1. Advantages of the focus error detecting device Embodiment C3 are that the range over which the output signal varies linearly with respect to the focus error is wider compared with the conventional Foucault method; that the cost of the optical system is lower; that there is not degradation in the frequently response in the detection of the information signals; that the disturbances at the time when the focused light spot crosses the guide grooves on the information recording medium is small, like the conventional Foucault method shown FIG. 16; and the variation in the focus error signal due to the lateral shifting of the photodetectors is small.

Embodiment C4

Figure 70:
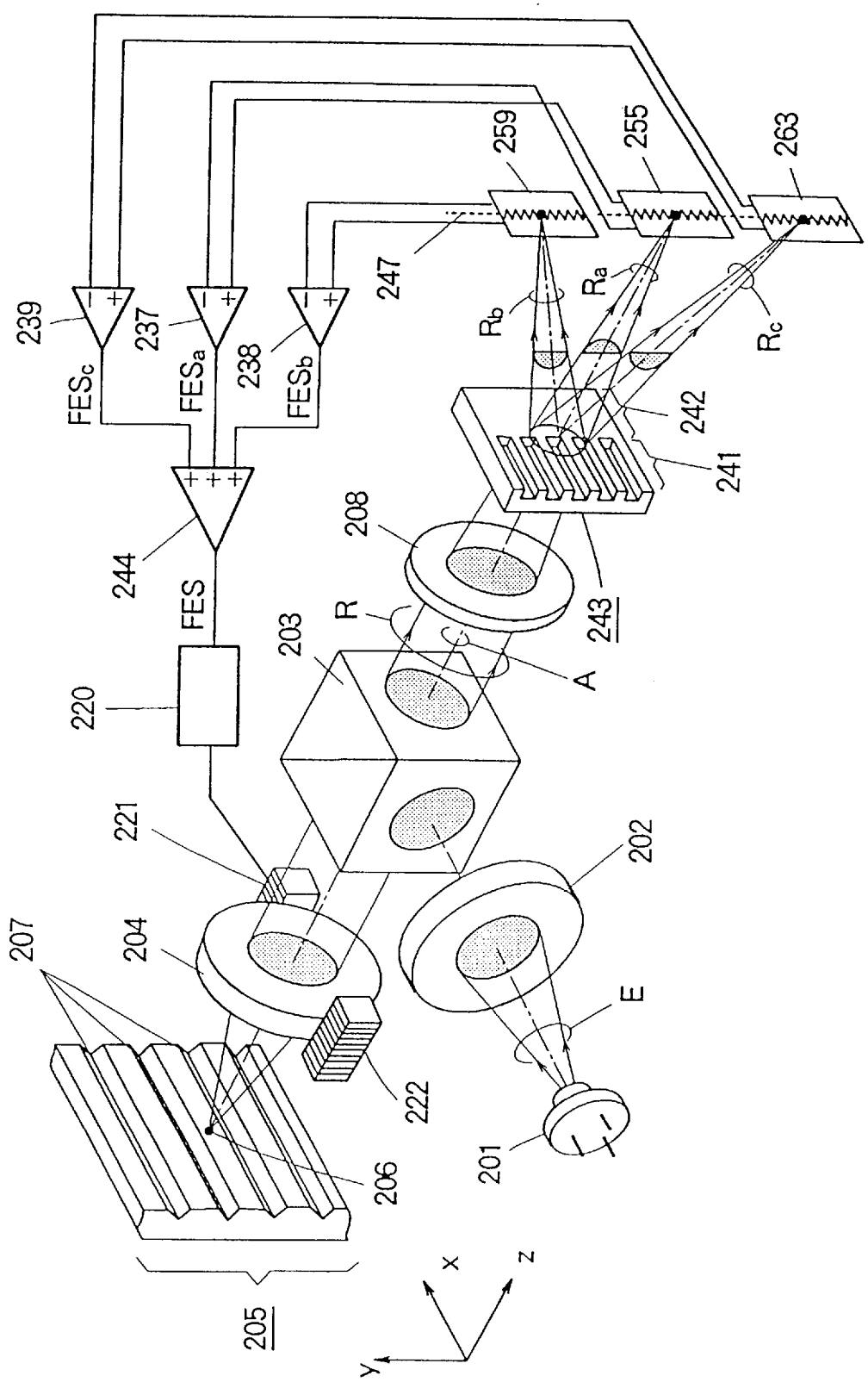
FIG. 70 is a perspective view of a focus error detecting device of Embodiment C4.

FIG. 70 shows a focus error detecting device of an embodiment, Embodiment C4. The illustrated focus error detecting device is similar to the focus error detecting device of Embodiment C2. But for the two-division photodetectors, those described in connection with Embodiment B1 are used. In other words, Embodiment C4 is formed by combining the inventive concept of Embodiment B1 with the inventive concept of Embodiment C2. Advantages of the focus error detecting device of Embodiment C4 are similar to those of Embodiment C3.

Embodiment D1

FIG. 71 to FIG. 75 shows an optical means inclination angle adjusting device of another embodiment, Embodiment D1, of the invention.

Figure 71:
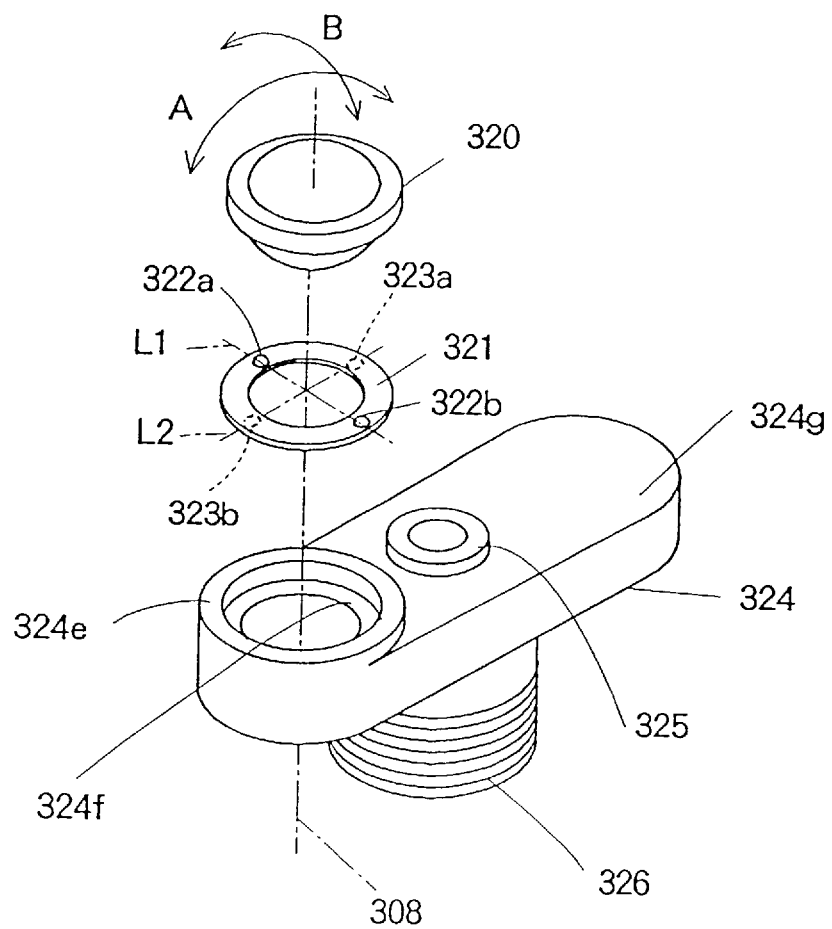
FIG. 71 is an exploded perspective view showing a pertinent part of the optical means inclination angle adjusting device of Embodiment D1.
Figure 72:
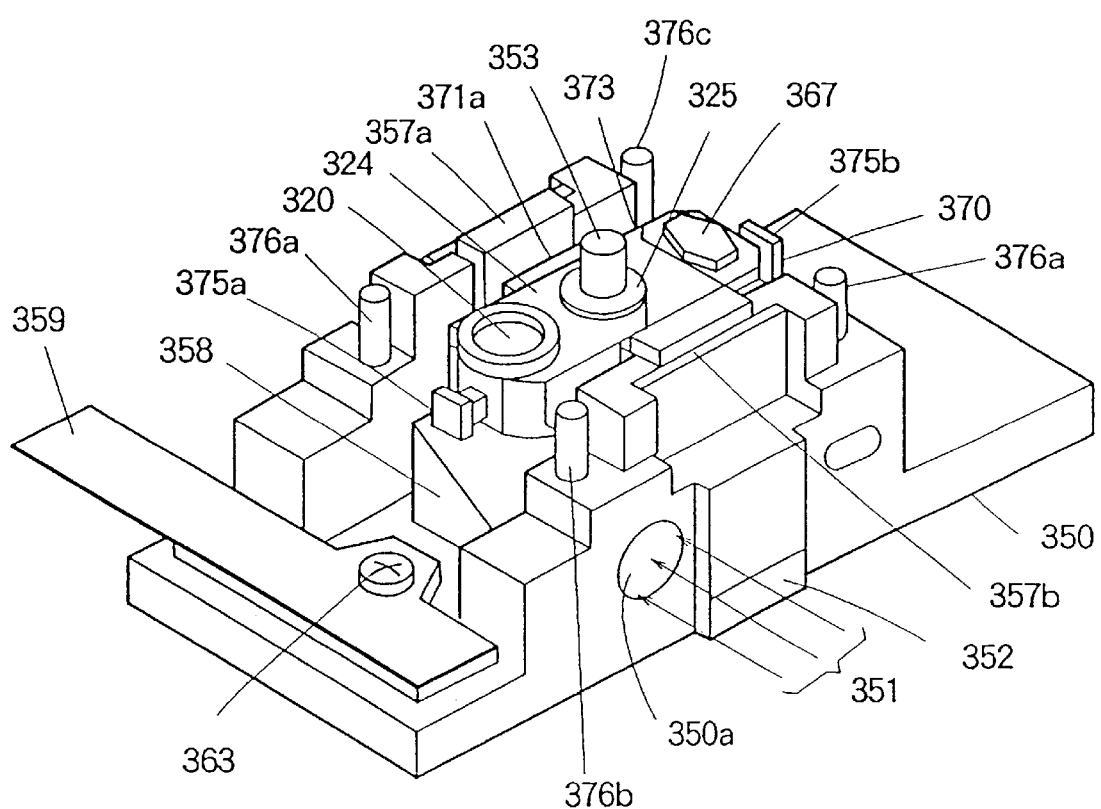
FIG. 72 is a perspective view showing an optical lens drive device having the optical means inclination angle adjusting device of FIG. 71 thereon.

Referring first to FIG. 71, an objective lens 320 is held by means of an objective lens holder 324. An annular flat plate 321 is interposed between the objective lens 320 and the lens holder 324, and is in alignment with a peripheral portion of the objective lens 320, and has an opening with an axis in alignment with an optical axis 308 of the objective lens 320.

An annular flat plate 321 gas a pair of upper protrusions 322a and 322b provided on the upper surface of the flat plate 321 and arranged on a line L1 crossing the optical axis 308, and a pair of lower protrusions 323a and 323b provided on the lower surface of the flat plate 321 and arranged on a line L2 crossing the optical axis 308. Thus the pair of upper projections 322a and 322b are disposed diametrically opposite to each other with respect to the optical axis of the objective lens 320. Similarly, the pair of lower projections 323a and 323b are disposed diametrically opposite to each other with respect to the optical axis of the objective lens 320. The pair of upper projections and the pair of lower projections are at different rotary angles about the optical axis 308. More specifically, the rotary angle of the line L1 and the rotary angle of the line L2 are 90 degrees different from each other.

The flat plate 321 is received on an annular receiving surface 324*f* of the lens holder 324, being surrounded by a cylindrical wall 324*e* of the lens holder 324, which also surround the flat plate 321.

Figure 73:
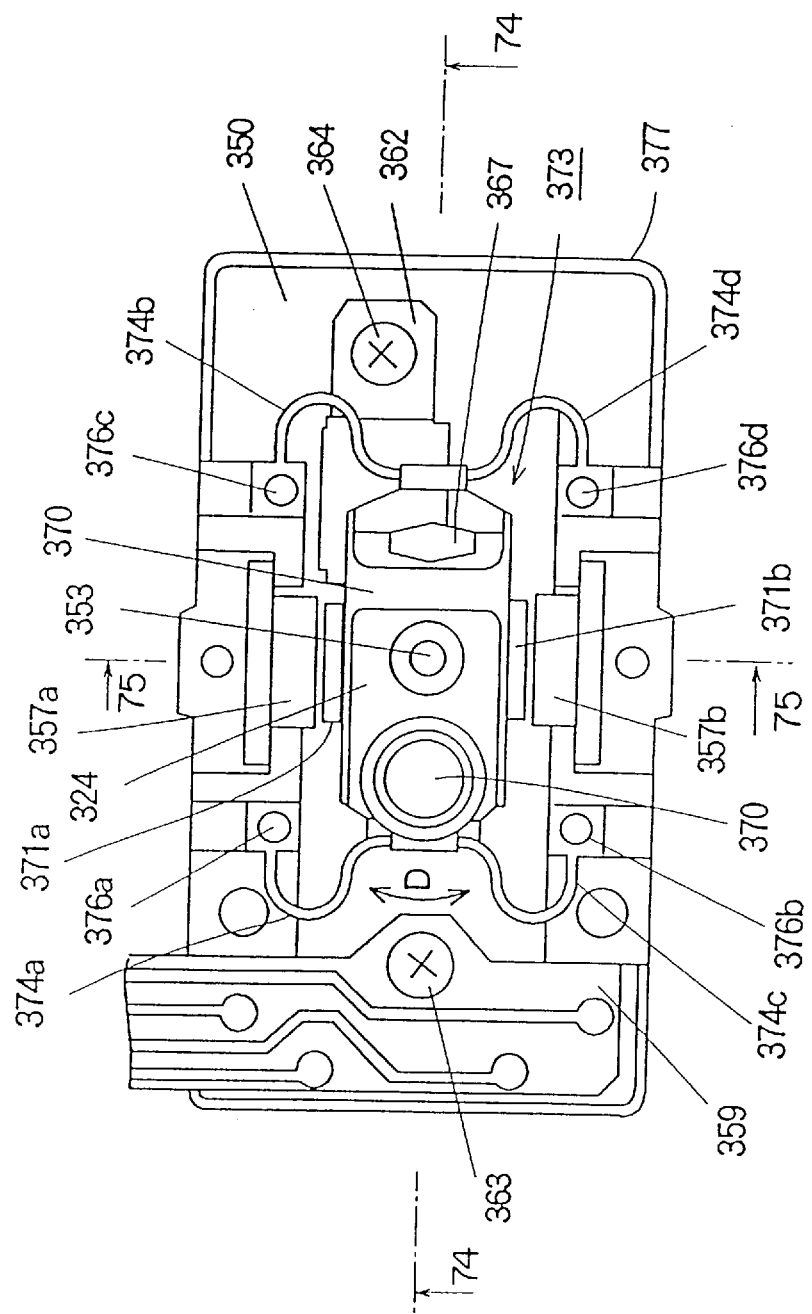
FIG. 73 is a plan view showing an optical lens drive device of FIG. 74.
Figure 74:
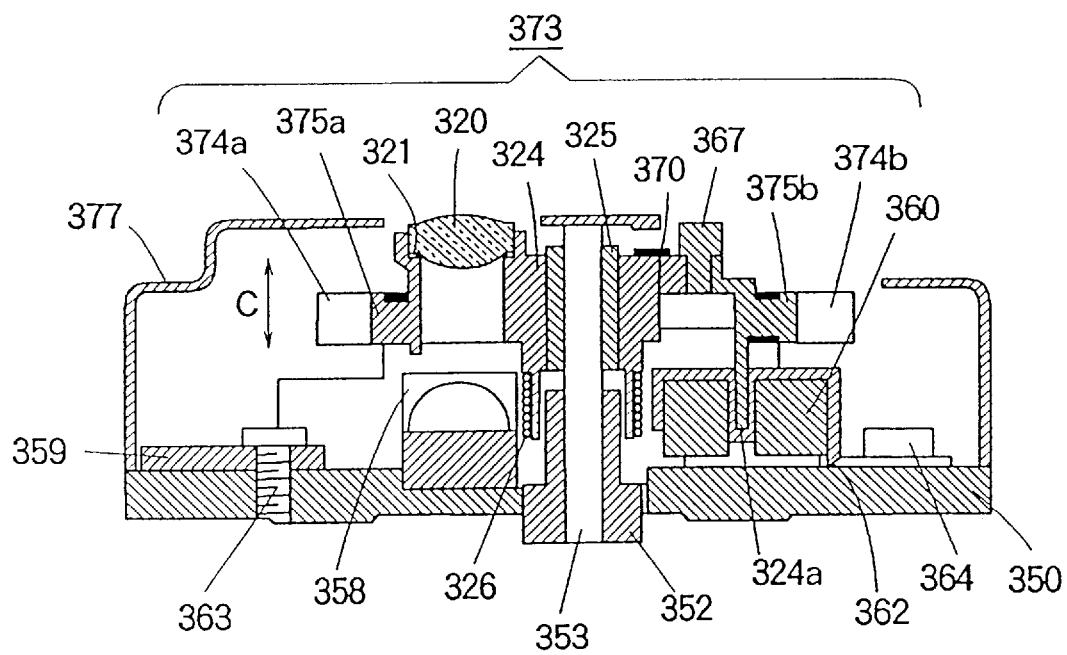
FIG. 74 is a sectional view along line A—A in FIG. 73.
Figure 75:
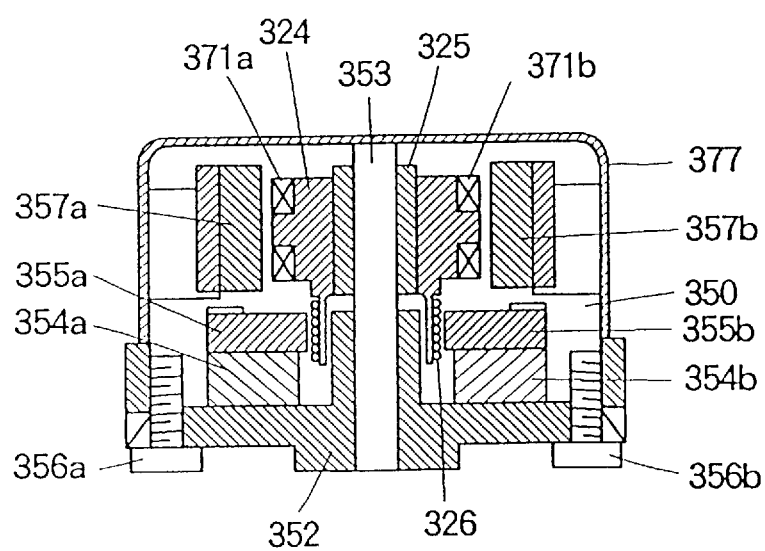
FIG. 75 is a sectional view along line B—B in FIG. 73.

Referring next to FIG. 72 to FIG. 75, a base 350 has a light beam passage aperture 350*a* on its side to permit passage of a light beam 351. A focus base 352 holds a lower part of a supporting shaft 353 coated with a fluorine resin with a small coefficient of friction. Focusing magnets 354*a* and 354*b* are magnetized in the vertical direction (as seen in FIG. 75) and bonded to the focus base 352, together with focusing yokes 355*a* and 355*b*. The focus base 352 is fixed to the base 350 by means of screws 356*a* and 356*b*.

Tracking magnets 357*a* and 357*b* are fixed to the base 350 and magnetized in the horizontal direction (as seen in FIG. 75). A mirror 358 is fixed to the base 350 and reflects the light beam 351 incident on the side (in the horizontal direction) to direct it upward. An FPC flexible printed circuit) 359 is fixed to the base 350 by means of screws 363 and applying a drive current. A photo-interrupter 360 is mounted to the base 350 by means of a plate 362 which is fixed to the base 350 by means of screws 364. The photo-interrupter 360 is used for detection of the displacement of the objective lens for tracking. Another FPC, not shown, is fixed to the base 350.

The objective lens holder 324 is formed of a material, such as a plastic material, which is lightweight and rigid. A fin part 324*a* integrally formed with the objective lens holder 324 and the extending from the objective lens 324 in parallel with the supporting shaft 353 is disposed in a gap of the photo-interrupter 360. The objective lens 320 is fixed at one end end of an arm 324*g* of the lens holder 324. The flat plate 321 is disposed between the lens holder 324 and the objective lens 320. A balance weight 367 is fixed to the lens holder 324 on the side opposite to the side on which the objective lens 320 is fixed.

A bearing 325 is so fixed as to have an axis parallel with the optical axis of the objective lens 320. The supporting shaft 353 extends through the bearing 325. A focusing coil 326 is so fixed as to be coaxial with the bearing 325. It is disposed in the gap between the focus base 352 and the focusing yokes 355*a* and 355*b*.

A movable part FPC is fixed to the objective lens holder 324 and connects the tracking coils 371*a* and 371*b* to each other, and supplies a drive current to the tracking coils 371*a* and 371*b* and the focusing coil 326. The drive current is supplied to the FPC 370 via leads, not shown.

The members 324 to 372*b* described above form a movable part 373.

Dampers 374*a* and 374*b* are fixed to protrusions 375*a* and 375*b* provided on the lens holder 324 and pins 376*a* to 376*d* provided on the base 350 and hold the movable part 373 slidably (for translation movement) and rotatably with respect to the supporting shaft 353. A cover 377 is fixed to the base 350.

The operation of the above device will next be described. For adjusting the inclination angle in the direction of arrow A in FIG. 71, a force of a desirable magnitude is applied at an appropriate point, e.g., at the periphery of the objective lens 320 or the flange-like part of the objective lens 320, adjacent the projection 323*a* or 323*b*, so that the objective lens 320 is tilted about the tip of the upper protrusions 322*a* and 322*b* provided on the flat plate 321. For adjusting the inclination angle in the direction of arrow B in FIG. 71, a force of a desirable magnitude is applied at an appropriate point of the objective lens 320, adjacent the projection 322*a* or 322*b*, so that the objective lens 320 is tilted about the tip of the lower protrusions 323*a* and 323*b* provided on the flat plate 321.

In practice, the adjustment made in an ordinary optical disk device is up to the order of 10 mrad (0.57 degrees). When the diameter of the objective lens 320 is about 5 mm, the height of protrusions 322*a*, 322*b*, 323*a*, 323*b* is about 25 $\mu$m. The projections of such a size is not to small or to large for fabrication. (If the projections are too large for the size of the annular plate, it is difficult to form them by pressing. If they are too small, it is difficult to fabricate them with a sufficiently high accuracy.)

When the adjustment of the inclination angle of the objective lens 320 is completed, the flat plate 321 and the objective lens 320 are bonded to the lens holder 324 by means of an adhesive material or the like.

For correcting the focus error of the light spot (not shown), a desired current is supplied to the focusing coil 326, to cause an interaction between the current through the focusing coil 326 and the magnetic flux from the focusing magnets, 354*a* and 345*b*, by which the movable part 373 including the objective lens 320 is driven in the direction C shown in FIG. 74. By such movement, the objective lens moves in a direction perpendicular to the surface of the optical disk.

For correcting the tracking error, a desired current is supplied to the tracking coils 371*a* and 371*b*, to cause an interaction between the current through the tracking coils 371*a* and 371*b* and the magnetic flux from the tracking magnets 357*a* and 357*b*, by which the movable part 373 is rotated about the supporting shaft 353 in the direction of arrow D in FIG. 73. By such rotation, the objective lens moves in a direction perpendicular to the direction in which the track extends.

Embodiment D2

Figure 76:
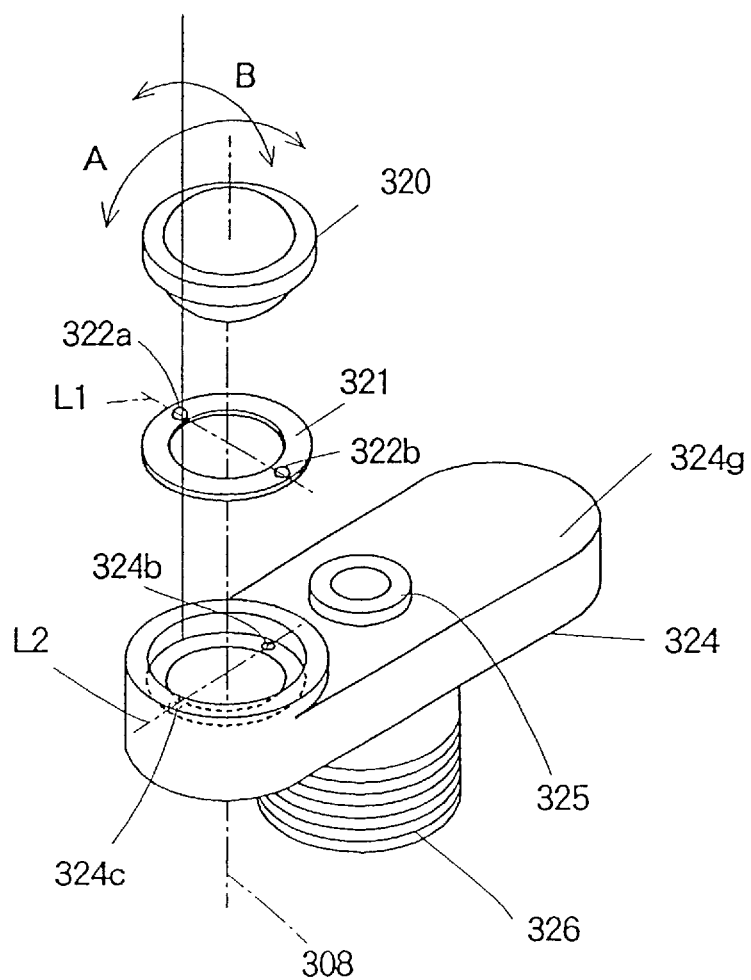
FIG. 76 is an exploded perspective view showing a pertinent part of the optical means inclination angle adjusting device of Embodiment D2.

FIG. 76 shows an optical means inclination angle adjusting device of another embodiment, Embodiment D2. In place of the protrusions 323*a* and 323*b* on the flat plate 321 of Embodiment D1, a pair of protrusions 324*b* and 324*c* are provided on the lens holder 324 and arranged on a line L2 similar to the line L2 in FIG. 71. The rest of the configuration is similar to that of Embodiment 1. The effects similar to those of Embodiment D1 can be obtained.

Embodiment D3

Figure 77:
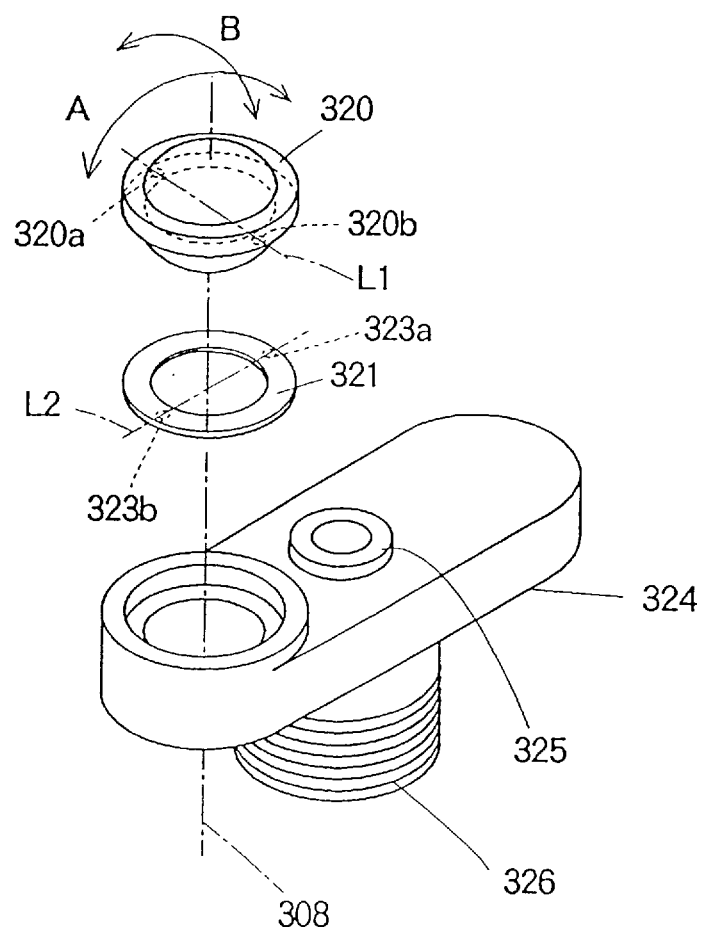
FIG. 77 is an exploded perspective view showing a pertinent part of the optical means inclination angle adjusting device of Embodiment D3.

FIG. 77 shows an optical means inclination angle adjusting device of another embodiment, Embodiment D3. In place of the protrusions 322*a* and 322*b* on the flat plate 321 of Embodiment D1, a pair of protrusions 320*a* and 320*b* are provided on the objective lens 320 and arranged on a line L1 similar to the line L1 in FIG. 71. The rest of the configuration is similar to that of Embodiment 1. The effects similar to those of Embodiment D1 can be obtained.

Embodiment D4

Figure 78:
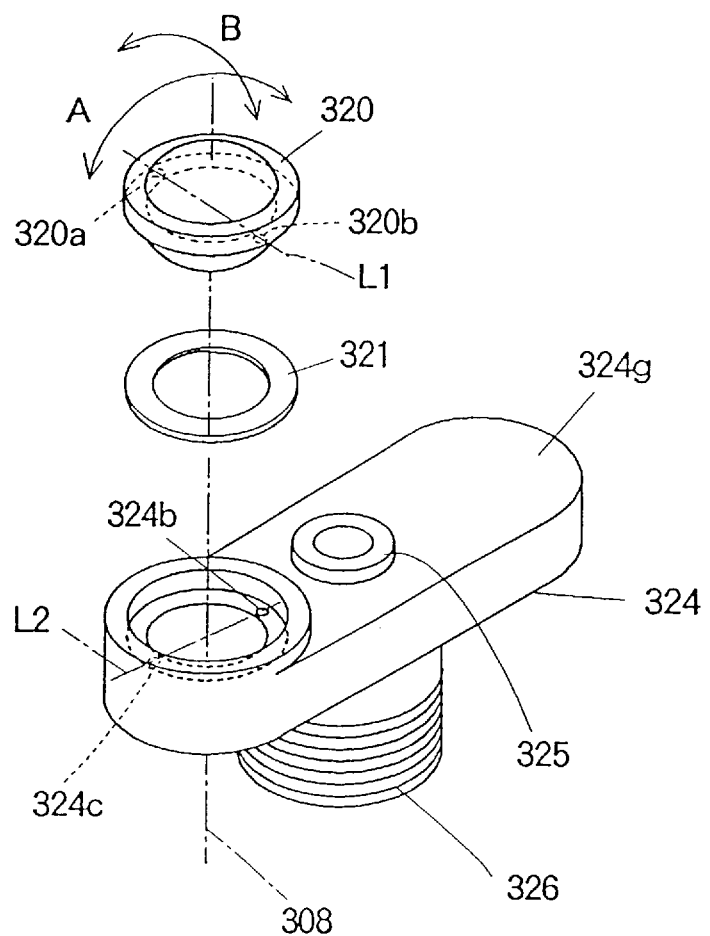
FIG. 78 is an exploded perspective view showing a pertinent part of the optical means inclination angle adjusting device of Embodiment D4.

FIG. 78 shows an optical means inclination angle adjusting device of another embodiment, Embodiment D4. In place of the protrusions 322*a* and 322*b* on the flat plate 321 of Embodiment D1, a pair of protrusions 320*a* and 320*b* are provided on the objective lens 320 and arranged on a Line L1 similar to the line L1 in FIG. 71. In place of the protrusions 322*a* and 322*b* on the flat plate 321 of Embodiment D1, a pair of protrusions 320*a* and 320*b* are provided on the objective lens 320 and arranged on a line L1 similar to the line L1 in FIG. 71. The rest of the configuration is similar to that of Embodiment 1. The effects similar to those of Embodiment D1 can be obtained.

Embodiment D5

Figure 79:
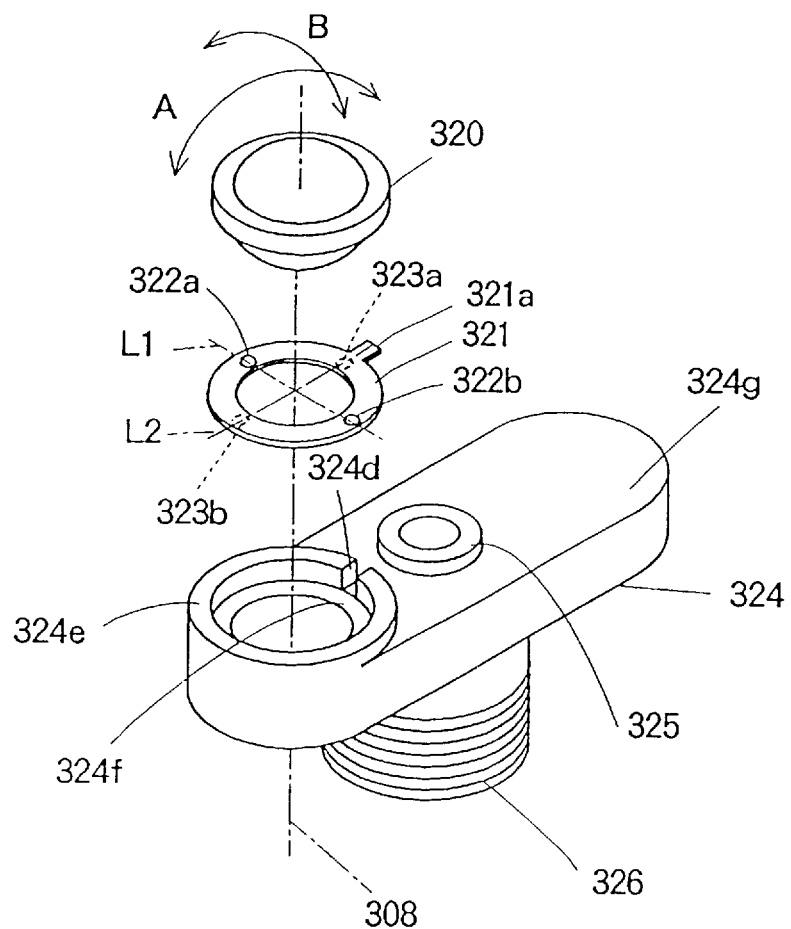
FIG. 79 is an exploded perspective view showing a pertinent part of the optical means inclination angle adjusting device of Embodiment D5.

FIG. 79 shows an optical means inclination angle adjusting device of another embodiment, Embodiment D4. It is similar to the configuration of Embodiment D1. However, the flat pate 321 is additionally provided with a tongue 321a extending toward axis of rotation of the lens holder 324. The lens holder 324 on the other hand has a cutaway 324d in the cylindrical wall 324e surrounding the flat plate 321 and the annular receiving surface 324f. The tongue 321a extends through the cutaway 324d so that rotation of the flat plate 321 about the axis 308 is restricted, and the direction of the inclination angle adjustment of the objective lens 320 is confined.

Embodiment D6

Figure 80:
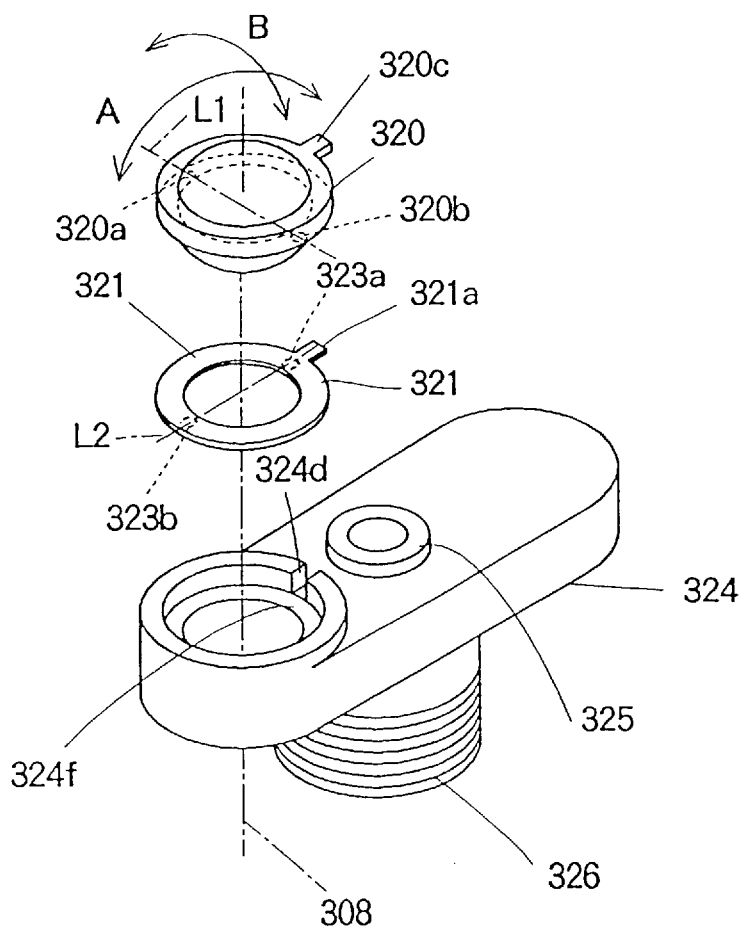
FIG. 80 is an exploded perspective view showing a pertinent part of the optical means inclination angle adjusting device of Embodiment D6.
Figure 81:
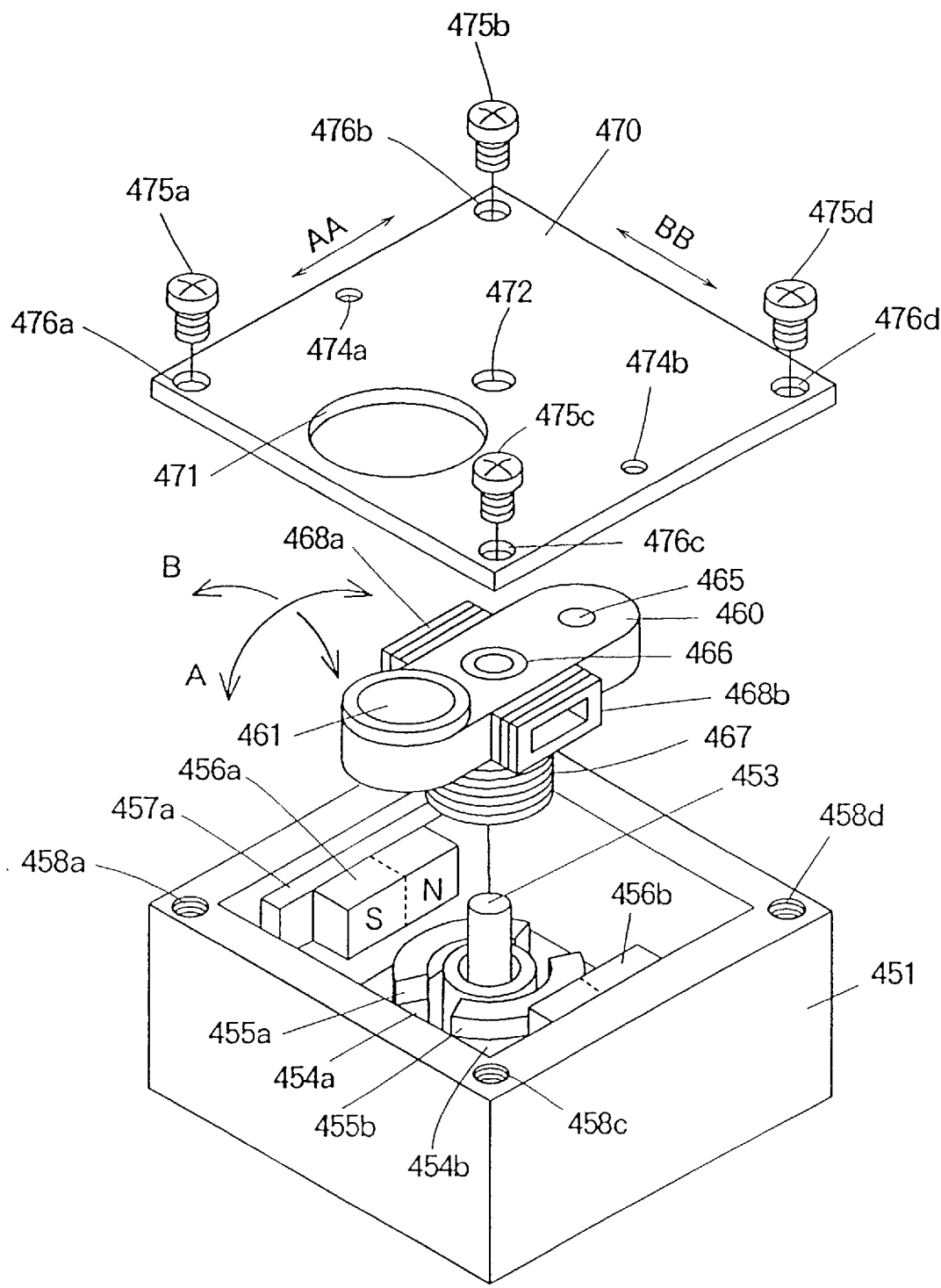
FIG. 81 is an exploded perspective view of a pertinent part of an optical disk device of Embodiment E1.

FIG. 80 shows an optical means inclination angle adjusting device of another embodiment, Embodiment D6. It is similar to the configuration of Embodiment D3. However, like Embodiment D5, the objective lens 320 is additionally provided with a tongue 320c extending toward axis of rotation of the lens holder 324. The lens holder 324 on the other hand has a cutaway 324d in the cylindrical wall 324e surrounding the objective lens 320, as well as the flat plate 321 and the flat plate surface 324f. The tongues 320c and 321a extend through the cutaway 324d so that rotation of the objective lens 320 and the flat plate 321 about the axis 308 is restricted, and the direction of the inclination angle adjustment of the objective lens 320 is confined.

Because the rotation of the objective lens 320 is restricted, it is possible to orient the aberration (e.g., coma) that is formed at the time of fabrication of the lens, in a particular direction.

Modifications to Embodiments D1 to D6

The inclination angle adjustment device of Embodiments D1 to D6 described are for adjusting the inclination angle of the objective lens. The invention is however also applicable to adjustment of the inclination angle of a collimator lens, or any other lens, or a reflecting mirror, or any other optical means.

The inclination angle adjustment device of the embodiments described are for adjusting the inclination angle of the objective lens formed of a single lens. The invention is however also applicable to adjustment of the inclination angle of an entirety of an objective lens drive unit, or an entirety of an optical head including an objective lens drive unit, a light source and a light detector.

Embodiments D1 to D6 and their modifications have the following advantages.

The part necessary for the inclination angle adjustment can be achieved by means of only a thin annular flat plate. The thickness of the device and the size of the device can therefore be reduced.

Since it is not necessary to provide a spherical surface, the freedom of design is increased.

Since the weight of the parts bonded by an adhesive consists of an objective lens, it is lightweight, and undesirable vibration during access can be reduced, and the access time can be shortened.

By providing the tongue and the cutaway, the direction in which the optical means is inclined is confined, so that the adjustment of the inclination angle is facilitated.

Embodiments E1

Figure 82:
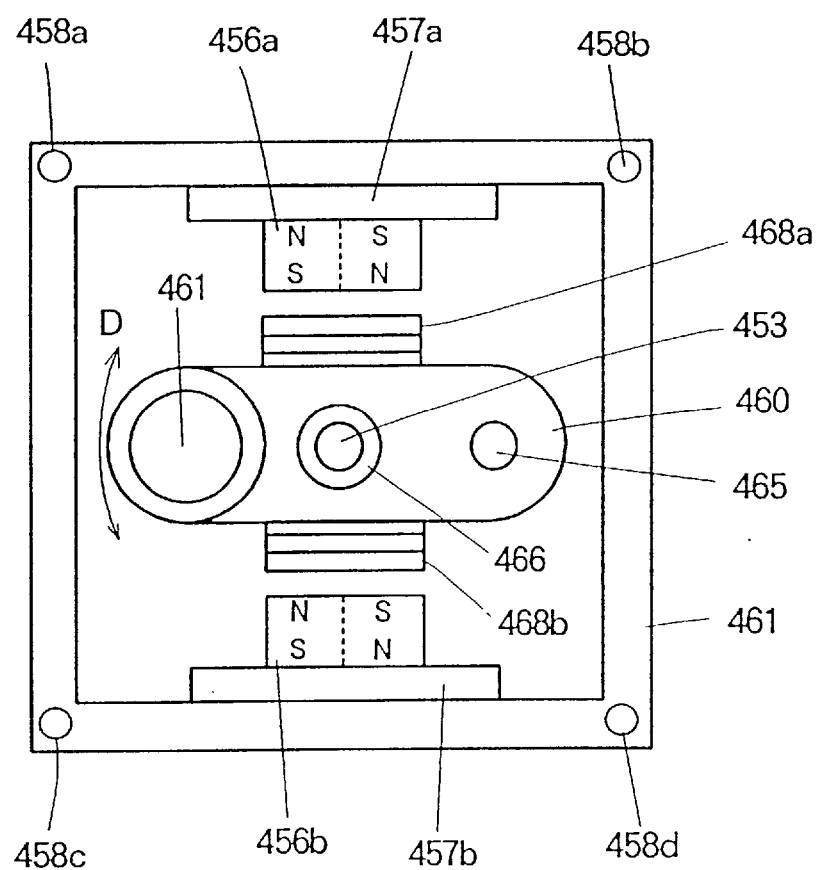
FIG. 82 is a plan view of the pertinent portion of Embodiment E1.
Figure 83:
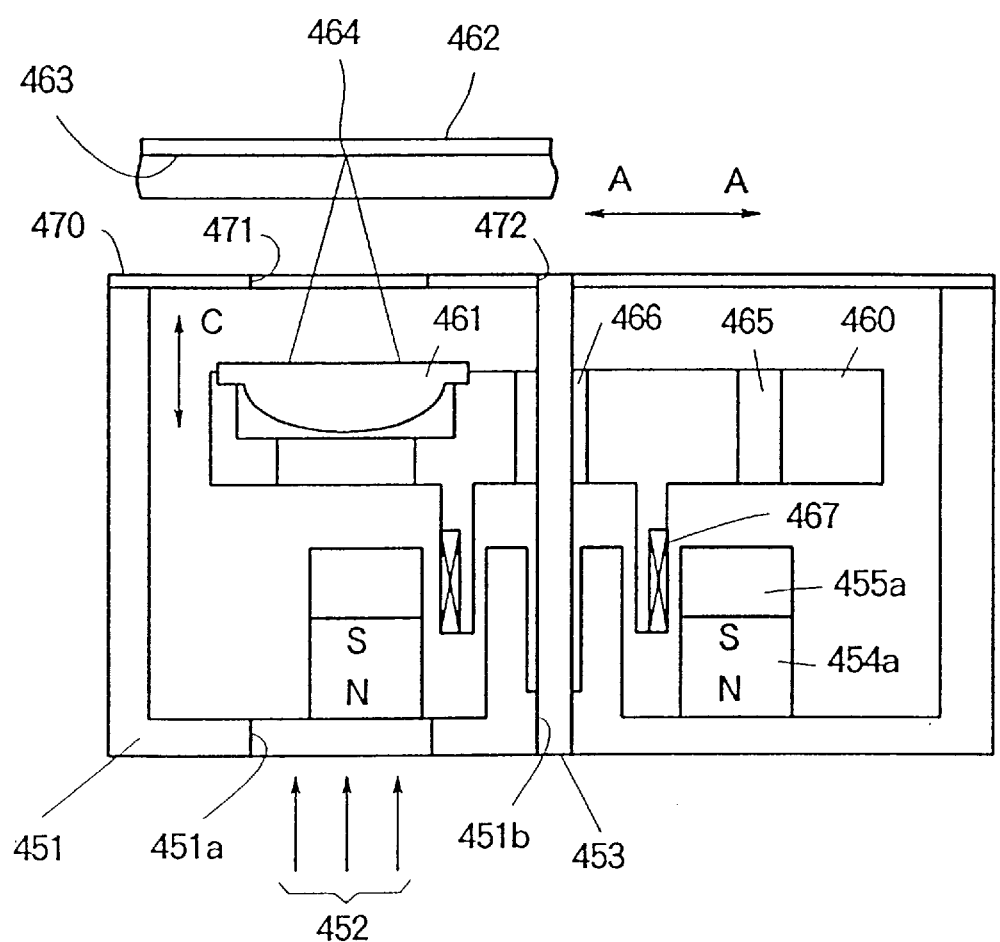
FIG. 83 is a sectional view of the pertinent portion of Embodiment E1.
Figure 84:
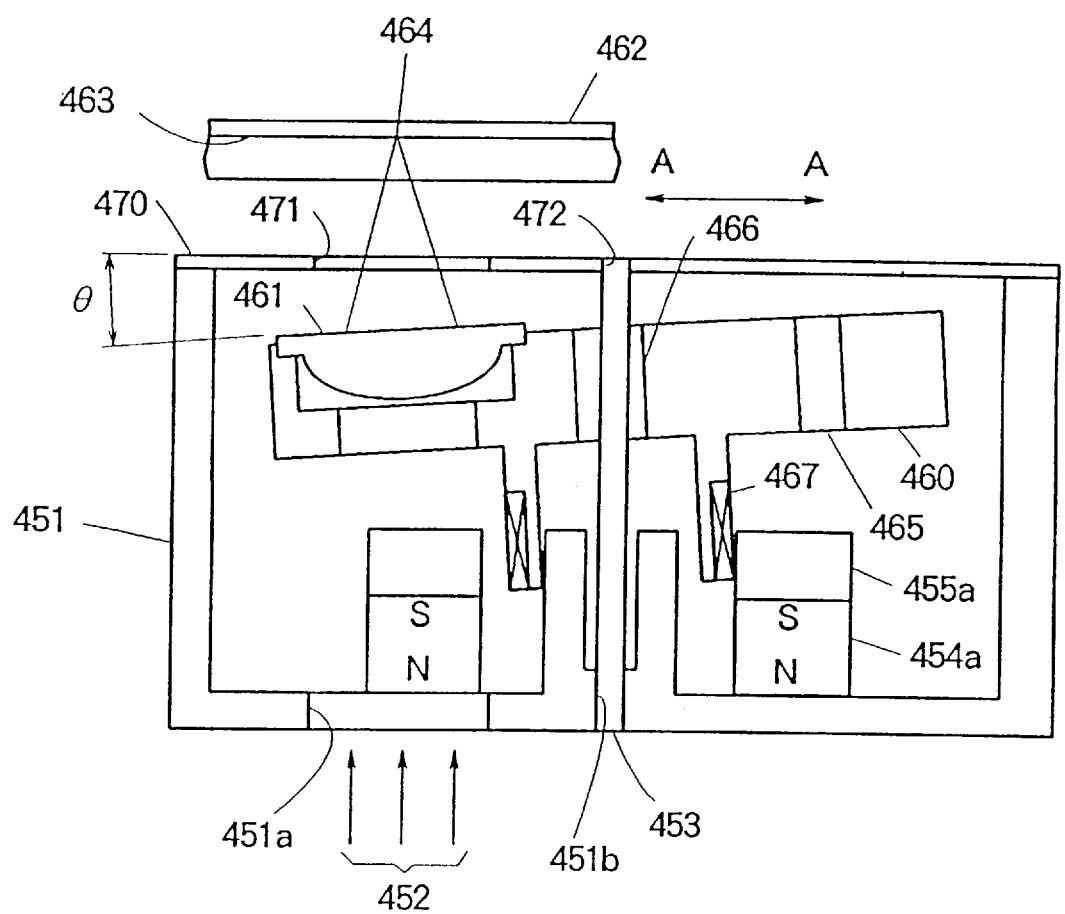
FIG. 84 is a sectional view of the pertinent portion showing the state after the angle adjustment.

FIG. 81 to FIG. 84 shows and optical disk device of another embodiment, Embodiment E1, of the invention A frame or base 451 has an opening 451a (FIG. 83) to permit passage of a light beam 452 from a light source, not shown. The base 451 holds, at a fixing hole 451b, a lower part of a supporting shaft 453 which is coated with a fluororesin which has a low friction coefficient. Focusing magnets 454a and 454b are magnetized in the vertical direction (as seen in FIG. 83) and are bonded to the base 451, together with a focusing yokes 455a and 455b.

Tracking magnets 456a and 456b magnetized in the horizontal direction (vertical direction as seen in FIG. 82) and are provided, at their rear ends, with tracking yokes 457a and 457b. The base is provided with holes 458a to 458d for passage of screws.

A lens holder 460 is formed of a plastic material. An objective lens 461 is fixed to one end of a lens holder 461, and focuses the light beam 452 onto a recording surface 463 of an optical disk 462 to form a focused spot 464. A balance weight 465 is provided on a second end of the lens holder 460, opposite to the side where the objective lens 461 is provided.

A bearing 466 is fixed to the lens holder 460 so that its axis is parallel with the optical axis of the objective lens 461. The support shaft 453 extends through the bearing 466. A focusing coil 467 is fixed to the lens holder 460 so that it is coaxial with the bearing 466. The focusing coil 467 is disposed to confront the focusing yokes 455a and 455b. Tracking coils 468a and 468b are bonded to opposite sides of the lens holder 460.

A cover 470 is provided with an opening 471 for passage of the light beam, a hole 472 for holding the upper end of the supporting shaft 453, holes 474a and 474b for passage of adjustment pins (not shown) for adjusting the position of the cover 470, and holes 476a to 476d for passage of fixing screws, 475a to 475d for fixing the cover 470 to the base 451.

The operation will next be described. For adjusting the angle of the objective lens 466 in the direction of arrow A (jitter direction), the cover 470 is moved in the direction of arrow AA along the upper surface of the base 451. This makes the supporting shaft 453 inclined in the direction of arrow A, with the result that the objective lens 461 is inclined in the direction of arrow. A.

For adjusting the angle of the objective lens 466 in the direction of the arrow B (tracking direction), the cover 470 is moved in the direction of BB along the upper surface of the base 451. This makes the supporting shaft 453 inclined in the direction of arrow B, with the result that the objective lens is inclined in the direction of arrow B.

To analyze the angle adjustment microscopically, the rigidity of the supporting shaft 453 is relatively high compared with the rigidity of the base 453 and the cover 470, so that the holes 451b and the hole 472 (or the base 453 and the cover 470) are deformed by a minute degree. But this is not problematical in practical fabrication. Because the cover 470 needs to be moved by only about 0.1 mm to obtain the adjustment by an angle of 10 mrad, if the length of the supporting shaft 453 is 10 mm.

After completing the adjustment of the angle of the objective lens 461, the cover 470 is fixed to the base 451 by means of the screws 475a to 475d.

The operation for moving the objective lens 466 will next be described. For correcting the focus error, a desired current is supplied to the focusing coil 467 to cause interaction between the current through the coil 467 and the magnetic fluxes from the focusing magnets 454a and 454b, so that the lens holder 460 including the objective lens 461 is moved in the direction of arrow C in FIG. 83 toward or away from the disk, not shown.

For correcting the tracking error, a desired current is supplied to the tracking could 468a and 468b to cause interaction between the currents through the coils 468a and 468b and the magnetic fluxes from the tracking magnets 456a and 456b, so that the lens holder 460 including the objective lens 461 is rotated in the direction of arrow D about the supporting shaft 453. The objective lens 461 is thereby moved in the direction transverse to the direction in which the track of the disk extends.

Figure 85:
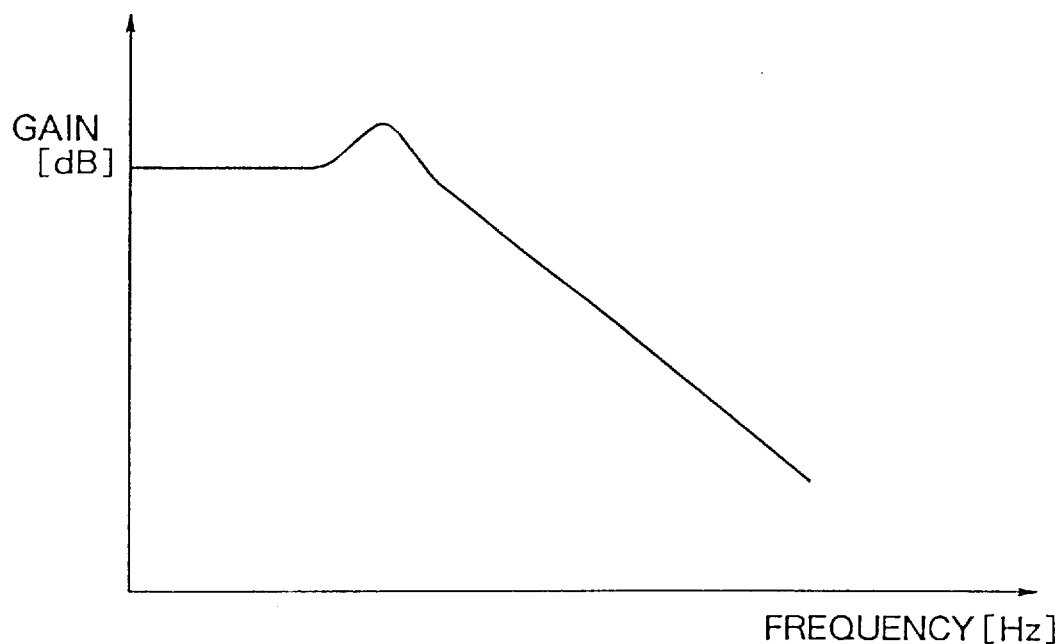
FIG. 85 is a diagram showing the focus direction frequency characteristics of Embodiment E1.

FIG. 85 shows a focus direction frequency characteristics. As shown, no undesirable resonant frequently is present.

Embodiment E2

Figure 86:
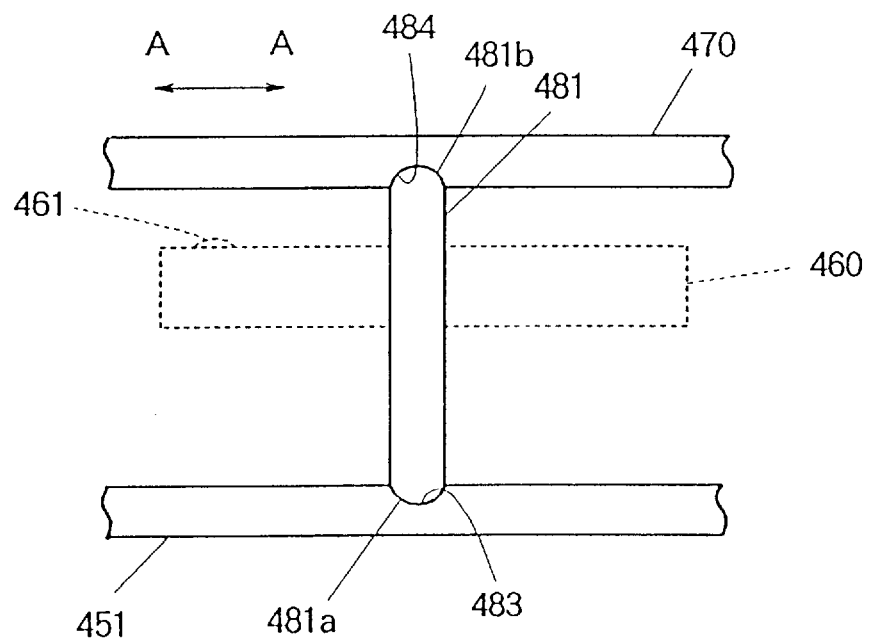
FIG. 86 is an enlarged sectional view of a pertinent portion of an optical disk device of Embodiment E2.

FIG. 86 shows an enlarged view of a pertinent part of an optical disk device of another embodiment, Embodiment E2. The parts identical or corresponding to those in Embodiment E1 are denoted by identical reference numerals. The difference of Embodiment E2 is that in place of the supporting shaft 453 of Embodiment E1, a supporting shaft 481 having rounded lower and upper ends 481a and 481b. The base 451 is provided with a semispherical dent 483, in place of the fixing hole 451b, for receiving the rounded lower end 481a. The cover 470 is provided with a semispherical dent 484, in place of, hole 472, the receiving the rounded upper end 481b. The cover 470 is moved along the upper surface of the base 451 for the adjustment of the angle of the objective lens 461 in the same manner as in the Embodiment E1. It is however noted that when the supporting shaft 453 is inclined, the base 451, in particular the part surrounding the fixing hole 451b is deformed slightly.

Embodiment E3

Figure 87:
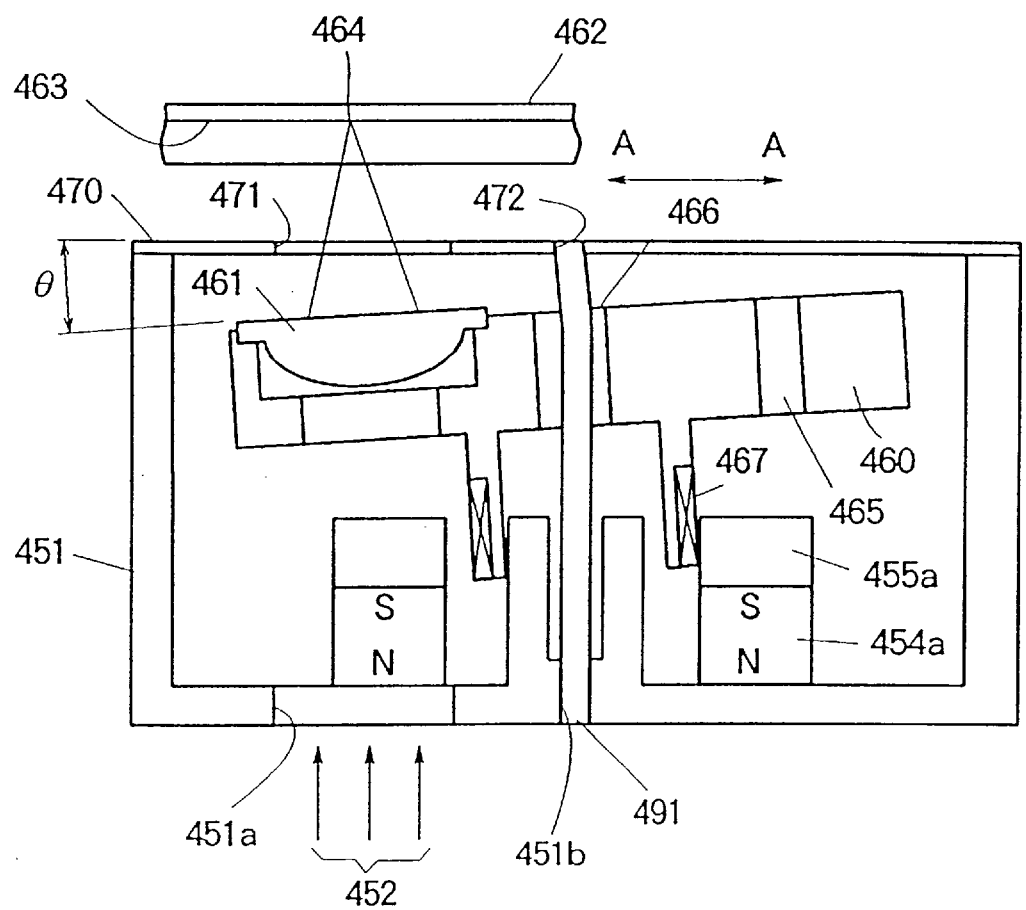
FIG. 87 is a sectional view of a pertinent portion an optical disk device of Embodiment E3, after adjustment of the angle.
Figure 88:
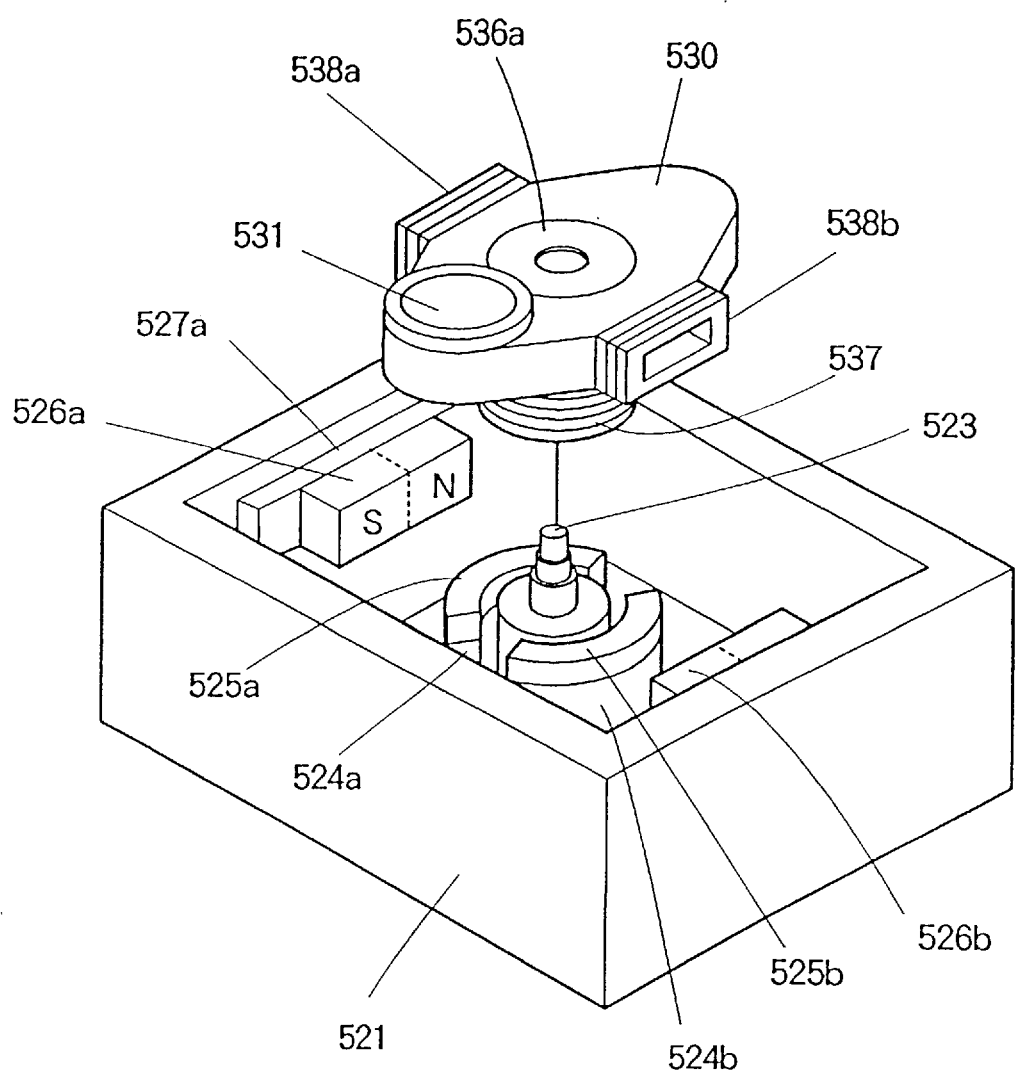
FIG. 88 is an exploded perspective view of a pertinent portion of an objective lens drive device of Embodiment F1.

FIG. 87 shows an optical disk device of another embodiment, Embodiment E3. The parts identical or corresponding to those in Embodiment E1 are denoted by identical reference numerals. The difference of Embodiment E2 is that in place of the supporting shaft 453 of Embodiment E1, a supporting shaft 491 having a lower rigidity is used. More specifically, the rigidity of the supporting shaft 491 is lower compared with the rigidity of the base 451 and the cover 470, so that the shaft 491 is bent before the cover 470 or the base 451 is deformed. When the cover 470 is slid for the adjustment of the angle, the supporting shaft 491 is bent slightly. Because the supporting shaft 491 is bent, deformation of the base 451, in particular at the part around the fixing hole 451b, is prevented, and yet the desired adjustment of angle can be achieved in the same way as the Embodiment E1.

Because of the above configuration, the following advantages are attained.

The amount of movement of the cover corresponds to the amount of adjustment (variation) of the angle of the objective lens. The former is proportional to the latter in a range where the angle is minute. The accuracy of angle adjustment can therefore be improved.

When re-adjustment is required after fixing, this can be easily achieved.

Screws can be used for fixing after the adjustment of the angle of the objective lens, so that a strong force that does not give an adverse effect to the frequency characteristics of the objective lens actuator can be obtained, and the reliability of the optical disk is therefore improved.

Embodiment F1

FIG. 88 to FIG. 93 show an objective lens drive device of another embodiment, Embodiment F1, of the invention.

Figure 90:
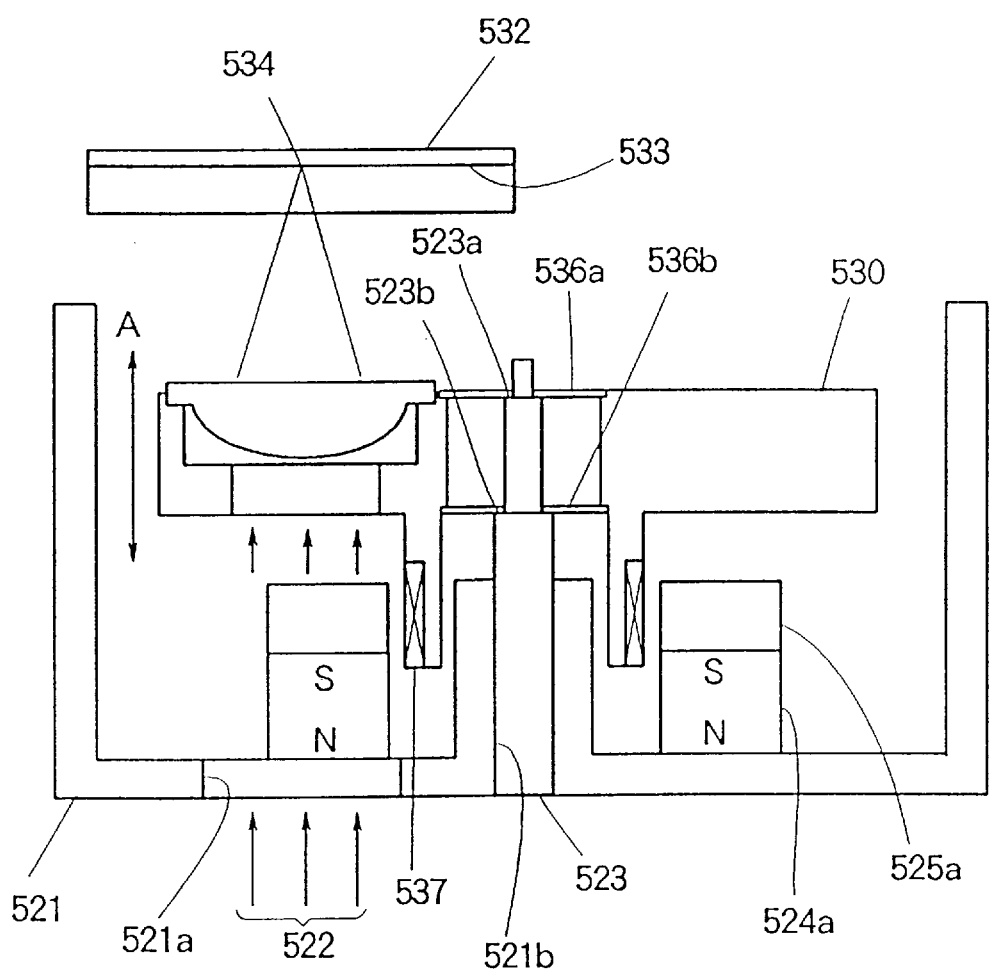
FIG. 90 is a sectional view of the pertinent portion of Embodiment F1.

As illustrated, the objective lens drive device according to the invention comprises a base 521 having an aperture 521a on its bottom plate 521c and a hole 521b for supporting the lower end of a shaft 523. Focusing magnets 504a and 504b are magnetized in the vertical direction (as seen in FIG. 90) and are bonded to the base 521, together with focusing yokes 525a and 525b.

Figure 89:
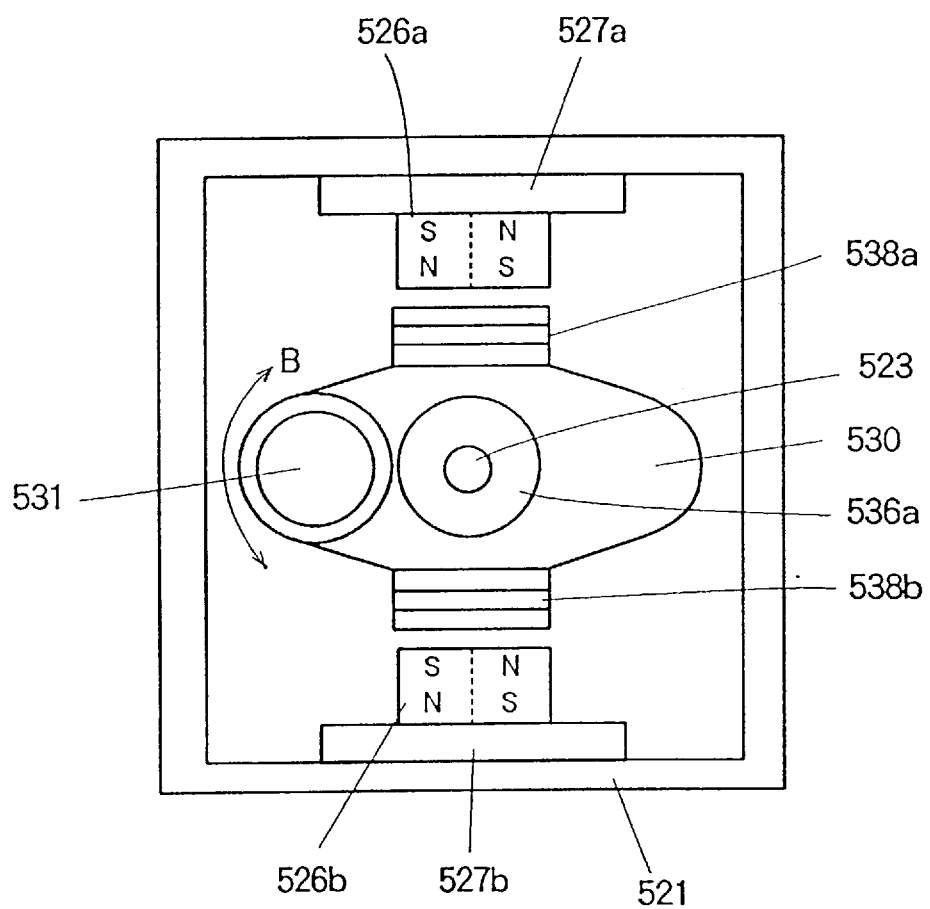
FIG. 89 is a plan view of the pertinent portion of Embodiment F1.

Tracking magnets 526a and 526b are magnetized in the horizontal direction (vertical direction as seen in FIG. 89) and provided with tracking yokes 527a and 527b on the rear surfaces (outer surfaces) of the magnets 526a and 526b.

A lens holder 530 is formed of a plastic material. An objective lens 531 is fixed to one end of the lens holder 530, i.e., at a position off the axis of the supporting shaft 523, in such a manner that the optical axis of the objective lens 531 is parallel with the axis of the supporting shaft 523. The objective lens 531 receives the light beam 522 and focuses it to form a focused spot 534 on the recording surface 533 of the optical disk 532.

Figure 93:
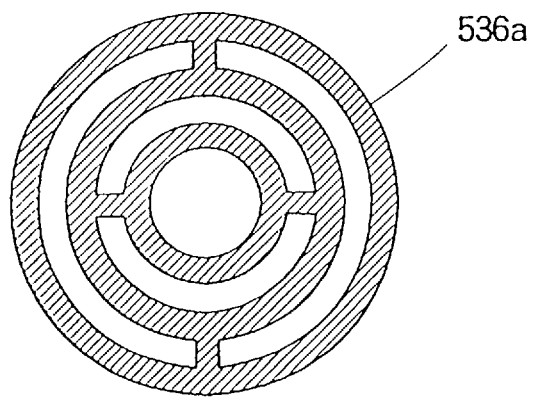
FIG. 93 is a plan view showing the plate spring.

First and second plate springs 536a and 536b have their inner peripheries or edges fixed to the supporting shaft 523 and outer peripheries or edges fixed to the lens holder 530. The plate spring 536a is generally annular, but has a pattern of openings, as illustrated in FIG. 93. The plate spring 536a is similarly formed. The plate springs 536a and 536b are space along the direction of the length of the supporting shaft 523, and are positioned in the axial direction relative to the supporting shaft 523 by means of steps 523a and 523b (best seen in FIG. 90), provided on the supporting shaft 523.

focusing coil 537 is fixed to the lens holder 530 such that it is coaxial with the plate springs 536a and 536b. The focusing coil 537 is disposed to confront the focusing yokes 525a and 525b.

Tracking coils 538a and 538b are bonded to the side surfaces of the lens holder 530.

Figure 91:
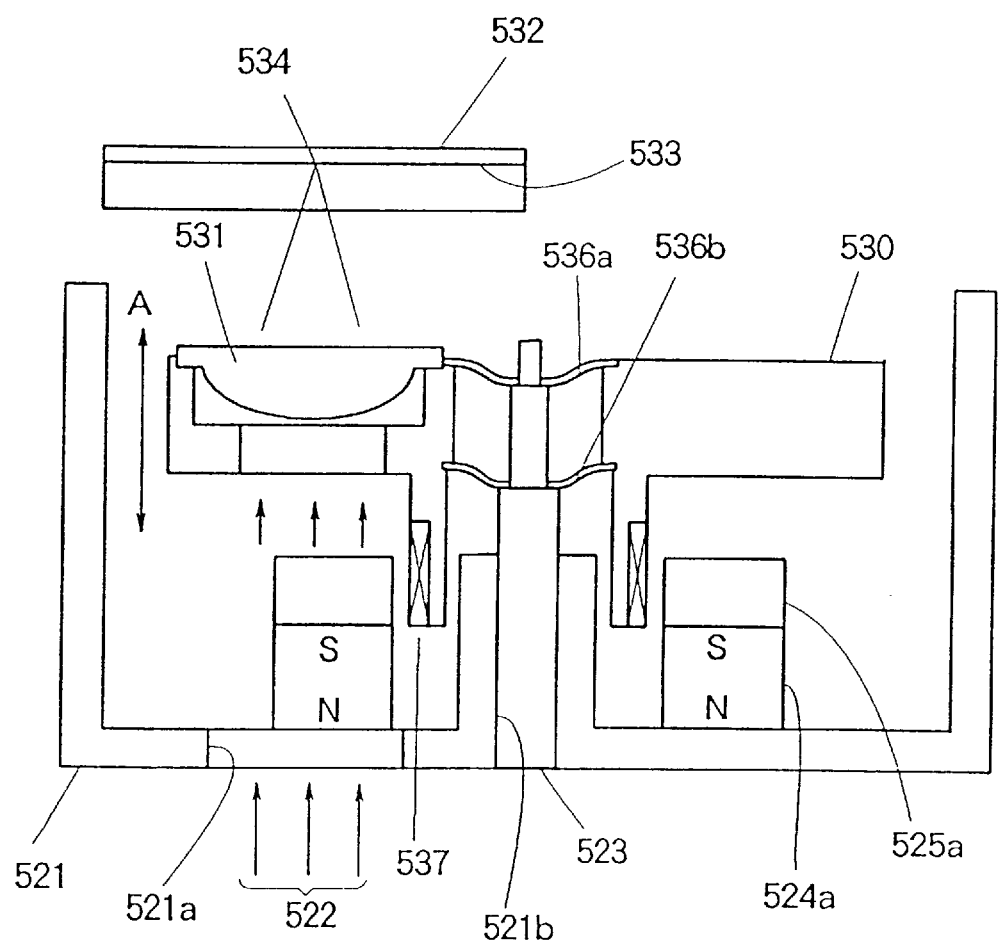
FIG. 91 is a sectional view of the pertinent portion of Embodiment F1 showing the movement for focus control.
Figure 92:
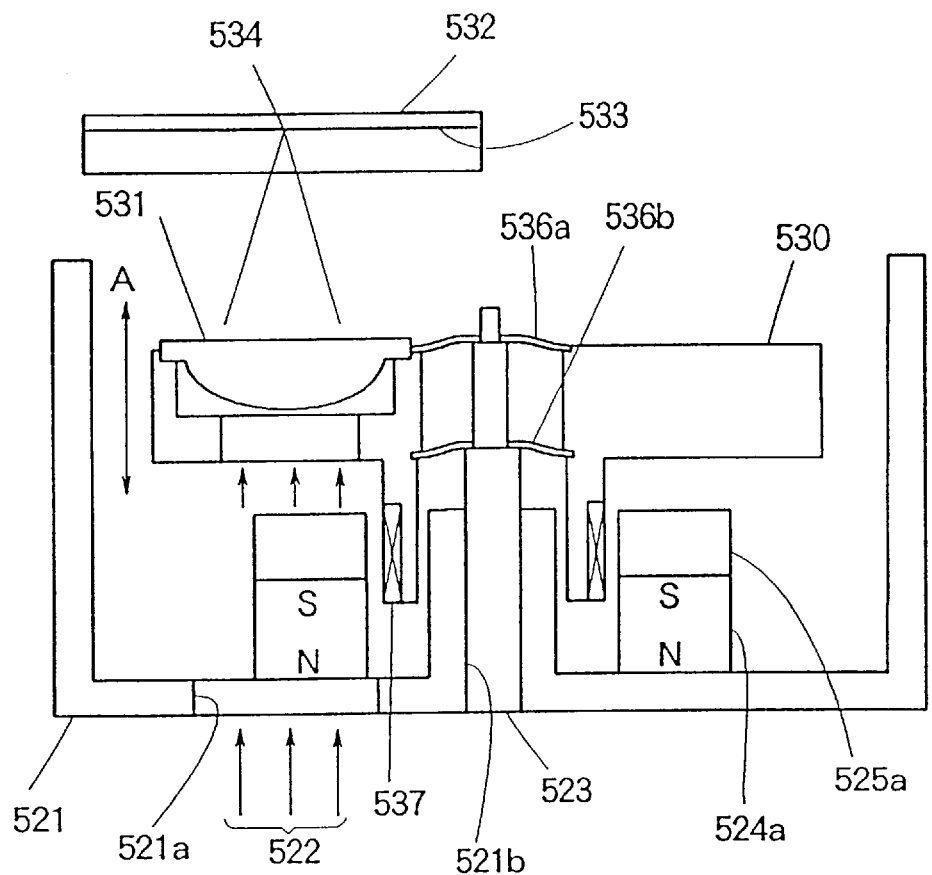
FIG. 92 is a sectional view of the pertinent portion of Embodiment F1 showing the movement for focus control.

The operation will next be described. For correcting the focus error, a desired current is supplied to the focusing coil 537 to cause interaction between the current through the focusing coil 537 and the magnetic flux from the focusing magnets 524a and 524b, so that the lens holder 530 is moved along the supporting shaft 523 and the objective lens 531 is thereby moved in the direction of arrow A. The focusing control is thus achieved. During such movement, the plate springs 536a and 536b are bent as indicated in FIG. 91 and FIG. 92.

For correcting the tracking error, a desired current is supplied to the tracking coils to cause interaction between the currents through the tracking coils and the magnetic fluxes from the tracking magnets 526a and 526b, so that the lens holder 530 is rotated in the direction of arrow B in FIG. 89 and the objective lens is thereby moved in a direction perpendicular to the direction in which the track extends. The tracking control is thus achieved. During rotation of the lens holder 530, the plate springs 536a and 536b are twisted about the axis of the supporting shaft 523.

Embodiment F2

Figure 94:
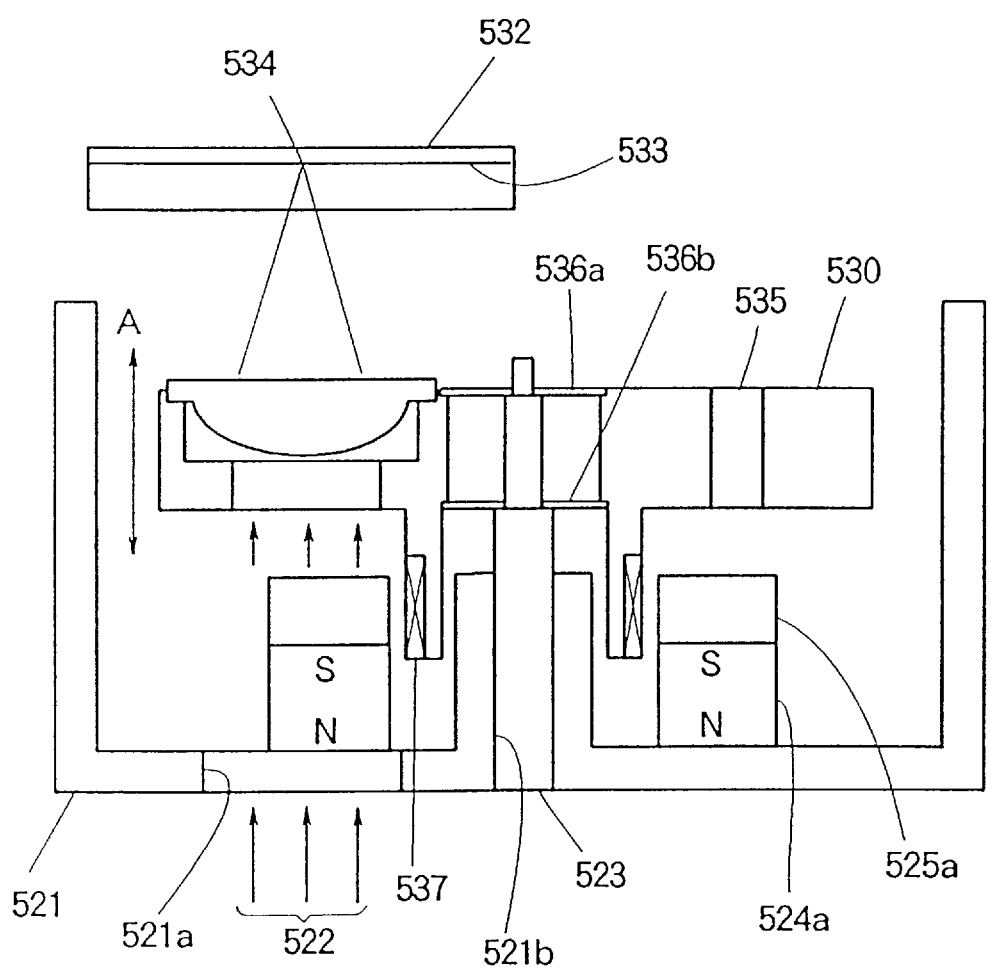
FIG. 94 is a sectional view of a pertinent portion of an objective lens drive device of Embodiment F2.

FIG. 94 shows a pertinent portion of the objective lens drive device of another embodiment, Embodiment F2. The members and parts identical or corresponding to those in FIG. 88 to FIG. 93 are denoted by identical reference numerals.

Embodiment F2 differs from Embodiment F1 in that a balance weight 535 is fixed to the lens holder 530 on the side opposite to the side on which the objective lens 531 is provided, so that the center of gravity of the movable part formed of the lens holder and the like supported by the plate springs lies in the support shaft 523.

The advantage derived from the use of the balance weight 535 is that the dynamic balance in the direction of rotation about the supporting shaft 523 is maintained, and no rotary moment is generated in the movable part when the objective lens drive device performs seek operation on the optical disk 532. As a result, no residual resonance is generated after the seek operation.

Embodiment F3

Figure 95:
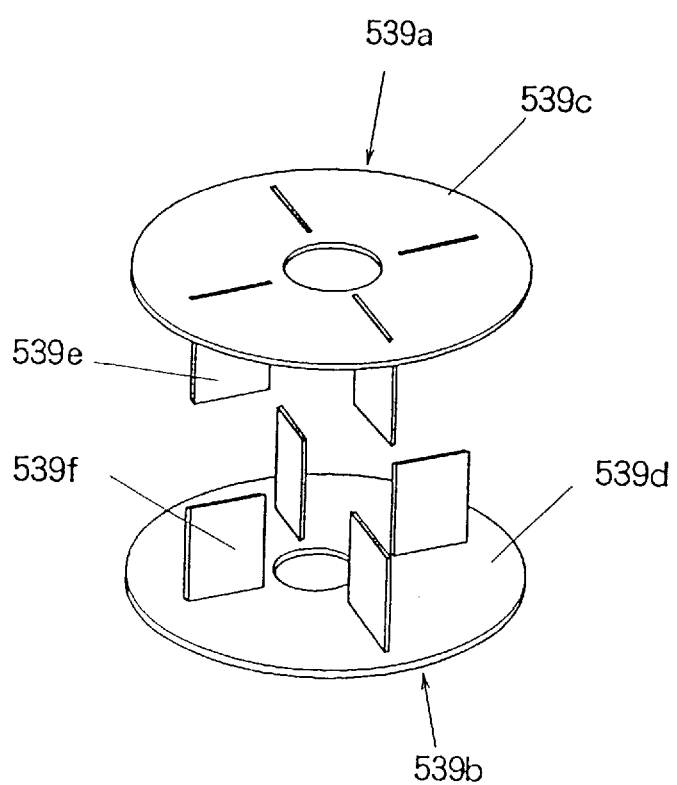
FIG. 95 is a perspective view showing plate springs of Embodiment F3.

FIG. 95 shows an enlarged perspective view of plate springs 539a and 539b used in the objective lens drive device of another embodiment, Embodiment F3.

Plate springs of this embodiment are provided with annular parts 539c and 539d extending in a plane perpendicular to the axis of the supporting shaft 523, and vertical parts 539e and 539f extending in a plane which is at a right angle with respect to the plate spring parts 539c and 539d and which contains lines extending radially from the axis of the supporting shaft 523.

When the plate springs of the above configuration is employed, undesirable twisting resonance can be restrained.

Embodiment F4

Figure 96:
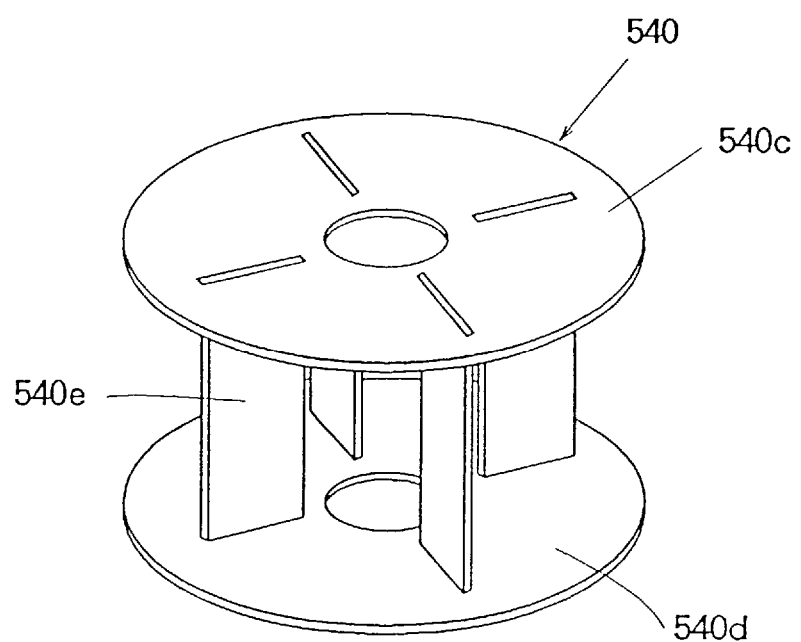
FIG. 96 is a perspective view showing plate springs of Embodiment F4.

FIG. 96 shows an enlarged perspective view of a plate spring 540 used in the objective lens drive device of another embodiment, Embodiment F4.

The plate spring 540 is an assembly formed by combining the plate springs 539a and 539b of Embodiment F3. More specifically, the plate spring 540 of this embodiment comprises a pair of annular parts 540c and 540d, similar to the annular parts 539c and 539d, and vertical parts 540e which correspond to the vertical parts 539e and 539f, but are fixed at opposite edges to the annular parts 540c and 540d. In this way, the annular parts 540c and 540d are interconnected by the vertical parts 540c to form an integral unit.

The advantage derived from the use of the spring assembly of FIG. 96 is that since the parameters of the plate springs can be controlled for each unit, with respect both to the focusing direction and the tracking direction. Variation in the frequency characteristics of the objective lens drive device can therefore be restrained, and the device is more suitable for mass-production.

Embodiment F5

Figure 97:
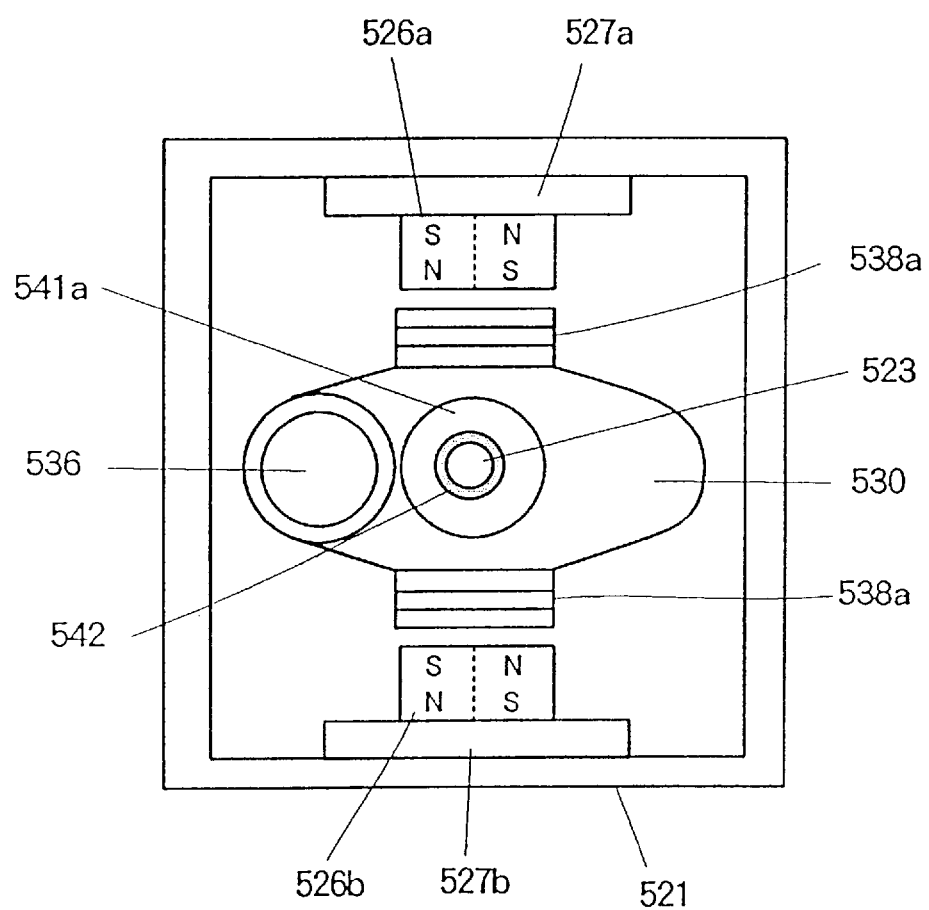
FIG. 97 is a plan view showing a pertinent portion of an objective lens drive device of Embodiment F5.

FIG. 97 shows a pertinent portion for the objective lens drive device of another embodiment, Embodiment F5. Members and parts identical or corresponding to those in FIG. 88 to FIG. 94 are denoted by identical reference numerals. Embodiment F4 is similar to Embodiment F1, but is additionally provided with an elastic material, such as rubber 542 between the inner peripheries of the plate spring 521a and the supporting shaft 523. A similar resilient material is interposed between the inner periphery of the plate spring 521b and the supporting shaft 523.

By the use of the elastic material 542, the resonant peak which the plate spring has can be lowered. Thus, it is possible to lower the spring parameter with respect to the tracking direction.

As has been described, Embodiments F1 to F5 have the following advantages.

By the use of the plate springs, the direct contact between relatively moving parts can be avoided. As a result, no friction is generated when the focusing control and/or the tracking control are performed, so that the stability of the control system is improved. Moreover, since the particles due to wear is avoided, adverse effects to the optical system and the shortening of life can be avoided.

Moreover, rotary moment about the supporting shaft is not generated during seek operation. As a result, undesirable residual vibration after the seek operation can be restrained.

Furthermore, it is possible to restrain the undersirable twisting resonance mode of the plate springs during control for driving in the tracking direction. Accordingly, the stability of the control system is improved.

Furthermore, it is possible to restrain the fluctuation of the spring parameters of the plate springs, the device is more suitable for mass production.

Furthermore, the resonant peaks of the plate springs can be lowered, and the spring parameters of the plate springs, which tend to be too high, can be set at a desired value. As a result, an objective lens drive device having a stable control system can be obtained.

What is claimed is:

1. An optical disk device for recording or playing back information on or from an optical information recording medium having land parts forming information tracks and grooves parts interposed between adjacent land parts, comprising:
    means for illuminating the land part of the optical information recording medium with a first light spot, and illuminating the groove part of the optical information recording medium with a second light spot;
    means for producing a first focus error signal in accordance with the reflected light beam of said first light sot, and means for producing a second focus error signal in accordance with the reflected light beam of said second light spot; and
    means for performing focus control in accordance with the first and second focus error signals.

2. An optical disk device according claim 1, wherein said first and second light spots are separated in the direction lateral to the information tracks by half a pitch of the information tracks.

3. An optical disk device according to claim 1, wherein said focus control means performs focus control in accordance with the sum of the first and second focus error signals.

4. An optical disk device for recording or playing back information on or from an optical information recording medium having land parts forming information tracks and groove parts interposed between adjacent land parts, comprising:
    means for illuminating the land parts of the optical information recording medium with a plurality of first light spots, and illuminating the groove parts of the optical information recording medium with another plurality of second light spots;
    means for producing first focus error signals in accordance with the reflected light beams of said first and second light spots;
    means for performing focus control in accordance with the focus error signals; and
    means for performing parallel recording or parallel playback in accordance with first light spots on said land parts.

5. An optical disk device according to claim 4, wherein adjacent ones of said light spots are separated in the direction lateral to the information tracks by half a pitch of the information tracks.

6. An optical disk device according in claim 4, wherein said focus control means performs focus control in accordance with the sum of the focus error signals.

7. An optical disk device for recording or playing back information on or from an optical information recording medium having land parts forming information tracks and grooves parts interposed between adjacent land parts, comprising:
    means for illuminating the optical information recording medium with a plurality of light spots,
    said illuminating means comprising a light beam splitting means including a diffraction grating for splitting the light beam to form said plurality of light spots;
    means for rotating said light beam splitting means to adjust the positions of said light spots;

means for producing focus error signals responsive to reflected light beams of said light spots; and means for performing focus control in accordance with the focus error signals.

8. An optical disk device according to claim 7, wherein said rotating means rotates said light beam splitting means between a first state in which the adjacent light spots are separated by a pitch of the information track in the lateral direction of the information track and a second state in which the adjacent light spots are separated by half a pitch of the information track in the lateral direction of the information track.

9. An optical disk device according to claim 8, further comprising control means for causing said light beam splitting means to be in said first state at the time of tracking and causing said light beam splitting means to be in said second state at the time of accessing.

10. An optical disk device according to claim 7, wherein said focus control means performs focus control in according with the sum of the focus error signals.

11. An optical disk device for recording or playing back information on or from an optical information recording medium having land parts forming information tracks and groove parts interposed between adjacent land parts, comprising:

means for illuminating the land part of the optical information recording medium with at least one light spot, and illuminating the groove parts of the optical information recording medium with at least two light spots;

means for producing focus error signals and a tracking error signal responsive to reflected light beams of said light spots;

means for performing focus control in accordance with the focus error signals; and means for performing tracking control in accordance with the tracking error signal.

12. An optical disk device according to claim 11, wherein said light spot for illuminating the land part and said light spots for illuminating the groove parts are separated in the direction lateral to the information tracks by half a pitch of the information tracks.

13. An optical disk device according to claim 11, wherein said means for producing the focus error signal and the tracking error signal comprised three four-division photodetectors receiving the reflected light beams, and produces the tracking error signal responsive to the outputs of the three four-division photodetectors by the push-pull method.

* * * * *